(12) United States Patent
Inatani et al.

(10) Patent No.: US 8,484,667 B2
(45) Date of Patent: Jul. 9, 2013

(54) RECORDING AND/OR REPRODUCING APPARATUS

(75) Inventors: Akihisa Inatani, Tokyo (JP); Koji Ashizaki, Tokyo (JP); Masahiro Maikuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/423,598

(22) Filed: Mar. 19, 2012

(65) Prior Publication Data

US 2012/0250475 A1    Oct. 4, 2012

(30) Foreign Application Priority Data

Mar. 29, 2011    (JP) ................................. 2011-073320

(51) Int. Cl.
*G11B 17/03*    (2006.01)
(52) U.S. Cl.
USPC ........................................................ 720/615
(58) Field of Classification Search
USPC ........................................................ 720/615
See application file for complete search history.

(56) References Cited

U.S. PATENT DOCUMENTS

| | | | | |
|---|---|---|---|---|
| 5,563,857 | A * | 10/1996 | Park ............................ | 369/30.98 |
| 7,509,660 | B2 * | 3/2009 | Liu et al. ...................... | 720/615 |
| 7,650,612 | B2 * | 1/2010 | Liu et al. ...................... | 720/615 |
| 8,245,247 | B2 * | 8/2012 | Honma ......................... | 720/615 |
| 2008/0288969 | A1 * | 11/2008 | Waiman ........................ | 720/615 |
| 2009/0178066 | A1 * | 7/2009 | Liu et al. ...................... | 720/615 |

FOREIGN PATENT DOCUMENTS

| | | |
|---|---|---|
| JP | 2000-293919 A | 10/2000 |
| JP | 2003-085864 A | 3/2003 |

* cited by examiner

*Primary Examiner* — Mark Blouin
(74) *Attorney, Agent, or Firm* — Wolf, Greenfield & Sacks, P.C.

(57) ABSTRACT

A recording and/or reproducing apparatus includes a recording medium accommodation table including recording medium accommodation portions each capable of accommodating a recording medium, a recording medium drive unit on which the recording medium is removably mounted and which is capable of performing recording and/or reproduction of an information signal onto and/or from it, a mechanical chassis that supports the recording medium accommodation table to freely rotate and also support the recording medium drive unit to be movable, a drive-moving unit that moves the recording medium drive unit closer to and away from the recording medium accommodation table, and a recording medium transport unit that transports the recording medium between a recording medium mounting and removing position of a recording medium-mounting portion and a recording medium accommodation position of the recording medium accommodation portions.

7 Claims, 31 Drawing Sheets

RECORDING AND/OR REPRODUCING APPARATUS

BACKGROUND

The present disclosure relates to a recording and/or reproducing apparatus that uses an optical disk, a magnetic-optical disk, and other disk-like recording media to perform either recording or reproduction or both of recording and reproduction of an information signal. More particularly, the present disclosure relates to a recording and/or reproducing apparatus including a recording medium accommodation table including a plurality of recording medium accommodation portions capable of accommodating a plurality of recording media, a recording medium drive unit that performs recording/reproduction on/from a recording medium, and a recording medium transport unit that transports the recording medium between a recording medium accommodation position and a recording medium mounting and removing position. Specifically, in the recording and/or reproducing apparatus, one or two or more recording medium drive units are provided to a mechanical chassis to be movable, and the one or two or more recording medium drive units are configured to be capable of moving closer to and away from the recording medium accommodation table.

In the related art, as a first example of this kind of recording/reproducing apparatus, there is, for example, one described in Japanese Patent Application Laid-open No. 2000-293919 (hereinafter, referred to as Patent Document 1). Patent Document 1 describes a recording/reproducing apparatus capable of easily taking out a desired disk from a turntable accommodating a number of disks at narrow pitches by a loading means. The recording and/or reproducing apparatus according to Patent Document 1 includes a disk-like-recording-medium accommodation means, the loading means, a transport means, a locking means, and a recording and/or reproducing means. In the disk-like-recording-medium accommodation means, a number of disk-like-recording-medium supporting portions having first to n-th addresses are arranged. Those supporting portions support one end portions of the disk-like recording media in a cantilever manner, and the loading means takes out a disk-like recording medium supported by a supporting portion having a desired address among the supporting portions having the first to n-th addresses. The transport means aligns the disk-like recording medium having the desired address and the loading means with each other. The locking means fixes positions of the aligned disk-like-recording-medium accommodation means and loading means. The recording and/or reproducing means performs recording and/or reproduction onto and/or from the loaded disk-like recording medium. The recording and/or reproducing apparatus is characterized by including a disk-like-recording-medium space pressing and widening means that enters between a disk-like recording medium in a desired address and disk-like recording media supported in addresses on both sides thereof and presses and widens a space between the disk-like recording media on the both sides.

According to the recording and/or reproducing apparatus (hereinafter, referred to as "first example of the related art") that is described in Patent Document 1, even if the space between the disks is narrow, it is possible to press and widen this space by the disk space pressing and widening means and take out a desired disk reliably and easily (paragraph [0058] in Patent Document 1). Further, an information reading portion using an optical pick-up device is provided on an opposite side of the disk accommodation means, and the recording and reproducing means is provided near the disk accommodation means while preventing a chucking clamper from being brought into contact with the disks supported by the disk-supporting portions. Therefore, it is possible to set a disk mounting and removing position at which the clamper mounts and removes the disk to be closer to a disk accommodation position at which the disk is supported by the disk-supporting portion as much as possible. Thus, it is possible to set a transport distance by which the disk is transported by the loading means to be a short distance equal to or smaller than the diameter of a single disk. In this manner, by reducing a time for transporting the disk between the disk accommodation position and the disk mounting and removing position, it is possible to reduce an access time to the disk by the recording and reproducing means.

Further, in the related art, as a second example of this kind of recording and/or reproducing apparatus, there is, for example, one described in Japanese Patent Application Laid-open No. 2003-085864 (hereinafter, referred to as Patent Document 2). Patent Document 2 describes a disk changer installing a single rotatable tray and two disk-drive devices on a chassis. The disk changer according to Patent Document 2 includes a rotatable tray and a tray rotating mechanism that rotates the rotatable tray. Specifically, the rotatable tray includes a plurality of accommodation portions that are arranged adjacent to each other in a circumferential direction and accommodate disks with main surfaces of the disks being opposed to each other. The rotatable tray is supported by a chassis so as to freely rotate. A plurality of recording and reproducing portions that each perform recording and/or reproduction of an information signal onto and/or from the disk are provided. Further, a plurality of disk take-out mechanisms that each take the disk out from an accommodation portion of the rotatable tray and transport it to a recording and reproducing portion therefor and that each take the disk out from the recording and reproducing portion and transport it to the accommodation portion. The disk changer according to Patent Document 2 is characterized in that the disk that has been transported by each disk take-out mechanism to the recording and reproducing portion is located at a position retreating from the track of the disks accommodated in the accommodation portions, the track being drawn due to the rotation of the rotatable tray.

According to the disk changer described in Patent Document 2 (hereinafter, referred to as "second example of the related art"), the rotatable tray is set to be rotatable during recording or reproduction of an information signal in one recording and reproducing portion. Therefore, effects that recording or reproduction onto or from different disk-like recording media can be performed without interruption and an improvement in convenience in use of the disk changer is achieved are expected.

In the case of the first example of the related art described above, by setting the recording and/or reproducing means to be closer to the disk-like-recording-medium accommodation means as much as possible, the transport distance of the disk is reduced, to thereby achieve an improvement in the access time to the disk. Therefore, in the case where the recording medium accommodation means accommodates a disk, only when the clamper does not hold the disk, the recording medium accommodation means can be driven to rotate. Thus, when the clamper holds the disk, it may be impossible to drive the recording medium accommodation means to rotate. If the recording medium accommodation means is driven to rotate regardless of this, there is a fear that the disk held by the clamper collides with the disks accommodated in the disk accommodation portions. Therefore, it is difficult to sufficiently take advantage that by setting the recording and/or reproducing means to be closer to the disk-like-recording-medium accommodation means as much as possible, the transport distance of the disk is reduced, to thereby achieve an improvement in the access time to the disk.

Further, in the case of the second example of the related art described above, the rotatable tray is set to be rotatable during recording or reproduction of an information signal in one recording and reproducing portion, and thus it is possible to set other disk-like recording media in the other recording and reproducing portions during recording or reproduction. Therefore, it is possible to perform recording or reproduction onto or from the different disk-like recording media without interruption. However, an interval between the rotatable tray and the recording and reproducing portion is fixed and further the interval is set to be relatively large. As a result, the access time to a first disk is long and therefore the improvement in the access time is not sufficiently achieved.

SUMMARY

In the case of the first example of the related art, by setting the clamper in the disk mounting and removing position to be closer to the disk-supporting portion in the disk accommodation position as much as possible, the transport distance by which the disk is transported by the loading means is set to be a short distance equal to or smaller than the diameter of a single disk. Therefore, it is possible to reduce the time for transporting the disk between the disk accommodation position and the disk mounting and removing position. However, in this structure, part of the disks supported by the disk-supporting portion and part of the disk held by the clamper overlap with each other in a rotation direction of the disk-supporting portion. As a result, although the access time to a selected disk by the disk-drive device is short, access times to other disks are long, and thus it may be impossible to sufficiently improve the access time, which is one of problems to be solved.

Further, in the case of the second example of the related art, the rotatable tray is rotatable during recording or reproduction of an information signal in one recording and reproducing portion. Therefore, during recording or reproduction in the one recording and reproducing portion, it is possible to set the other disk-like recording media in the other recording and reproducing portions and to perform recording or reproduction onto or from the different disk-like recording media without interruption. However, the interval between the rotatable tray and the recording and reproducing portion is fixed and further the interval is set to be relatively large. Therefore, the access time to the disk is long including taking-in/out operations (loading operations), and thus the improvement in the access time is not sufficiently achieved, which is the other of problems to be solved.

According to an embodiment of the present disclosure, there is provided a recording and/or reproducing apparatus including a recording medium accommodation table, a recording medium drive unit, a mechanical chassis, a drive-moving unit, and a recording medium transport unit. The recording medium accommodation table includes a plurality of recording medium accommodation portions each capable of accommodating a disk-like recording medium. On the recording medium drive unit, the disk-like recording medium is removably mounted, and the recording medium drive unit is capable of performing recording and/or reproduction of an information signal onto and/or from the mounted disk-like recording medium. The mechanical chassis is configured to support the recording medium accommodation table to freely rotate and also support the recording medium drive unit to be movable. The drive-moving unit is configured to move the recording medium drive unit closer to and away from the recording medium accommodation table. Further, the recording medium transport unit is configured to transport the disk-like recording medium between a recording medium mounting and removing position of a recording medium-mounting portion, at which the disk-like recording medium is mounted and removed on and from the recording medium drive unit, and a recording medium accommodation position of the recording medium accommodation portions, at which the disk-like recording medium is accommodated.

According to the recording and/or reproducing apparatus of an embodiment of the present disclosure, due to provision of the drive-moving unit, it is configured that the recording medium drive unit moves closer to and away from the recording medium accommodation table. Therefore, by moving the recording medium drive unit closer to the recording medium accommodation table when the disk-like recording medium is to be mounted on the recording medium drive unit, it is possible to reduce a time for loading the disk-like recording medium onto the recording medium drive unit. Thus, it is possible to reduce an access time to the disk-like recording medium by the recording medium drive unit and to early start recording/reproduction of an information signal.

Further, according to the recording and/or reproducing apparatus of an embodiment of the present disclosure, due to provision of a plurality of groups each including the recording medium drive unit, the drive-moving unit, and the recording medium transport unit, it is configured that the recording medium drive units of the groups individually moves closer to and away from the recording medium accommodation table. Therefore, in each of the recording medium drive units, it is possible to reduce a time for loading disk-like recording media. In addition, by moving the recording medium drive unit during recording and reproduction away from the recording medium accommodation table by a predetermined distance, it is possible to select an arbitrary disk-like recording medium accommodated in the recording medium accommodation table and load it onto the different recording medium drive unit.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 show a mechanical chassis according to the disk recording and reproducing apparatus shown in FIG. 2, in which

FIG. 6 show a slide member according to the disk recording and reproducing apparatus shown in FIG. 2, in which

FIG. 7 show a slide-holding member according to the disk recording and reproducing apparatus shown in FIG. 2, in which

FIG. 8 show a base member according to the disk recording and reproducing apparatus shown in FIG. 2, in which

FIG. 9 show a slide gear according to the disk recording and reproducing apparatus shown in FIG. 2, in which

DETAILED DESCRIPTION OF EMBODIMENTS

A recording medium accommodation table and a recording medium drive unit are installed on a mechanical chassis and a drive-moving unit is configured to be capable of moving the recording medium drive unit closer to and away from the recording medium accommodation table. With this configuration, it is possible to mount the disk-like recording medium on the recording medium drive unit in a state in which the recording medium drive unit is placed closer to the recording medium accommodation table and to drive the disk-like recording medium to rotate without moving the recording medium drive unit away from the recording medium accommodation table. Therefore, it is possible to perform reading or writing of an information signal from or onto a disk-like recording medium at an early stage of a loading operation, and thus it is possible to achieve an improvement in an access time.

In addition, a recording medium accommodation table and a plurality of recording medium drive units are installed on a mechanical chassis and a plurality of drive-moving units are configured to be capable of individually moving the plurality of recording medium drive units closer to and away from the recording medium accommodation table. Further, by moving the recording medium drive units each configured to perform recording/reproduction of information so that the recording medium accommodation table can be rotated, it is possible to select any one of accommodated disk-like recording media and mount it on a different recording medium drive unit. Therefore, it is possible to operate the plurality of recording medium drive units in conjunction with each other and to continuously perform recording/reproduction of information signals onto/from the plurality of disk-like recording media without interruption.

EXAMPLES

Figure 1:
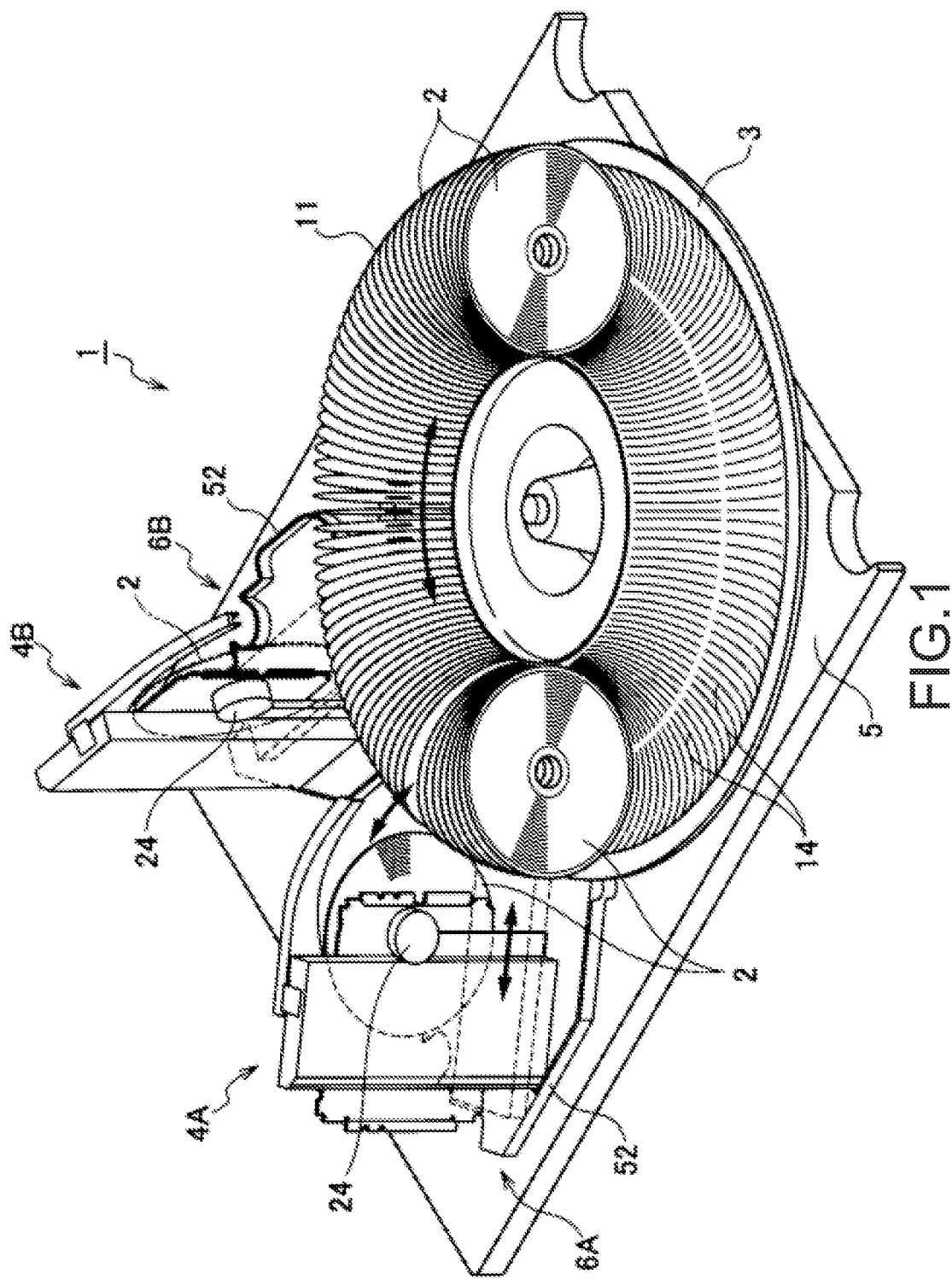
FIG. 1 is a perspective view of an outer appearance showing a schematic configuration of a disk recording and reproducing apparatus showing a first example of an embodiment of a recording and/or reproducing apparatus of the present disclosure.
Figure 2:
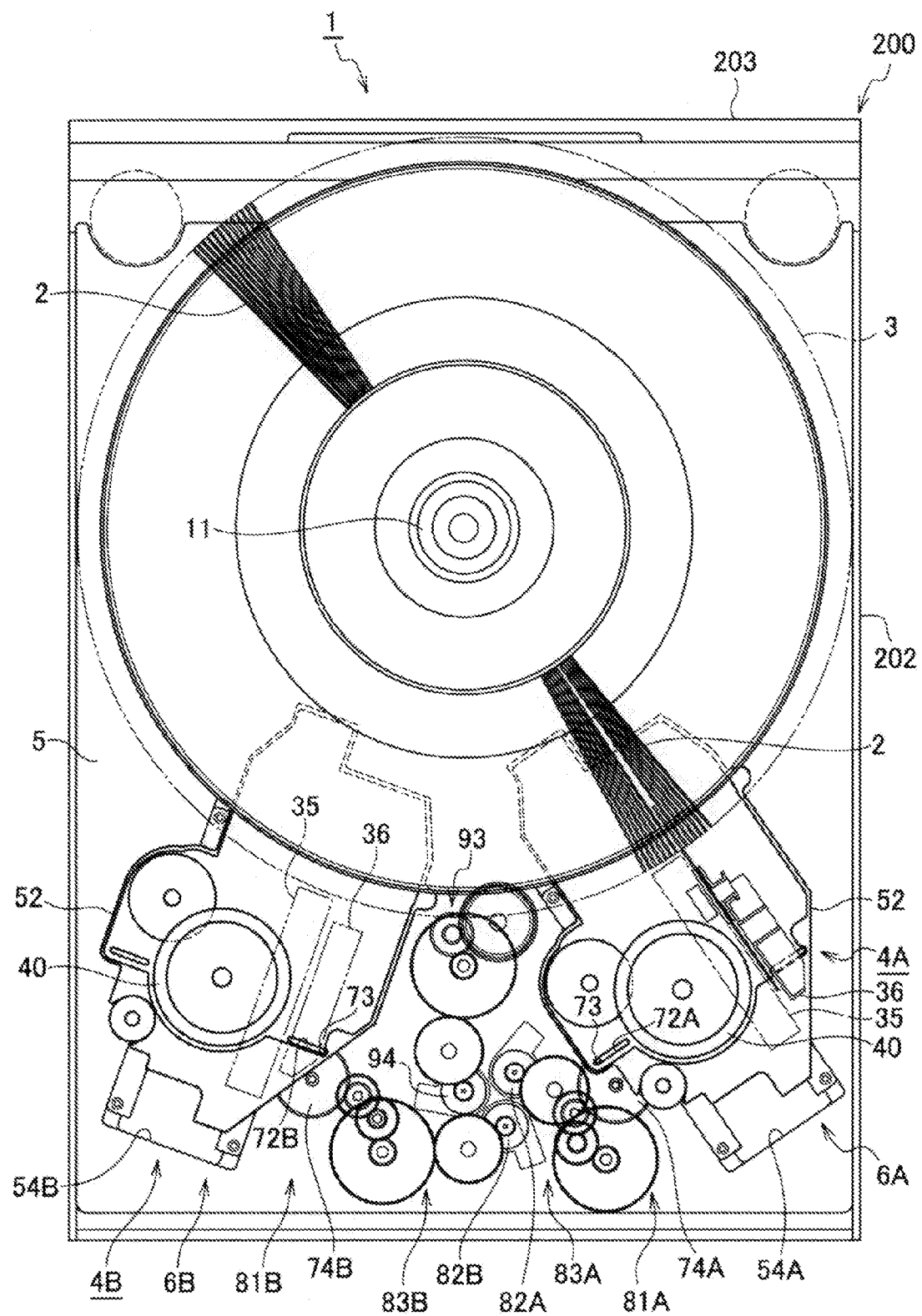
FIG. 2 is a plan view showing the schematic configuration of the disk recording and reproducing apparatus showing the example of the embodiment of the recording and/or reproducing apparatus of the present disclosure.

FIGS. 1 and 2 each show a disk recording and reproducing apparatus 1 according to a first example of an embodiment of a recording and/or reproducing apparatus of the present disclosure, which is an apparatus enabled to perform recording (writing) of an information signal and reproduction (reading) of an information signal. However, the present disclosure is not limited to a recording/reproducing apparatus capable of performing both of recording and reproduction of an information signal. As a matter of course, the present disclosure is applicable to the recording apparatus dedicated to recording of an information signal or a reproducing apparatus dedicated to reproduction of an information signal.

As disk-like recording media to be applied to the present disclosure, as a matter of course, there are optical disks (CD, DVD, etc) and magnetic-optical disks (MO, MD, etc). Additionally, a BD (Blu-ray Disc) and other disk-like recording media (hereinafter, referred to as "disk(s)" 2) are applicable to the present disclosure. It should be noted that examples of the CD can include a CD-DA, a CD-ROM, a CD-R, a CD-RW, and a video CD. Examples of the DVD can include a DVD-ROM, a DVD-R, a DVD-RW, a DVD-RAM, a DVD+R, and a DVD+RW. Further, examples of the BD can include a BD-R (Recordable), a BD-RE (Rewritable), a BD-ROM, and a Blu-ray3D.

The disk recording and reproducing apparatus 1 includes a single disk accommodation table 3, two disk drive units 4A and 4B, a single mechanical chassis 5, two drive-moving units 6A and 6B, two recording medium transport units 33 and 33, and the like. The disk accommodation table 3 refers to a specific example of the recording medium accommodation table, and is supported on one surface of the mechanical chassis 5 so as to freely rotate. The disk drive units 4A and 4B each refer to a specific example of the recording medium drive unit, and are supported on one side of the surface of the mechanical chassis 5 so as to be movable.

The drive-moving units 6A and 6B are configured to individually move the two disk drive units 4A and 4B on the mechanical chassis 5. Due to the drive-moving units 6A and 6B, the two disk drive units 4A and 4B are capable of moving closer to and away from the disk accommodation table 3. A disk transport unit 33 referring to a specific example of the recording medium transport unit, in FIGS. 3 and 4, transports the disk 2 between a disk mounting and removing position of a disk-mounting portion, at which the disk 2 is mounted and removed on and from each of the disk drive units 4A and 4B, and a disk accommodation position of a disk accommodation portion, at which the disk 2 is accommodated. It should be noted that a configuration in which three or more disk drive units 4 may be installed is possible and in this case, drive-moving units 6 as many as the disk drive units 4 and disk transport units 33 as many as the disk drive units 4 are provided. In the case where three or more disk drive units 4A and 4B, 4C, . . . , 4N are installed, the disk drive units 4A to 4N are configured to be capable of individually accessing the disk accommodation table 3.

Figure 3:
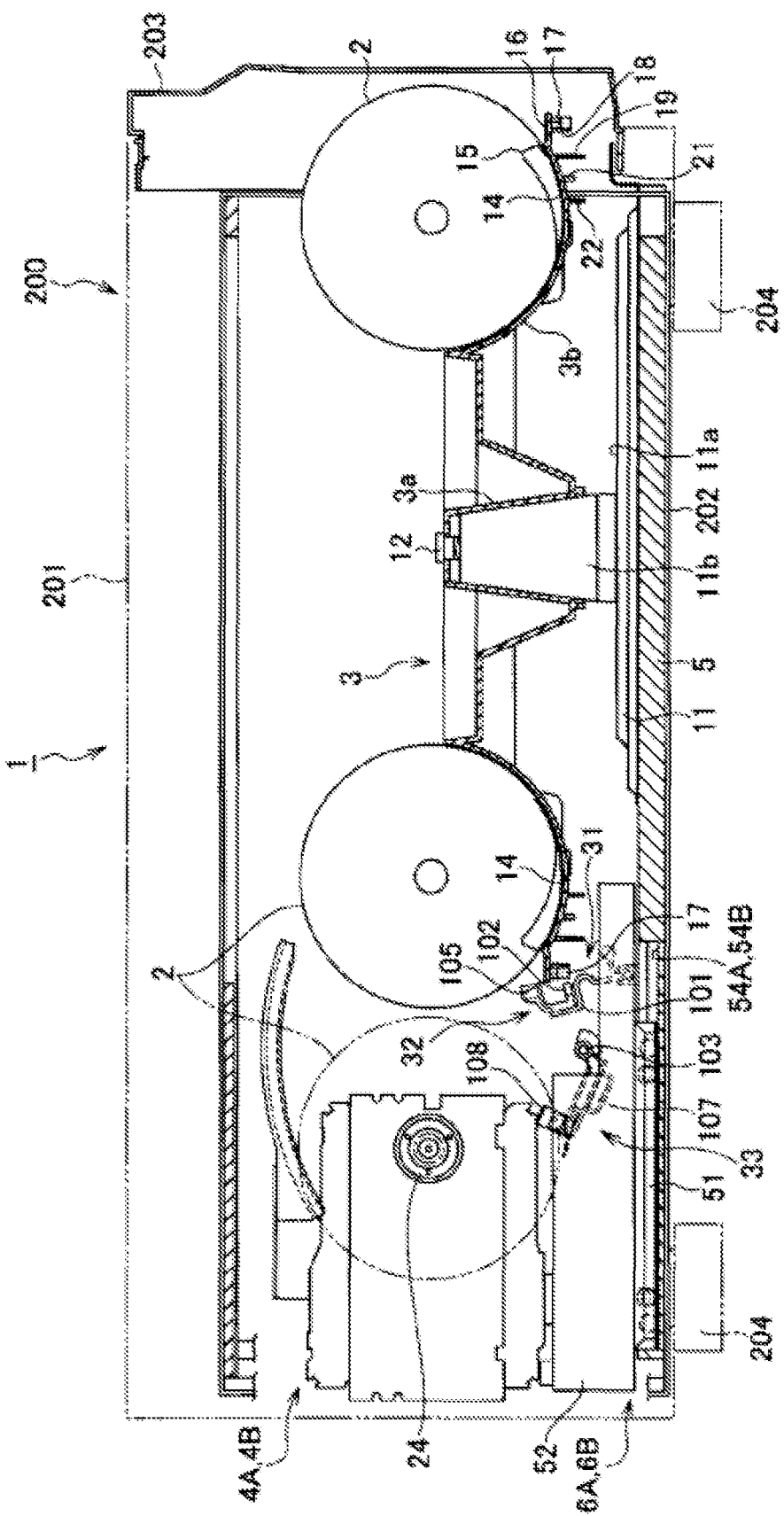
FIG. 3 is a cross-sectional view of the disk recording and reproducing apparatus shown in FIG. 2, which is taken along a longitudinal direction in a substantially center portion thereof, in a state in which the disk drive unit is placed away from a disk accommodation table.
Figure 20:
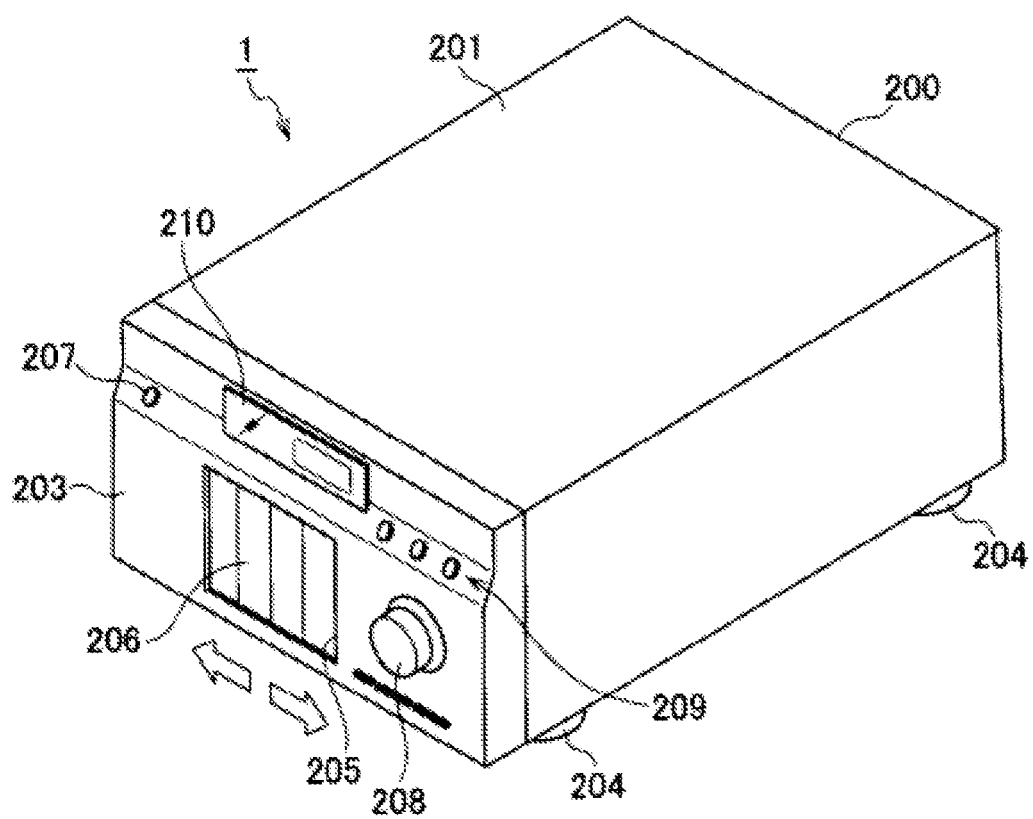
FIG. 20 is a perspective view showing a configuration of an outer appearance of a disk recording and reproducing apparatus showing one example of the embodiment of the recording and/or reproducing apparatus of the present disclosure, in a state in which a door for taking in/out a disk is closed.
Figure 21:
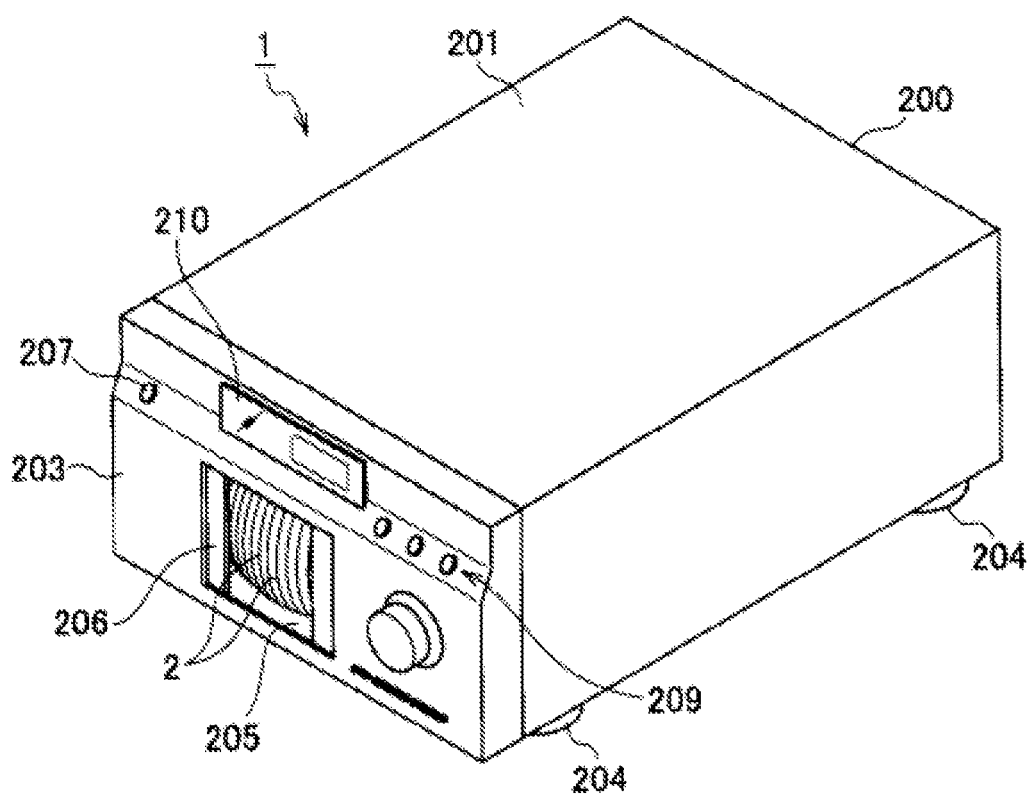
FIG. 21 is a perspective view showing a configuration of an outer appearance of the disk recording and reproducing apparatus showing one example of the embodiment of the recording and/or reproducing apparatus of the present disclosure, in a state in which the door for taking in/out the disk is opened.

As shown in FIGS. 20 and 21, the disk recording and reproducing apparatus 1 is provided with an outer casing 200 formed of a hollow housing. Within the outer casing 200, the mechanical chassis 5 on which the disk accommodation table 3, the disk drive units 4A and 4B, and the like are installed are housed. The outer casing 200 includes an upper panel 201, a bottom panel 202, a front panel 203, and the like. The upper panel 201 covers an upper surface of the mechanical chassis 5. The bottom panel 202 covers a lower surface of the mechanical chassis 5. The front panel 203 is removably attached so as to close a front opening portion of the upper panel 201. The bottom panel 202 is, as shown in FIG. 3, fixed on the lower surface of the mechanical chassis 5. At four corners of the mechanical chassis 5, four downwardly extending legs 204 are provided. Those four legs 204 support the disk recording and reproducing apparatus 1 so that the disk recording and reproducing apparatus is adjustable in height.

The upper panel 201 is set to be attachable and removable to and from the bottom panel 202. Both of the panels 201 and 202 are integrally joined to each other by fixing the panels 201 and 202 in an attached state with fixing screws (not shown). To the opening portion provided in front of a panel assembly formed of the upper panel 201 and the bottom panel 202, the front panel 203 is removably attached. The front panel 203 is fixed to the panel assembly with fixing screws (not shown), so that the outer casing 200 is integrally configured.

The front panel 203 is formed in a rectangular shape long in a lateral direction. The front panel 203 is, at a substantially center portion thereof, provided with a disk inlet/outlet 205 for taking in/out the disk 2 therethrough. The disk inlet/outlet 205 is formed as a rectangular opening portion having such a size that the disk 2 having a diameter of 12 cm in an upright position can be taken in/out therethrough. The disk inlet/outlet 205 can be opened and closed by a sliding door 206. The door 206 is slidable in such a manner that two door parts thereof are spaced away from each other in right and left directions. FIG. 20 shows a state in which the door 206 is closed and FIG. 21 shows a state in which the door 206 is opened.

On a front surface of the front panel 203, there are provided a power button 207 that turns ON/OFF a power source, a mode dial 208, operation buttons 209, a display panel 210, and the like. The mode dial 208 is configured to be capable of selecting various operations and operation modes, the various operations including a disk-selecting operation by a rotation operation of the disk accommodation table 3. The operation buttons 209 are capable of performing play, fast-forward, and various other operations.

The display panel 210 includes, for example, a liquid crystal display, and capable of displaying operation information, information on a disk being played, information during recording, and various other types of information.

As shown in FIGS. 1 and 2, the disk recording and reproducing apparatus 1 includes the single disk accommodation table 3 capable of accommodating 400 disks on one side of the upper surface of the mechanical chassis 5 and the two disk drive units 4A and 4B on the other side. The two disk drive units 4A and 4B are arranged with a predetermined gap therebetween in a circumferential direction of the disk accommodation table 3. The two disk drive units 4A and 4B are configured to be capable of individually accessing the plurality of disks 2 accommodated in the single disk accommodation table 3.

Figure 5A:
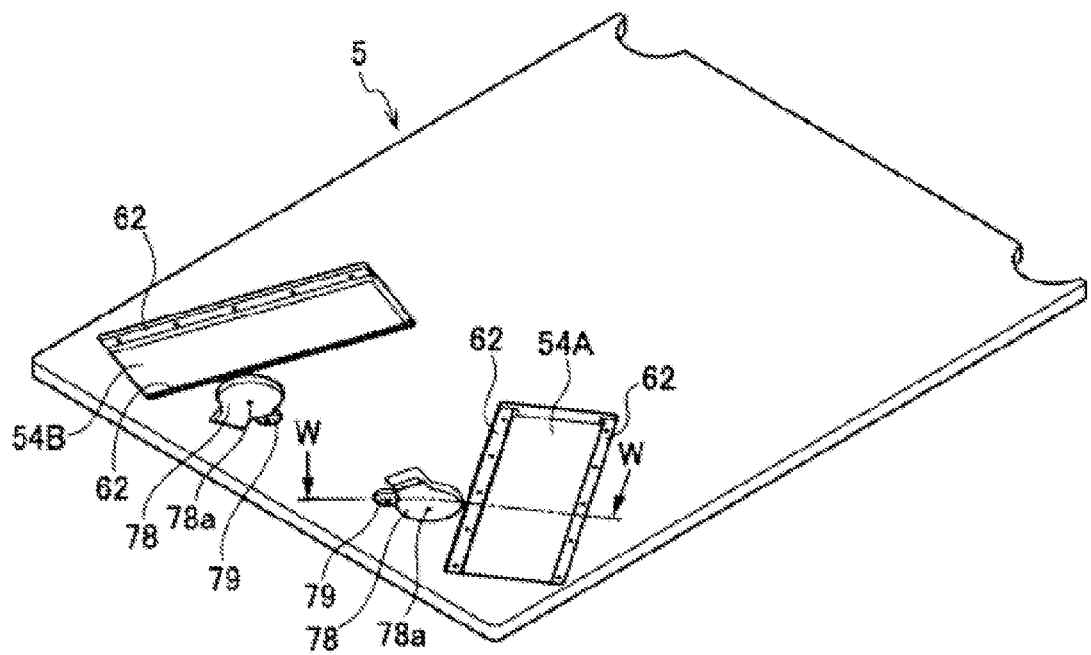
FIG. 5A is a perspective view of an outer appearance and FIG. 5B is a cross-sectional view taken along the line W-W in FIG. 5A.

The mechanical chassis 5 has a configuration as shown in FIG. 5A and is formed as a flat plate member having a substantially rectangular shape and such a size that the single disk accommodation table 3 and the two disk drive units 4A and 4B are both installed thereon at the same time. In a position slightly displaced from a center portion of the mechanical chassis 5, a table bearing member 11 for supporting the disk accommodation table 3 so as to freely rotate is provided. By the table bearing member 11, the disk accommodation table 3 is supported so as to freely rotate.

Figure 4:
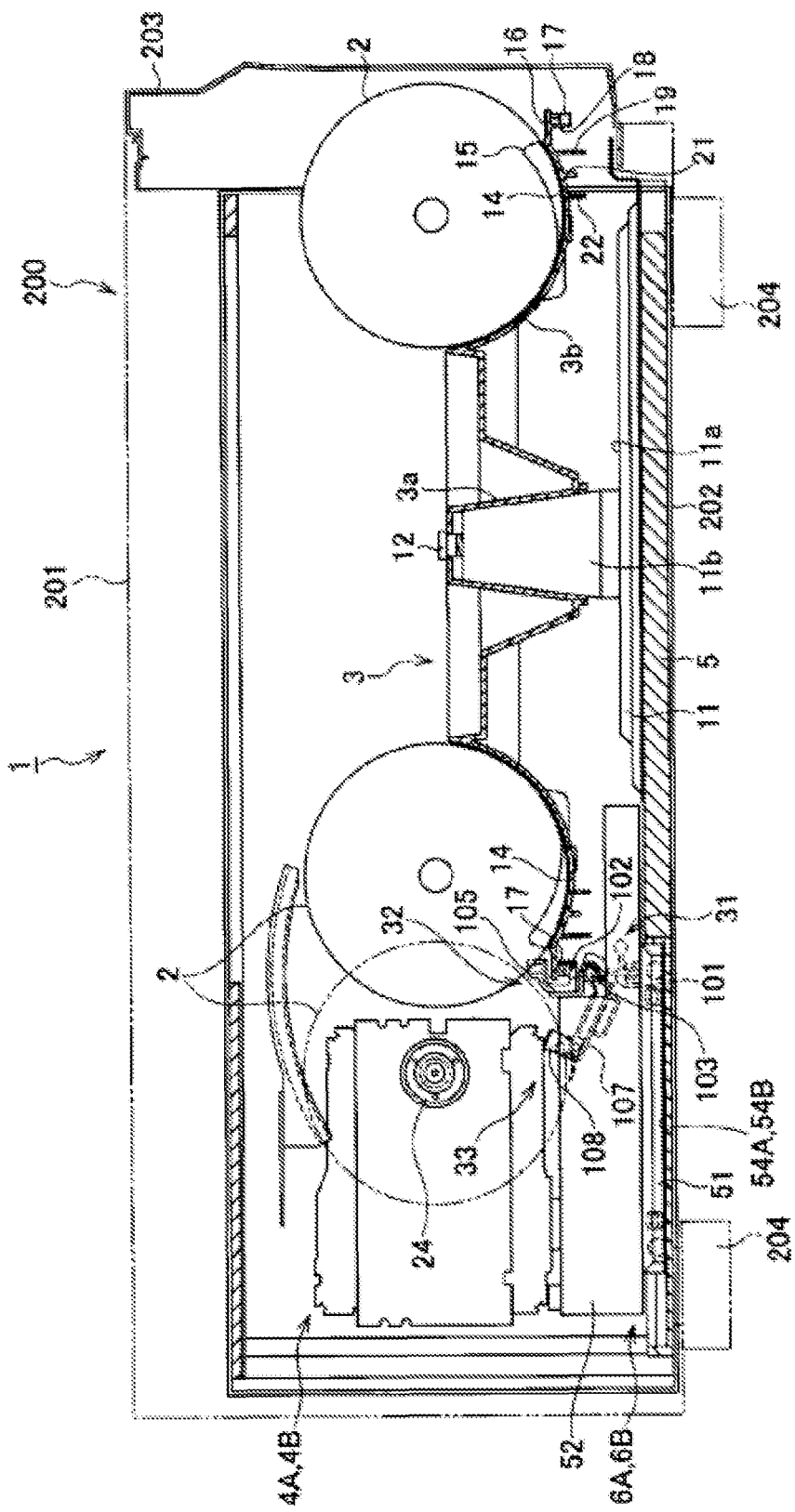
FIG. 4 is a cross-sectional view of the disk recording and reproducing apparatus shown in FIG. 2, which is taken along the longitudinal direction in the substantially center portion thereof, in a state in which the disk drive unit is placed closer to the disk accommodation table.

The table bearing member 11 includes, as shown in FIGS. 3 and 4, a fixing portion 11a and a support shaft portion 11b. The fixing portion 11a is fixed by screwing with fixing screws at a predetermined position on the mechanical chassis 5. The support shaft portion 11b is provided upright in a substantially center portion of the fixing portion 11a. The support shaft portion 11b is formed of a shaft body having a tapered conical tube shape. Onto the support shaft portion 11b, a rotating shaft portion 3a of the disk accommodation table 3 is fitted so as to freely rotate. Further, a mounting screw 12 penetrating a center of an end surface of the rotating shaft portion 3a and screwed into a center of an end surface of the support shaft portion 11b prevents the disk accommodation table 3 from being detached from the rotating shaft portion 3a.

The disk accommodation table 3 includes, as shown in FIGS. 1 to 4, the rotating shaft portion 3a provided in the center thereof and having a disk-like shape and an annular disposing portion 3b provided to be continuous and concentric with an outer rim of the rotating shaft portion 3a. On an upper surface of the annular disposing portion 3b, 400 disk accommodation portions 14 . . . 14 having first to 400th addresses are provided so as to be arranged side by side in a circumferential direction with the rotating shaft portion 3a being a center. The 400 disk accommodation portions 14 . . . 14 are formed in a radial form at angular intervals of 360°/400 (=0.9°) by providing upwardly projecting radial ribs 15 . . . 15 upright between the disk accommodation portions 14, 14 adjacent to each other. Further, a disposing surface of each of the disk accommodation portions 14, which is to be brought into contact with the disk 2, is formed as a circular-arc recess portion having a radius of curvature corresponding to an outer rim of the disk 2. By fitting lower end portions of the disks 2 into the disk accommodation portions 14, the disks 2 can be supported with the disks 2 being erected substantially in a vertical direction one by one in the respective disk accommodation portions 14.

In addition, the disk accommodation table 3 includes a ring-like address display portion 16 projecting to an outside in a radial direction thereof in continuous with an outer rim of the annular disposing portion 3b. On the address display portion 16, the addresses corresponding to the 400 disk accommodation portions 14 . . . 14 are displayed as numbers, symbols, or the like. On a back surface of the address display portion 16, gear teeth 17 for driving the disk accommodation table 3 to rotate are provided over the entire periphery. Further, on a back surface of the annular disposing portion 3b, four annular projections including a first annular projection 18, a second annular projection 19, a third annular projection 21, and a fourth annular projection 22 concentrically arranged with the rotating shaft portion 3a being a center are provided.

The first annular projection 18 provided at the outermost periphery is provided with the above-mentioned gear teeth 17. The second-outermost second annular projection 19 is provided with 400 slits (hereinafter, referred to as "smaller-address detection slits" corresponding to 400 addresses of the disk accommodation portions 14. The smaller-address detection slits are set to all have the same width and be arranged in equal intervals. The third-outermost third annular projection 21 is provided with ten slits (hereinafter, referred to as "larger-address detection slits" corresponding to 1/10 (40 addresses) of the 400 addresses of the disk accommodation portions 14. The larger-address detection slits are set to leave gradually larger intervals therebetween, and based on differences in length of the intervals, ten areas can be identified. The fourth annular projection 22 provided at the innermost periphery is configured to support the disk accommodation table 3 from the mechanical chassis 5 side, and supported by a table support roller (not shown), so that the disk accommodation table 3 can smoothly rotate.

Associated with the disk accommodation table 3 supported so as to freely rotate with respect to the mechanical chassis 5, the disk recording and reproducing apparatus 1 is provided with a disk detection portion and an address detection portion although not shown in the figures. The disk detection portion is configured to detect whether or not the disk 2 is accommodated in the disk accommodation portion 14 having the selected, desired address. The disk detection portion includes, for example, a photosensor including a light-emitting portion and a light-receiving portion. The light-emitting portion is provided outside the disk accommodation table 3 and the light-receiving portion is provided inside the disk accommodation table 3 across the disk accommodation portions 14, so that a light beam from the light-emitting portion can be detected by the light-receiving portion through a cutout portion provided in each of the disk accommodation portions 14. With this configuration, if the disk 2 is accommodated in the disk accommodation portion 14, a detection light beam emitted from the light-emitting portion is shut out by this disk 2 and not received by the light-receiving portion. In this manner, it is possible to detect that the disk 2 is present in the disk accommodation portion 14.

The address detection portion includes, for example, one or two or more photosensors that detect the smaller-address detection slits of the second annular projection 19 of the disk accommodation table 3 and a single photosensor that detects the larger-address detection slits of the third annular projection 21. The larger-address detection photosensor that detects the larger-address detection slits can detect ten larger addresses with 40 addresses being a unit. Further, the smaller-address detection photosensors that detect the smaller-address detection slits can detect smaller addresses of from the first to 40th addresses. By detecting both of the larger addresses and the smaller addresses, it is possible to detect all the addresses of from the first to 400th addresses.

Figure 14:
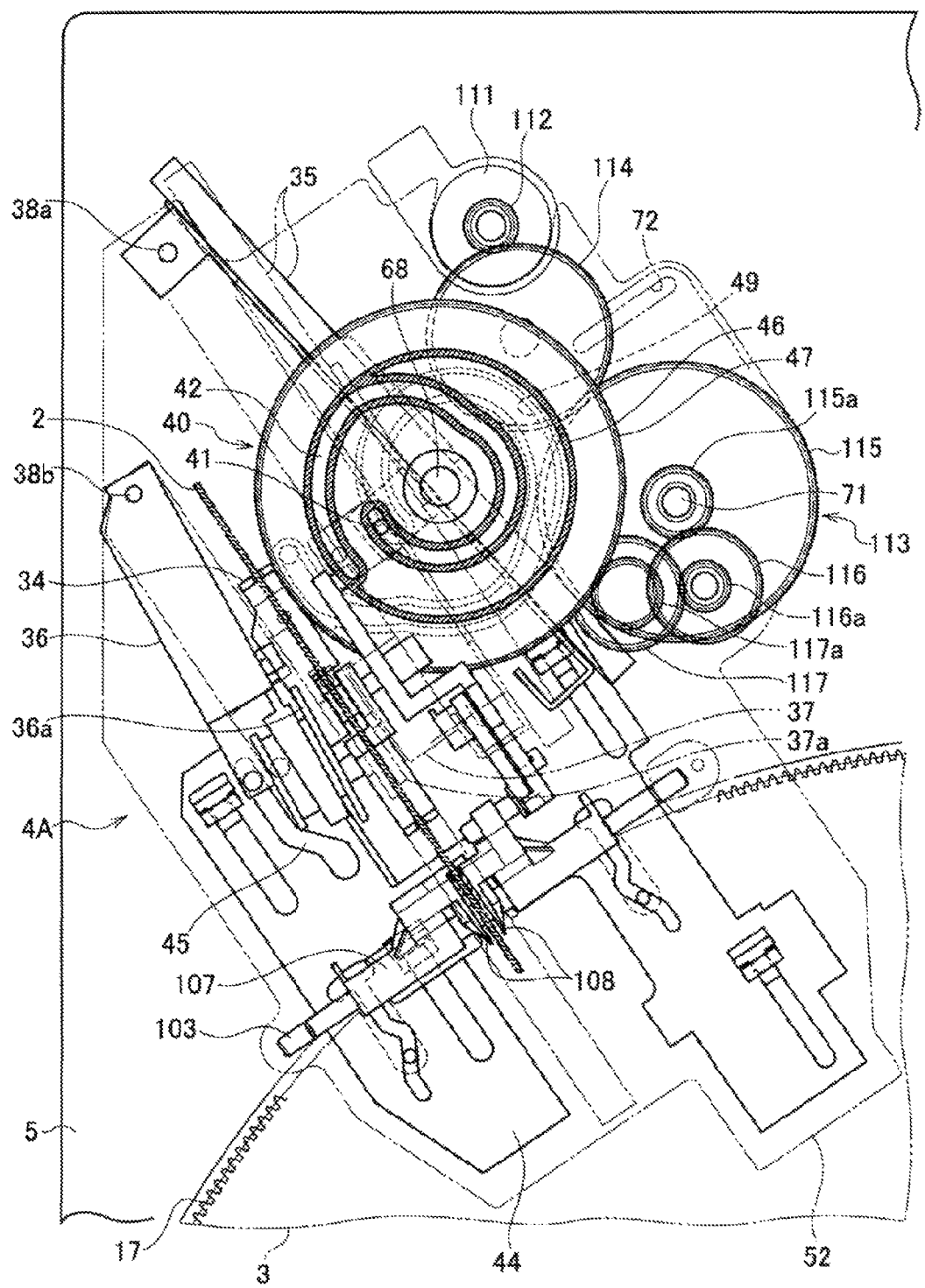
FIG. 14 is a plan view showing a configuration of the disk drive unit according to the disk recording and reproducing apparatus shown in FIG. 2.

As shown in FIGS. 1, 2, and 14, the two disk drive units 4A and 4B are provided on an opposite side to a side of the mechanical chassis 5, on which the disk accommodation table 3 is installed. Here, the two disk drive units 4A and 4B are arranged with a predetermined gap therebetween in a width direction of the mechanical chassis 5. The two disk drive units 4A and 4B have the same configuration and each include a disk rotating portion 24, an optical pick-up, a pick-up-moving portion, and a disk-loading portion, which are not shown in the figures, and the like. The disk rotating portion 24 includes, for example, a spindle motor 37, a turntable 37a fixed to a rotating shaft thereof, and a chucking clamper 36a that holds the disk between the clamper 36a and a magnet fixed to the turntable 37a.

The optical pick-up 25 includes an objective lens facing to an information-recording surface of the disk 2, a two-axis actuator that moves the objective lens in a focus direction and a tracking direction, and the like. The pick-up-moving portion 26 is configured to move the optical pick-up 25 in a radial direction of the disk 2 being supported by the disk rotating portion 24. The pick-up-moving portion 26 includes a feed screw, an electric motor, a guide bar, and the like. Further, the disk-loading portion 27 includes a first frame member 35 including the turntable 37a and a second frame member 36 including the clamper 36a.

The first frame member 35 is provided with the spindle motor 37, the optical pick-up (not shown), and the pick-up-moving portion that moves the optical pick-up closer to and away from the spindle motor 37, and the like. Further, in the second frame member 36, the chucking clamper 36a that chucks the disk 2 between the clamper 36a and the turntable 37a is supported so as to freely rotate. The first frame member 35 and the second frame member 36 are arranged with a predetermined interval therebetween substantially in parallel with each other, and configured to increase or decrease the interval on one side thereof, to thereby enable loading and unloading operations to be performed.

Specifically, the first frame member 35 and the second frame member 36 are provided in a state in which the turntable 37a and the clamper 36a are opposed to each other, and one side portions on an opposite side to the turntable and the clamper are supported through the pivot shafts 38a, 38b on a base member 52 so as to freely rotate. In an upper portion of a free end on an opposite side to the pivot shaft 38a of the first frame member 35, a first cam-engaging pin 41 is provided. The first cam-engaging pin 41 is slidably engaged to an upper cam groove 42 provided in an upper surface of a rotating cam 40. In a lower portion of a free end on an opposite side to the pivot shaft 38b of the second frame member 36, a second cam-engaging pin 43 is provided. The second cam-engaging pin 43 is slidably engaged to a cam groove 45 provided in a cam plate 44.

The rotating cam 40 includes a cylindrical cam body 46 formed in a cylindrical shape and a cam gear 47 integrally provided to a lower end of the cylindrical cam body 46. In an upper surface of the cylindrical cam body 46, the upper cam groove 42 is provided. In a circumferential surface of the cylindrical cam body 46, a side-surface cam groove for operating the loading portion to rotate is provided. In a lower surface of the cylindrical cam body 46, a lower cam groove 49 for operating the cam plate is provided.

When the rotating cam 40 is rotated, due to the rotation of the upper cam groove 42, the first cam-engaging pin 41 engaged to the upper cam groove 42 is moved and the first frame member 35 is rotated. In conjunction with the rotation of the first frame member 35, the second cam-engaging pin 43 engaged to the lower cam groove 49 is moved and the second frame member 36 is rotated via the operation of the cam plate 44. Due to the rotations of the first frame member 35 and the second frame member 36, the turntable 37a and the clamper 36a are moved closer to or away from each other. Specifically, when the turntable 37a and the clamper 36a are moved closer to each other, the disk 2 is attracted by a magnetic force of the magnet housed in the clamper 36a or the like, so that the disk 2 is chucked between the turntable 37a and the clamper 36a. Meanwhile, when the turntable 37a and the clamper 36a are moved away from each other, the clamper 36a is spaced away from the turntable 37a against the magnetic force of the magnet, so that the chucking of the disk 2 is released.

Figure 5B:
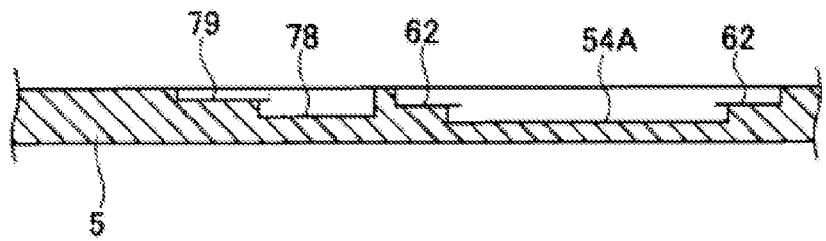
Figure 10:
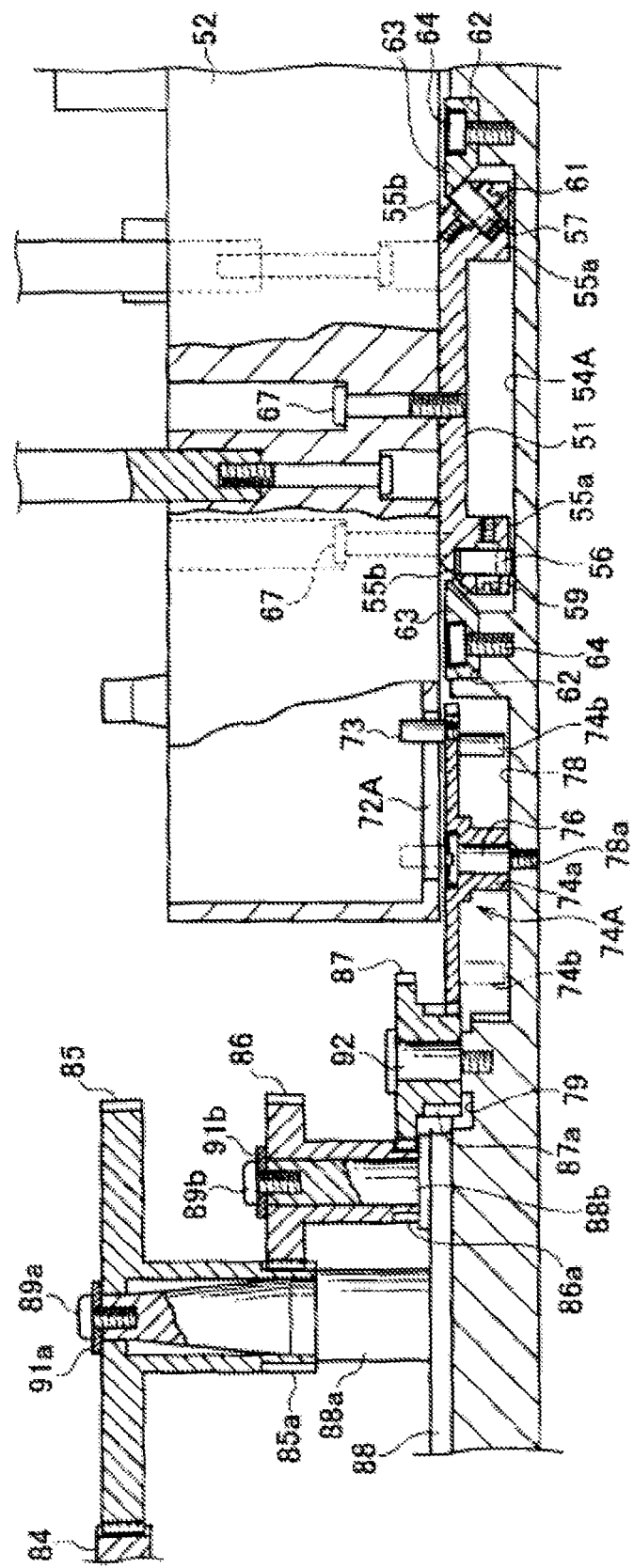
FIG. 10 is an explanation view showing a schematic configuration of the drive-moving unit according to the disk recording and reproducing apparatus shown in FIG. 2 in a cross-section.

A disk drive unit 4A is installed in a drive-moving unit 6A (a disk drive unit 4B is installed in a drive-moving unit 6B). In this state, the disk drive unit 4A is configured to be capable of moving closer to and away from the disk accommodation table 3. The drive-moving unit 6A has a configuration as shown in FIGS. 5, 10, and the like (the drive-moving unit 6B also has the same configuration). Specifically, the drive-moving unit 6A includes a slide member 51, the base member 52 installed on the slide member 51, a driving control unit 53 that advances and retreats the slide member 51 and the like by a predetermined distance, and the like. Further, guide grooves 54A, 54B for linearly advancing and retreating the slide members 51 by limiting movements of the slide members 51 are provided in the mechanical chassis 5.

Figure 6A:
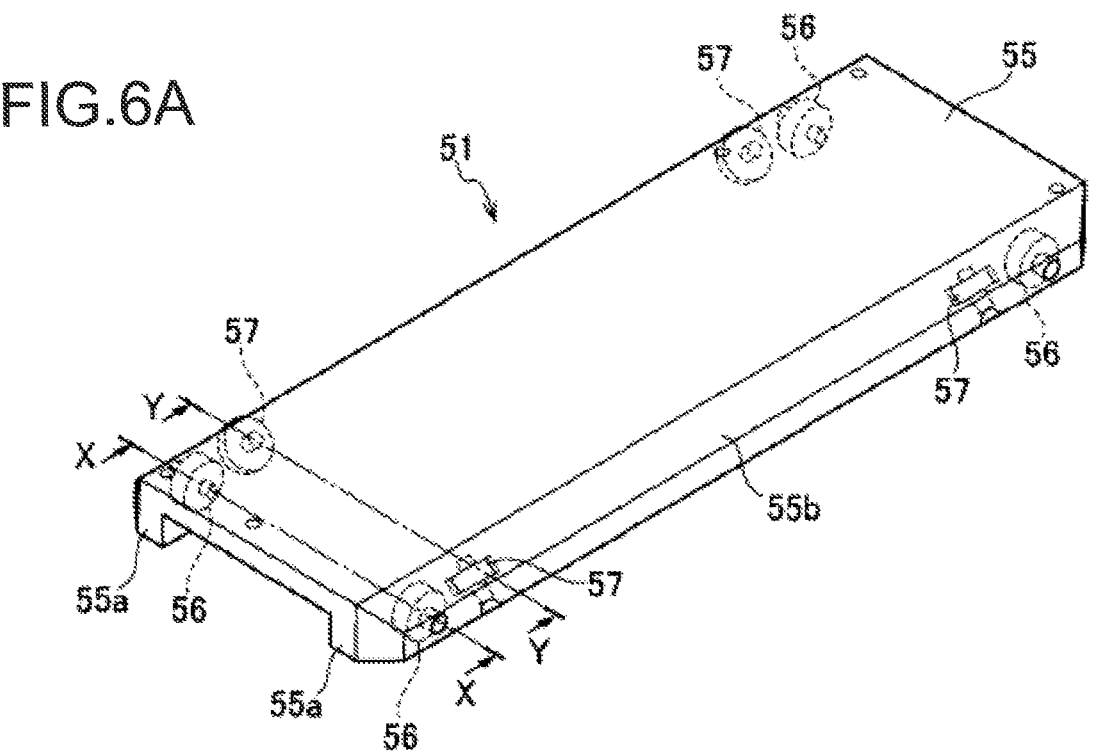
FIG. 6A is a perspective view of an outer appearance.
Figure 6B:
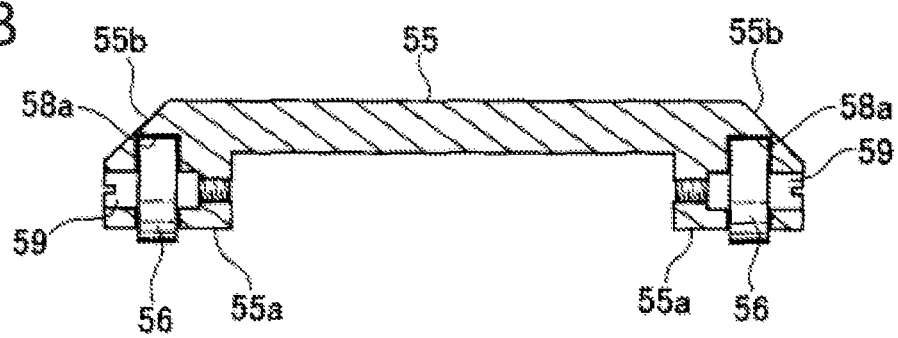
FIG. 6B is a cross-sectional view taken along the line X-X shown in FIG. 6A.
Figure 6C:
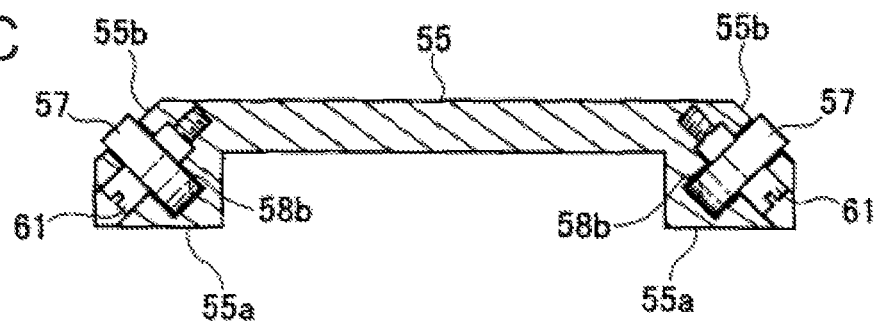
FIG. 6C is a cross-sectional view taken along the line Y-Y in FIG. 6A.

Each of the slide members 51 has a configuration as shown in FIGS. 6A, 6B, and 6C. Specifically, the slide member 51 includes a plate-like slider 55 having a substantially rectangular shape, four running rollers 56 . . . 56 provided to the slider 55 so as to freely rotate, and four rotating rollers 57 . . . 57 also provided to the slider 55 so as to freely rotate. By forming a groove extending in a longitudinal direction in a center portion in a width direction of a surface, the slider 55 includes projections 55a, 55a on both sides in the width direction. In corner portions in opposite sides to sides on which the respective projections 55a, 55a project, inclined surface portions 55b, 55b are provided.

Each of four corners of the projections 55a, 55a is provided with a perpendicular hole 58a capable of receiving the running roller 56. By laterally inserting a support screw 59 in a state in which a lower end portion of the running roller 56 is slightly projected from a lower surface of the projection 55a, the running roller 56 is supported so as to freely rotate. Further, each of the inclined surface portions 55b, 55b inside the four running rollers 56 . . . 56 is provided with an oblique hole 58b capable of receiving a rotating roller 57. By obliquely inserting a support screw 61 in a state in which an upper end portion of the rotating roller 57 is slightly projected from the inclined surface portion 55b, the rotating roller 57 is supported so as to freely rotate.

The slide member 51 having the above-mentioned configuration is, as shown in FIGS. 10 to 13 and the like, fitted into the guide groove 54A of the mechanical chassis 5. The length of the guide groove 54A in a longitudinal direction is equal to the sum of the length of the slide member 51 in a longitudinal direction and a distance by which the slide member 51 is slid. Further, the length of the guide groove 54A in a width direction is set to be slightly larger than the length of the slide member 51 in a width direction. On both sides of the guide groove 54A in the width direction, two long grooves 62, 62 extending along the longitudinal direction of the guide groove 54A are provided. Into the two long grooves 62, 62, slide-holding members 63, 63 are fitted.

Figure 7A:
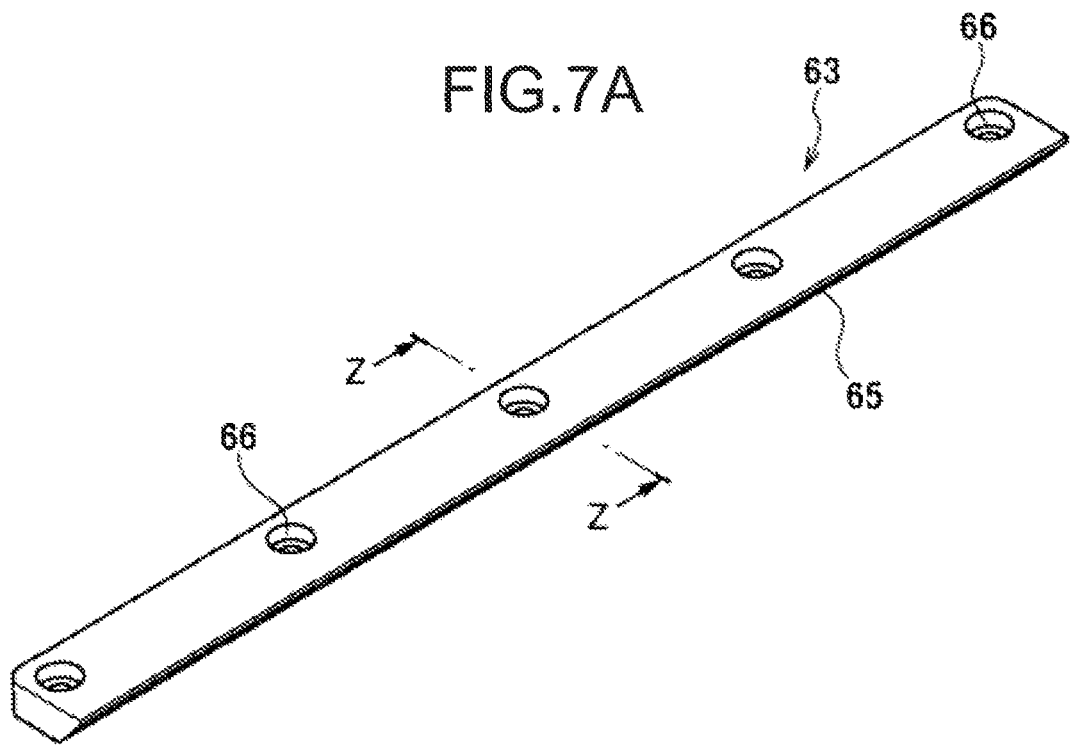
FIG. 7A is a perspective view of an outer appearance and FIG. 7B is a cross-sectional view taken along the line Z-Z in FIG. 7A.
Figure 7B:
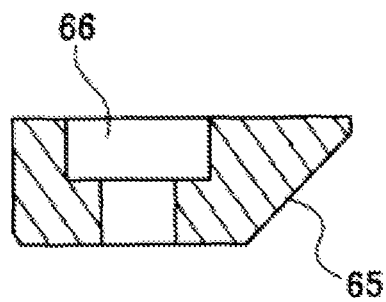

The slide-holding member 63 has a shape as shown in FIGS. 7A and 7B. Specifically, the slide-holding member 63 is formed of a stick-like member having a size to be fitted into the long groove 62. On one side in its width direction, an inclined surface portion 65 with which the rotating roller 57 is brought into rolling contact is provided. The inclined surface portion 65 is formed so as to leave, in an assembled state of the slide member 51, a predetermined space with respect to the inclined surface portion 55b of the slider 55 and be substantially parallel to the inclined surface portion 55b of the slider 55. The slide-holding member 63 is provided with a plurality of screw-inserting holes 66. By a plurality of fixing screws 64 inserted into the screw-inserting holes 66, the slide-holding member 63 is tightly fixed to the mechanical chassis 5.

In the assembled state of the slide member 51, the four running rollers 56 . . . 56 of the slide member 51 are brought into rolling contact with a bottom surface of the guide groove 54A. Further, the four rotating rollers 57 . . . 57 of the slide member 51 are brought into rolling contact with the inclined surface portion 65 of the slide-holding member 63. In this manner, it is possible to reduce a sliding frictional resistance during movement of the slide member 51, to thereby make the advance and retreating operations of the slide member 51 linear movements smoothly and correctly. The base member 52 is installed on the slide member 51 and tightly fixed to the slide member 51 with a plurality of fixing screws 67.

Figure 8A:
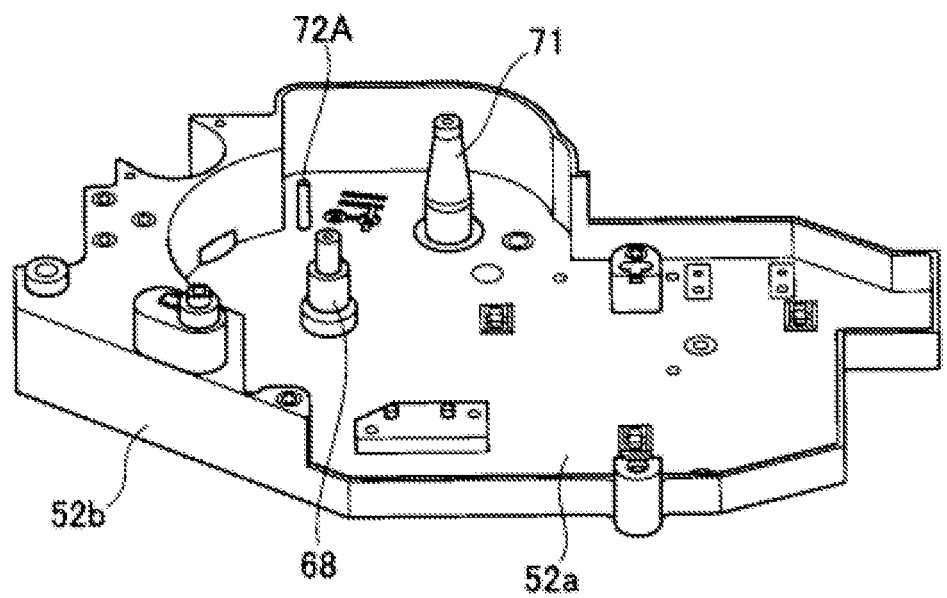
FIG. 8A is a perspective view of an outer appearance and FIG. 8B is a side view.
Figure 8B:
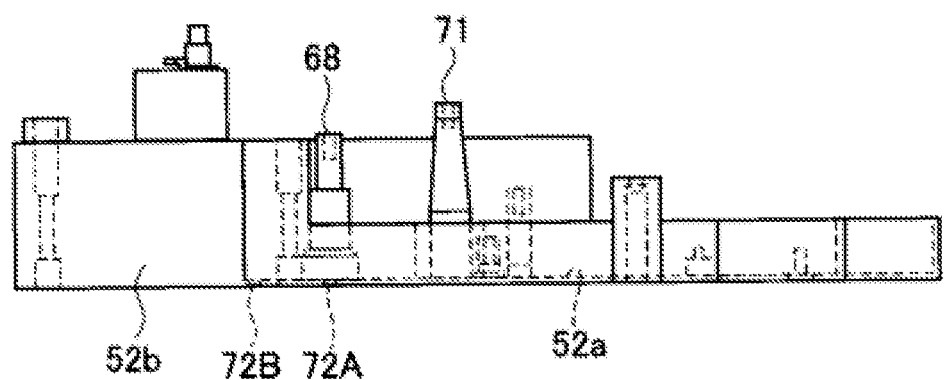

The base member 52 has a shape and a configuration as shown in FIGS. 8A and 8B. Specifically, the base member 52 includes a base portion 52a and a side-wall 52b surrounding the base portion 52a. The base portion 52a has a space in which the disk drive unit 4A, a disk space pressing and widening portion and the disk transport unit, which will be described later, and the like, are installed. A front portion of the base member 52 on the disk accommodation table 3 side being one side of the side-wall 52b is formed to be lower so as to be capable of getting under the disk accommodation table 3. In the base portion 52a, a cam support shaft 68, a gear support shaft 71, and the like are provided upright. The cam support shaft 68 is configured to support the rotating cam 40 so as to freely rotate. The gear support shaft 71 is configured to support a larger-diameter gear 69 so as to freely rotate, the larger-diameter gear 69 rotating the rotating cam 40.

As shown in FIGS. 2 and 8B, the base portions 52a are provided with a first cam long hole 72A and a second cam long hole 72B, each of which converts a rotary motion of the electric motor into a linear motion of the base portion 52a. The first cam long hole 72A is provided on one side of the base portion 52a in a width direction and the second cam long hole 72B is provided on the other side of the base portion 52a in the width direction. The first cam long hole 72A is for the first drive-moving unit 6A and the second cam long hole 72B is for the second drive-moving unit 6B. The first cam long hole 72A and the second cam long hole 72B linearly extend in a direction orthogonal to a direction in which the base member 52 moves together with the slide member 51. In accordance with a rotary motion of a slide gear 74 including a cam pin 73 slidably engaged to the first cam long hole 72A (or the second cam long hole 72B), the base member 52 is advanced or retreated within a predetermined range.

Figure 9A:
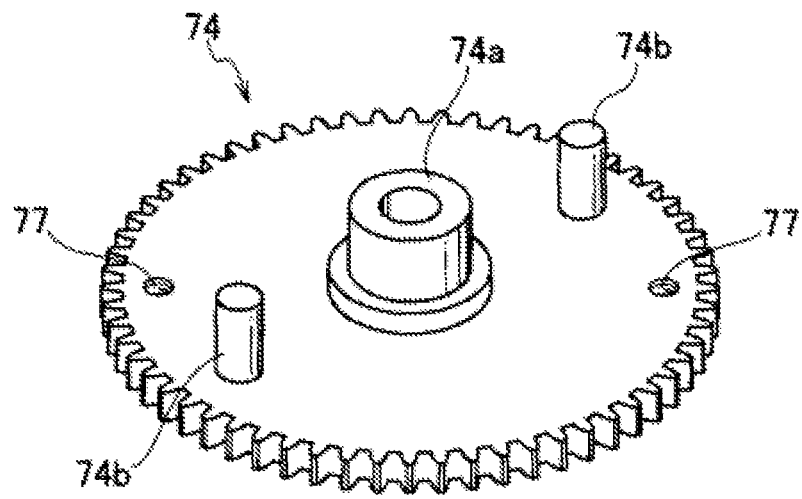
FIG. 9A is a perspective view of an outer appearance and FIG. 9B is a center longitudinal-sectional view.
Figure 9B:
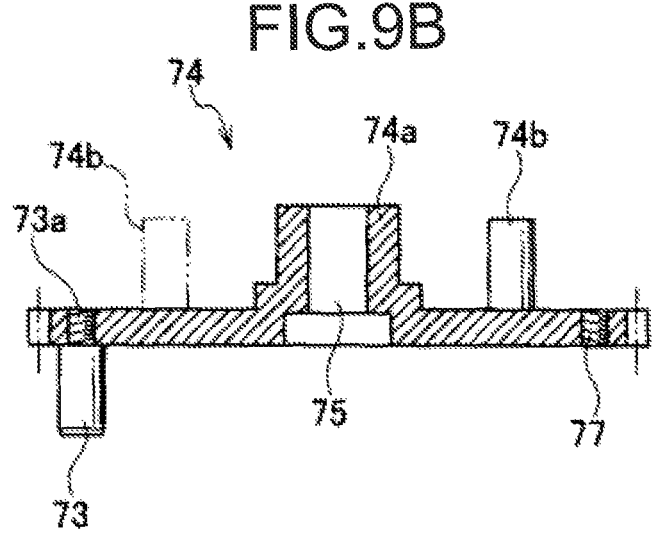

The slide gear 74 has a shape and a configuration as shown in FIGS. 9A and 9B. Specifically, the slide gear 74 is formed of a disk-like member having a suitable thickness and provided with teeth over its periphery. The slide gear 74 includes, in one surface thereof, a bearing portion 74a and two position detection protrusions 74b, 74b. The bearing portion 74a is set in a center of the slide gear 74 and a screw-inserting hole 75 is provided in a center of the bearing portion 74a. The two position detection protrusions 74b, 74b are arranged in positions symmetric across the bearing portion 74a. The position detection protrusion 74b is configured to detect an advance end or a retreat end of the slide member 51. When the slide member 51 moves to a predetermined front end, a front-end detecting switch is turned ON. When the slide member 51 retreats, the front-end detecting switch is turned OFF. When the slide member 51 moves to a predetermined rear end, a rear-end detecting switch is turned ON. After that, when the slide member 51 is switched to an advance operation, the rear-end detecting switch is turned OFF.

It should be noted that the reason why two position detection protrusions 74b, 74b are provided is because the slide gear 74 rotates by 180 degrees so that the slide member 51 and the base member 52 reach either the advance end or the retreat end, as will be described later. That is, this relates to a case where a detection switch (not shown) is a switch that performs detection identifying from which side (i.e. right- or left-hand side) this switch is pressed in left- and right-hand directions. When the slide gear 74 rotates in a clockwise direction or a counterclockwise direction, the two position detection protrusions 74b, 74b rotate just by 180 degrees and the position detection protrusion 74b is brought into contact with the detection switch, to thereby detect that the base member 52 reaches the front end or the rear end. It should be noted that in this example, even in the case where the detection switch is a single detection switch capable of performing detection identifying from which side (i.e. right- or left-hand side) this detection switch is pressed in the left- and right-hand directions, it may be used as the front-end detecting switch or the rear-end detecting switch depending on its role.

In addition, although in this example, the two position detection protrusions 74b, 74b provided to the slide gear 74 are used to detect that the base member 52 reaches the front end or the rear end, another detection method in which the slide member 51 and the base member 52 are provided with structures for position detection may be adopted, for example.

The slide gear 74 is integrally provided with the cam pin 73. Therefore, the slide gear 74 is provided with two screw holes 77, 77. The two screw holes 77, 77 are arranged in positions symmetric across the bearing portion 74a, avoiding the positions of the two position detection protrusions 74b, 74b. The cam pin 73 includes a screw shaft portion 73a screwed into the screw hole 77. The screw shaft portion 73a is screwed into the screw hole 77 so as to project to an opposite side to the position detection protrusion 74b. It should be noted that two screw holes 77, 77 are provided for the purpose of enabling the two screw holes 77, 77 to be used also in the second disk drive unit 4B having an arrangement symmetric in left- and right-hand directions.

Recess portions 78 for receiving the slide gears 74 and recess portions 79 for receiving gears that transmit rotational forces to the slide gears 74 are provided in the mechanical chassis 5. The two recess portions 78, 79 for the second disk drive unit 4B are arranged between the two guide grooves 54A, 54B so as to be adjacent to the two recess portions 78, 79 for the first disk drive unit 4A. In a center portion of the first recess portion 78, a screw hole 78a is provided. By screwing a pivot screw 76 inserted into the screw-inserting hole 75 into the screw hole 78a and tightly fixing it, the slide gear 74 is attached in the first recess portion 78 so as to freely rotate.

As shown in FIG. 10, the position of the screw hole 78a provided in the first recess portion 78 is a position such that a distance between the screw hole 78a and the first cam long hole 72A corresponds to a length from a center of a slide gear 74A to a center of the cam pin 73 in a direction orthogonal to a direction in which the first cam long hole 72A extends. In the case of the second drive-moving unit 6B, the position of the screw hole 78a in the first recess portion 78 is a position such that a distance between the screw hole 78a and the second cam long hole 72B corresponds to a length from a center of a slide gear 74B to a center of the cam pin 73 in a direction orthogonal to a direction in which the second cam long hole 72B extends.

As shown in FIG. 2, in the case of the drive-moving unit 6A, when the cam pin 73 engaged to the cam long hole 72A is located, on a side closer to the disk accommodation table 3 with respect to a center of rotation of the slide gear 74A, at an outermost end of the cam long hole 72A, the drive-moving unit 6A is located at a front end position. The position of the drive-moving unit 6A at this time is detected by the front-end detecting switch (not shown). When from this state, the slide gear 74A rotates in the clockwise direction in FIG. 2, the cam pin 73 integrated with the slide gear 74A moves to an inside of the base member 52 along the cam long hole 72A. At this point of time, a distance from the center of rotation of the slide gear 74A to the cam pin 73 is fixed, and thus depending on an amount of rotation of the slide gear 74A, the base member 52 moves (retreats) to a direction away from the disk accommodation table 3.

When the slide gear 74A rotates in the clockwise direction by 90 degrees, the cam pin 73 reaches an innermost end of the cam long hole 72A. At this point of time, the base member 52 retreats by a first half (L/2) of its moving stroke amount L. In addition, when the slide gear 74A continues to rotate in the clockwise direction, a movement direction of the cam pin 73 is reversed and the cam pin 73 is guided by the cam long hole 72A to move to an outside of the base member 52. In this manner, depending on an amount of rotation of the slide gear 74A, the base member 52 moves (retreats) to a direction away from the disk accommodation table 3. When the slide gear 74A rotates in the clockwise direction by 180 degrees, the cam pin 73 reaches the outermost end of the cam long hole 72A. At this point of time, the base member 52 retreats by a second half (L/2) of its moving stroke amount L. The position of the drive-moving unit 6A at this time is detected by the rear-end detecting switch (not shown).

In order to advance the first drive-moving unit 6A, by rotating the slide gear 74A in an opposite direction (rotating it in the counterclockwise direction in FIG. 2), it can be accomplished by the same operations as in retreating. Further, in the case of the second drive-moving unit 6B, the slide gear 74B and the second cam long hole 72B are provided on an opposite side to the first drive-moving unit 6A, and thus a rotation direction of the slide gear 74B becomes an opposite direction, but except for this direction, the operations are the same as in the case of the drive-moving unit 6A.

In the case of this example, the slide member 51 is provided with the four running rollers 56 . . . 56, and thus it is possible to significantly reduce a sliding frictional resistance between the slide member 51 and the mechanical chassis 5. Thus, it is possible to advance and retreat the slide member 51 with small external force. Further, in the corners of the slide member 51 on the opposite sides to the running rollers 56, the inclined surface portions 55b, 55b are provided and part of the rotating rollers 57 is exposed from the inclined surface portion 55b so as to be brought into sliding contact with the inclined surface portions 65 of the slide-holding members 63. Therefore, using wedge action of the two inclined surface portions 65, 65 of the two slide-holding members 63, 63, it is possible to achieve an enhancement in direct advancing performance of the drive-moving unit 6A (6B).

Regarding the driving control unit 81A that advances and retreats the first drive-moving unit 6A and the driving control unit 81B that advances and retreats the second drive-moving unit 6B, their components and operations are the same but their arrangements are slightly different from each other. In view of this, the components of the first driving control unit 81A will be denoted by reference symbols with A and the components of the second driving control unit 81B will be denoted by the same reference symbols with B or the same reference symbols simply, and duplicate description will be omitted.

Figure 11:
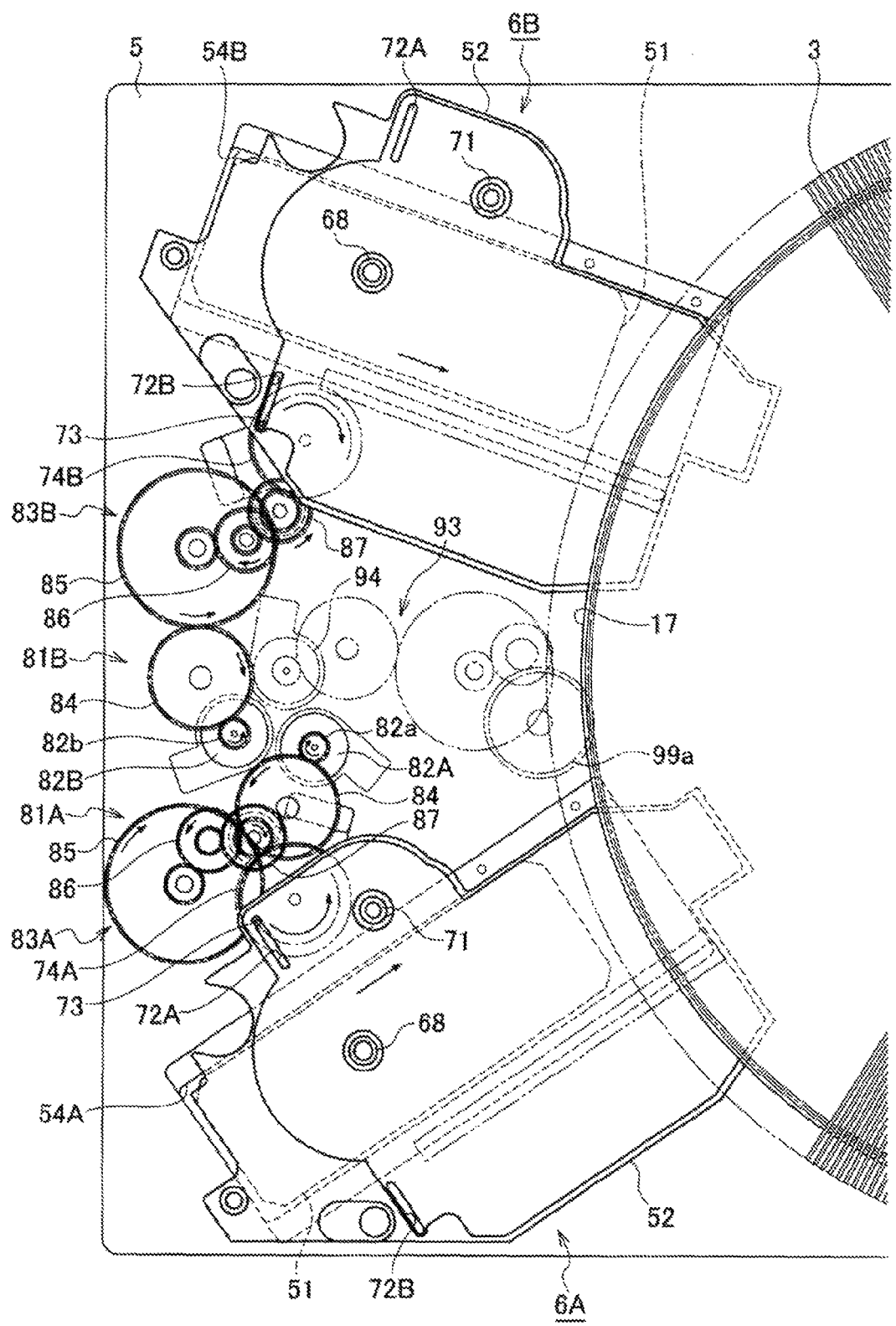
FIG. 11 is a plan view showing main parts of the disk recording and reproducing apparatus in FIG. 2 in an enlarged manner in a state in which two disk drive units are placed away from the disk accommodation table.
Figure 12:
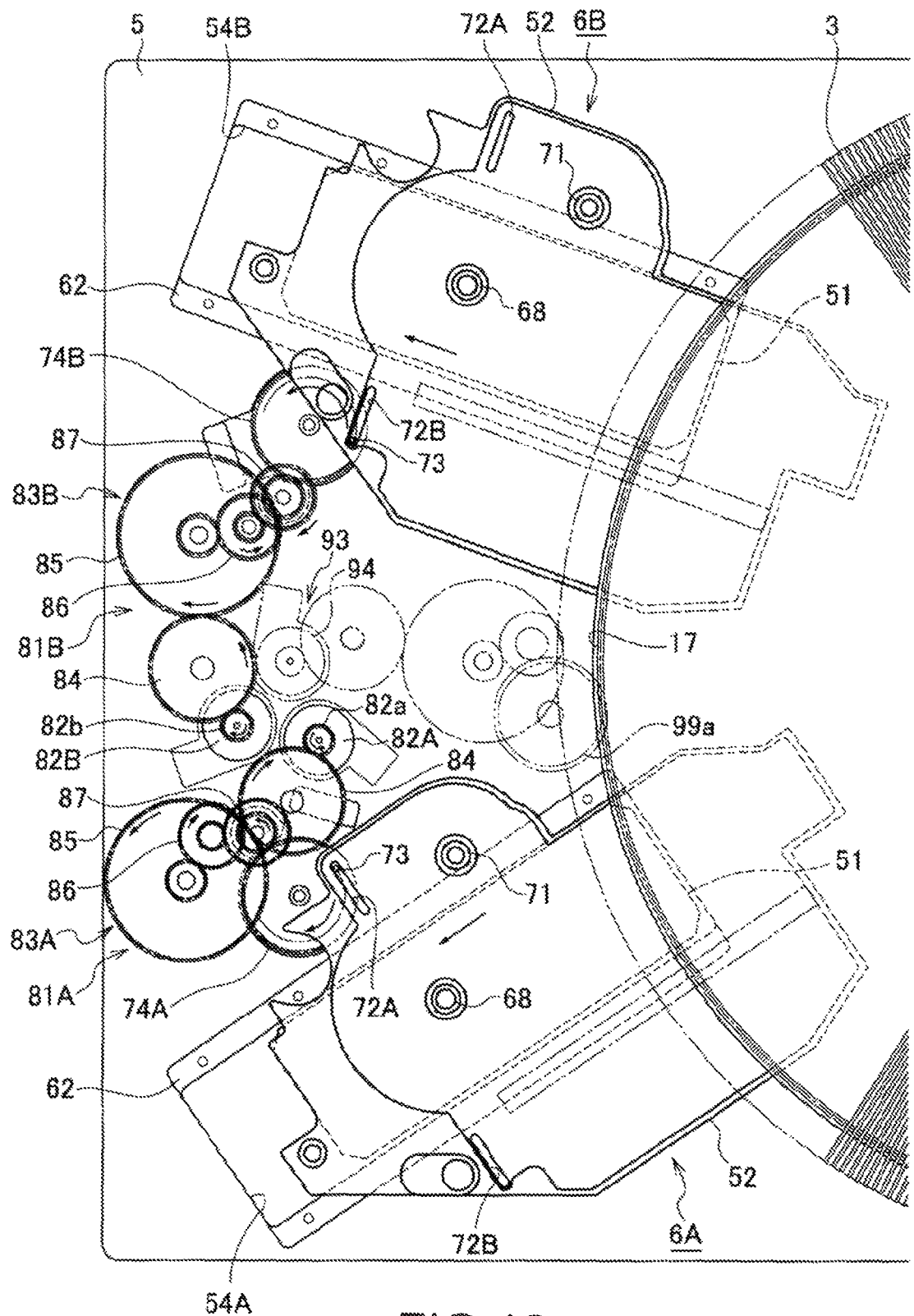
FIG. 12 is a plan view showing the main parts of the disk recording and reproducing apparatus in FIG. 2 in an enlarged manner in a state in which the two disk drive units are placed closer to the disk accommodation table.

As shown in FIGS. 10 to 12, the first driving control unit 81A includes an electric motor 82A, a gear array 83A that transmits a rotational force of the electric motor 82A, and the slide gear 74A. The electric motor 82A is fixed to the mechanical chassis 5 in a state in which its rotational shaft is oriented in a vertical direction. To an end of the rotational shaft, an output gear 82a is fixed. The gear array 83A includes a first gear 84, a second gear 85, a third gear 86, and a fourth gear 87. The first gear 84 is supported on the mechanical chassis 5 so as to freely rotate and meshed with the output gear 82a and the second gear 85. The second gear 85 is supported by a first support shaft 88a provided on a gear base 88 so as to freely rotate and prevented by a washer 91a fixed with a mounting screw 89a from being detached.

The second gear 85 includes a smaller-diameter gear 85a provided to a tubular shaft portion and the third gear 86 is meshed with the smaller-diameter gear 85a. The third gear 86 is supported by a second support shaft 88b provided on the gear base 88 so as to freely rotate and prevented by a washer 91b fixed with a mounting screw 89b from being detached. The gear base 88 is fixed on the mechanical chassis 5 with fixing screws (not shown). A tubular shaft portion of the third gear 86 is provided with a smaller-diameter gear 86a and the fourth gear 87 is meshed with the smaller-diameter gear 86a. The fourth gear 87 is provided in the recess portion 79 of the mechanical chassis 5 and supported on the mechanical chassis 5 with a pivot screw 92 so as to freely rotate. The fourth gear 87 includes a smaller-diameter gear 87a and the slide gear 74A provided in the recess portion 78 of the mechanical chassis 5 is meshed with the smaller-diameter gear 87a.

In the first drive-moving unit 6A, the cam pin 73 provided upright on an upper surface side of the slide gear 74A is slidably engaged to the first cam long hole 72A located in a left-side portion of the pair of the cam long holes 72A and 72B provided in the base member 52. In contrast, in the second drive-moving unit 6B, the cam pin 73 provided upright on an upper surface side of the slide gear 74B is slidably engaged to the second cam long hole 72B located in a right-side portion of the pair of the cam long holes 72A and 72B provided in the base member 52. The first cam long hole 72A provided in the base member 52 and the cam pin 73 provided to the first slide gear 74A constitute a motion converter for the first driving control unit 81A. Meanwhile, the second cam long hole 72B provided in the base member 52 and the cam pin 73 provided to the second slide gear 74B constitute a motion converter for the second driving control unit 81B.

Operations of the first drive-moving unit 6A and the second drive-moving unit 6B are as follows, for example. FIG. 11 shows a state in which the first disk drive unit 4A and the second disk drive unit 4B are both moved to the retreat ends (positions furthest from the disk accommodation table 3). Further, FIG. 12 shows a state in which the first disk drive unit 4A and the second disk drive unit 4B are both moved to the advance ends (positions closest to the disk accommodation table 3).

When from the state shown in FIG. 11, the electric motor 82A of the driving control unit 81A of the first drive-moving unit 6A is driven, a rotational force of its output shaft is input from the output gear 82a to the first gear 84 of the first gear array 83A. The rotational force transmitted to the first gear 84 is transmitted from the fourth gear 87 to the first slide gear 74A via the plurality of gears 85, 86. When the first slide gear 74A rotates in the counterclockwise direction by 180 degrees in FIG. 11, the cam pin 73 performs a single reciprocation along the first cam long hole 72A, so that the first slide gear 74A returns to a position outside the first cam long hole 72A.

In this manner, the base member 52 moves to a direction closer to the disk accommodation table 3 by a distance twice as large as a distance from the center of rotation of the first slide gear 74A to a center of the cam pin 73 and reaches the advance end shown in FIG. 12.

Regarding this operation, in the case of the second drive-moving unit 6B, a rotation direction of the electric motor 82B of the driving control unit 81B becomes an opposite direction (in this example, counterclockwise direction) and its rotational force is transmitted to the second slide gear 74B via the second gear array 83B. When the second slide gear 74B rotates in the clockwise direction by 180 degrees in FIG. 11, the cam pin 73 performs a single reciprocation along the second cam long hole 72B, so that the second slide gear 74B returns to a position outside the second cam long hole 72B. In this manner, the base member 52 moves to a direction closer to the disk accommodation table 3 by a distance twice as large as a distance from a center of rotation of the second slide gear 74B to a center of the cam pin 73 and reaches the advance end shown in FIG. 12.

Operations when the first drive-moving unit 6A and the second drive-moving unit 6B move from the advance ends to the retreat ends can be realized by reversing the electric motor 82A and the electric motor 82B. Therefore, for the electric motor 82A and the electric motor 82B, motors each capable of performing a positive rotation and a negative rotation, which allows the slide gears 74A, 74B to rotate in both of the clockwise direction and the counterclockwise direction are used. In FIG. 12, in the case of the first drive-moving unit 6A, the rotational shaft of the electric motor 82A is rotated in the counterclockwise direction and in the case of the second drive-moving unit 6B, the rotational shaft of the electric motor 82B is rotated in the clockwise direction.

In this manner, in the first driving control unit 81A, the slide gear 74A rotates in the clockwise direction by 180 degrees, and thus the base member 52 moves from the advance end to the retreat end. On the other hand, in the second driving control unit 81B, the slide gear 74B rotates in the counterclockwise direction by 180 degrees, and thus the base member 52 moves from the advance end to the retreat end. The advance end of the first disk drive unit 4A at this time is detected in such a manner that one position detection protrusion 74b of the two position detection protrusions 74b, 74b provided to the slide gear 74A operates a front-end position detection sensor. Further, by the other position detection protrusion 74b operating a rear-end position detection sensor, the retreat end of the first disk drive unit 4A is detected. The same position detection for the advance end and the retreat end of the first disk drive unit 4A is applied to the case of the second disk drive unit 4B.

Figure 13:
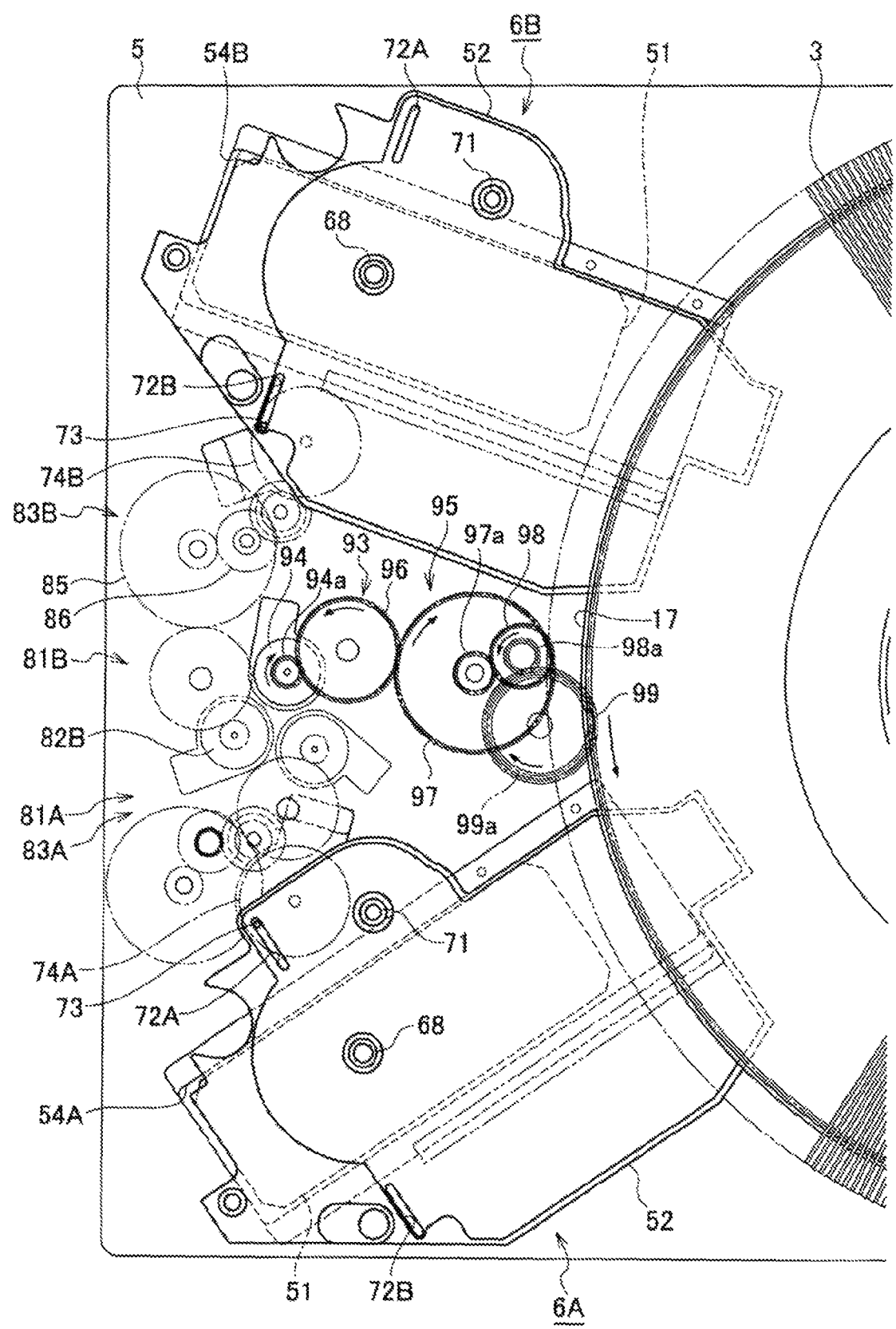
FIG. 13 is a plan view showing the main parts of the disk recording and reproducing apparatus in FIG. 2 in an enlarged manner in a state in which the two disk drive units are placed away from the disk accommodation table so that the disk accommodation table can be rotated.

Near the first driving control unit 81A and the second driving control unit 81B, a table driving control unit 93 for driving the disk accommodation table 3 to rotate is provided. The table driving control unit 93 has a configuration as shown in FIG. 13. Specifically, the table driving control unit 93 includes an electric motor 94 and a gear array 95 that transmits a rotational force of the electric motor 94. For the electric motor 94, in order to rotate the disk accommodation table 3 in both of the clockwise direction and the counterclockwise direction, a motor capable of performing a positive rotation and a negative rotation is used. The electric motor 94 is fixed on the mechanical chassis 5 in a state in which a rotational shaft thereof is oriented in the vertical direction and an output gear 94a is fixed to an end of the rotational shaft. The gear array 95 includes a first gear 96, a second gear 97, a third gear 98, and a fourth gear 99.

The first gear 96, the second gear 97, the third gear 98, and the fourth gear 99 are supported to four support shafts so as to freely rotate, the four support shafts being provided upright on a gear support shaft base (not shown) fixed on the mechanical chassis 5. The first gear 96 is meshed with the output gear 94a and the second gear 97. The second gear 97 includes a smaller-diameter gear 97a provided to a tubular shaft portion and the third gear 98 is meshed with the smaller-diameter gear 97a. The third gear 98 includes a smaller-diameter gear 98a and the fourth gear 99 is meshed with the smaller-diameter gear 98a. The fourth gear 99 includes a driving gear 99a and the driving gear 99a is meshed with the gear teeth 17 formed in the first annular projection 18 provided in the outer rim of the disk accommodation table 3.

Operations of the table driving control unit 93 are as follows, for example. FIG. 13 shows a state in which the disk accommodation table 3 is rotatable. Regarding a rotation operation of the disk accommodation table 3, the disk accommodation table 3 is set to be rotatable only when the base members 52 of the pair of the drive-moving units 6A and 6B and the like both move to the retreat ends. In effect, when the disk 2 is chucked in the disk-mounting portion, if the base member 52 and the like are located at the advance end or a middle position within the range of movement, part of this disk overlaps with part of disks 2 accommodated in the disk accommodation portions 14 in a plane direction. In view of this, the rotation operation of the disk accommodation table 3 can be set to be enabled only when the base members 52 and the like are retreated to the retreat ends in which the disks do not overlap with each other anymore.

In FIG. 13, when the rotational shaft of the electric motor 94 is rotated in the clockwise direction as shown by the arrow in the figure, its rotational force is transmitted from the output gear 94a via the gear array 95 to the gear teeth 17 of the disk accommodation table 3. In this manner, the disk accommodation table 3 is, in FIG. 13, driven to rotate in the counterclockwise direction. On the other hand, when the rotational shaft of the electric motor 94 is rotated in the counterclockwise direction opposite to the direction shown by the arrow in the figure, its rotational force is transmitted from the output gear 94a via the gear array 95 to the gear teeth 17 of the disk accommodation table 3. In this manner, the disk accommodation table 3 is, in FIG. 13, driven to rotate in the clockwise direction. It should be noted that the rotation operations of the first disk drive unit 4A and the second disk drive unit 4B can be performed even if those are located at the advance ends.

The disk drive units 4A and 4B having the above-mentioned configuration are respectively installed to the base members 52 of the drive-moving units 6A and 6B so that the disk drive units 4A and 4B are capable of linearly moving closer to and away from the disk accommodation table 3. The base members 52 of the drive-moving units 6A and 6B are each provided with a table-locking portion 31 configured to align the disk accommodation table 3 and temporarily fix it, a disk space pressing and widening portion 32 and the disk transport unit 33, which assist operations of the disk drive units 4A and 4B, and the like.

As shown in FIGS. 3, 4, and 15 to 19, the table-locking portion 31 is configured to lock, during transportation of the disk 2, the disk accommodation table 3 and align a selected, desired disk accommodation portion 14 with the disk drive unit 4A, 4B, to thereby put this disk 2 in a removable state. Further, the disk space pressing and widening portion 32 is configured to outwardly press and open, when the disk drive unit 4A, 4B is moved closer to the disk accommodation table 3, disks 2 accommodated on both sides of the selected disk accommodation portion 14, to thereby widen a space between the disk 2 accommodated in the desired disk accommodation portion and each of the disks 2, 2 accommodated on the both sides thereof so that the desired disk 2 can be easily grasped.

The table-locking portion 31 includes a rotating lever 101 supported on the mechanical chassis 5 so as to be rotatable, a locking portion 102 integrally provided to the rotating lever 101, and an operation shaft 103 that pushes and rotates the rotating lever 101. Further, the disk space pressing and widening portion 32 includes the rotating lever 101, a pressing and opening part 105 integrally provided to the rotating lever 101, and the operation shaft 103. The rotating lever 101 includes a lower end portion supported on the mechanical chassis 5 by a shaft portion 101a so as to be rotatable and an upper end on a free end side, to which the locking portion 102 and the pressing and opening part 105 are integrally provided. The locking portion 102 is provided so as to be opposed to the gear teeth 17 of the disk accommodation table 3 and the pressing and opening part 105 is provided so as to face the outer rim of the disk accommodation portion 14.

Figure 15:
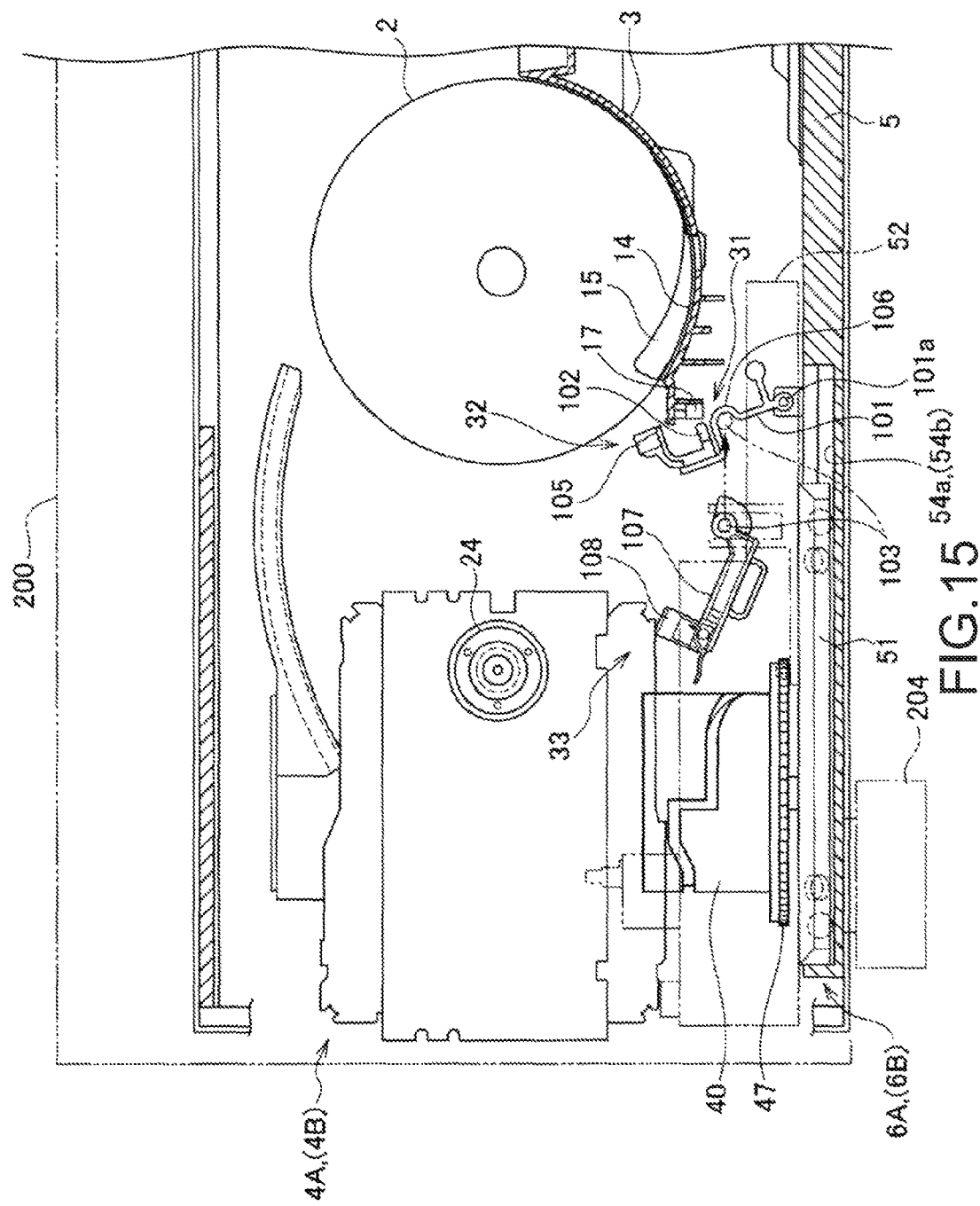
FIG. 15 is an explanation view showing, in a cross-section and an enlarged manner, the main parts of the disk recording and reproducing apparatus in a state in which the disk drive unit of the disk recording and reproducing apparatus shown in FIG. 2 is retreated to an initial position.

The rotating lever 101 is biased due to a spring force of a coil spring (not shown) in the counterclockwise direction in FIG. 15. Thus, in a normal state, the rotating lever 101 is biased to a direction away from the disk accommodation table 3, the locking portion 102 is opposed to the gear teeth 17 with a predetermined space therebetween, and the pressing and opening part 105 is opposed to an outside of the disk accommodation portions 14 in a radial direction. When from this state, the drive-moving unit 6A moves to a direction closer to the disk accommodation table 3, the operation shaft 103 provided to the base member 52 gets in a bearing portion 106 provided to the rotating lever 101 and rotates the rotating lever 101 against the spring force of the coil spring.

Further, the disk transport unit 33 is configured to get in a space obtained by the disk space pressing and widening portion 32 pushing and opening the disks, grasp the selected disk, and transport the selected disk between the disk accommodation position of the disk accommodation portion 14 and the disk mounting position in the disk-mounting portion. The disk transport unit 33 includes a clamp lever 107 supported on the base member 52 by the operation shaft 103 so as to be rotatable, a grasping portion 108 provided to an end portion of the clamp lever 107, and a cam portion that opens and closes the grasping portion 108 by rotating the clamp lever 107. The grasping portion 108 is capable of transporting the disk 2 between the disk accommodation position and the disk mounting and removing position by grasping the disk 2 with a portion that grasps the disk 2 at both of front and back surfaces of the outer rim of the disk 2 and rotating, in this grasping state, the clamp lever 107 with the operation shaft 103 being a center. The transportation operation of the disk 2 is realized by rotating the rotating cam 40 so as to actuate the cam portion, opening and closing the grasping portion 108, chucking the disk 2, and then rotating the clamp lever 107.

Figure 16:
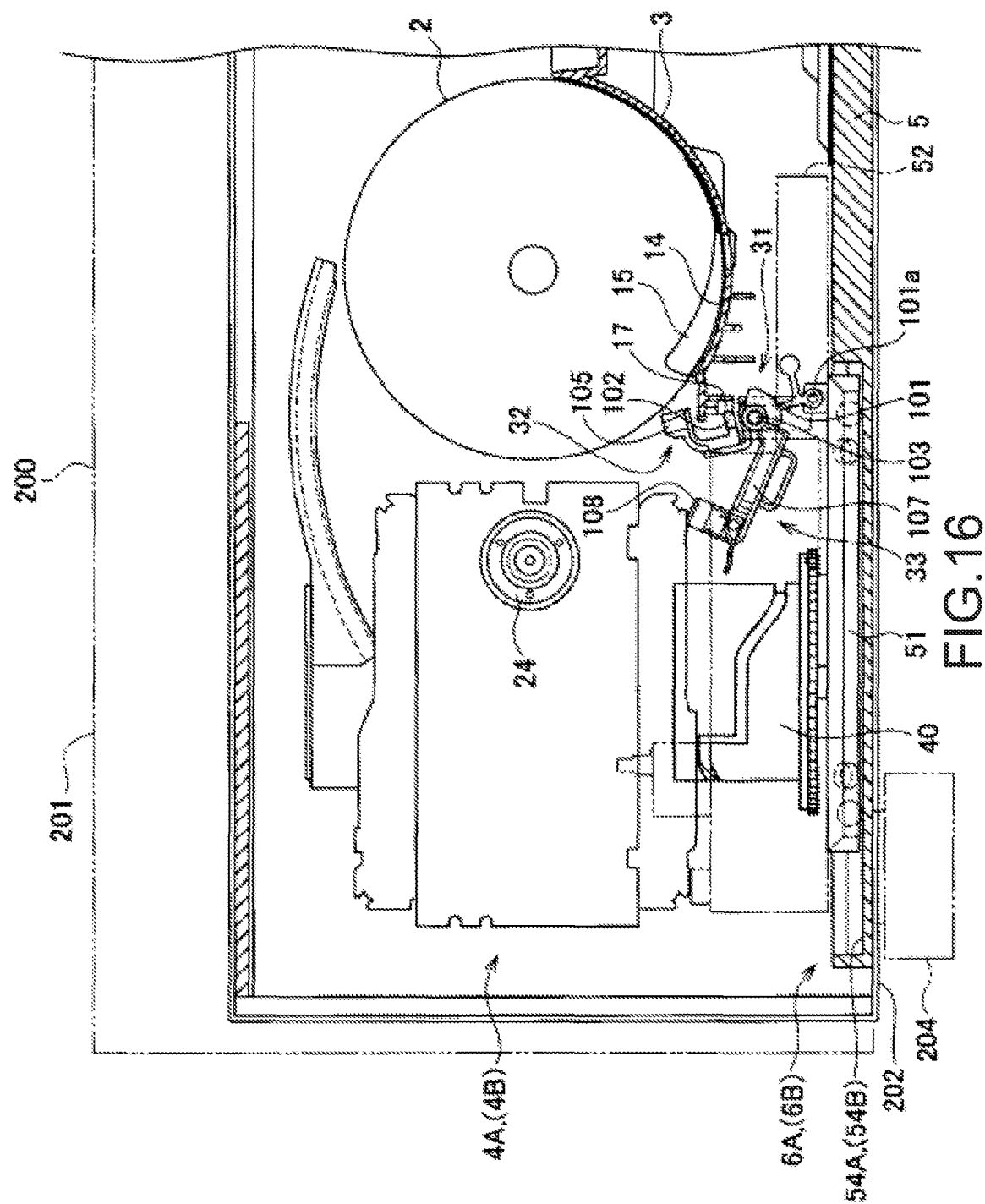
FIG. 16 is an explanation view showing, in a cross-section and an enlarged manner, the main parts of the disk recording and reproducing apparatus in a state in which from the state shown in FIG. 15, the disk drive unit is placed closer to the disk accommodation table and the disk accommodation table is locked by a table-locking portion.

As shown in FIG. 16, in a first stage of movement of the drive-moving unit 6A, the locking portion 102 provided to the rotating lever 101 is engaged to the gear teeth 17 of the disk accommodation table 3. In this manner, the disk accommodation portion 14 having a selected address in the disk accommodation table 3 is aligned with a predetermined position of the disk drive unit 4A. At this point of time, the pressing and opening part 105 of the disk space pressing and widening portion 32 does not yet enter between the disk accommodation portions 14 adjacent to each other and further, the clamp lever 107 of the disk transport unit 33 keeps its original falling-back state. When from this state, the disk drive unit 4A moves to the front end, the clamp lever 107 is changed from the state shown in FIG. 16 to a state shown in FIG. 17.

Figure 17:
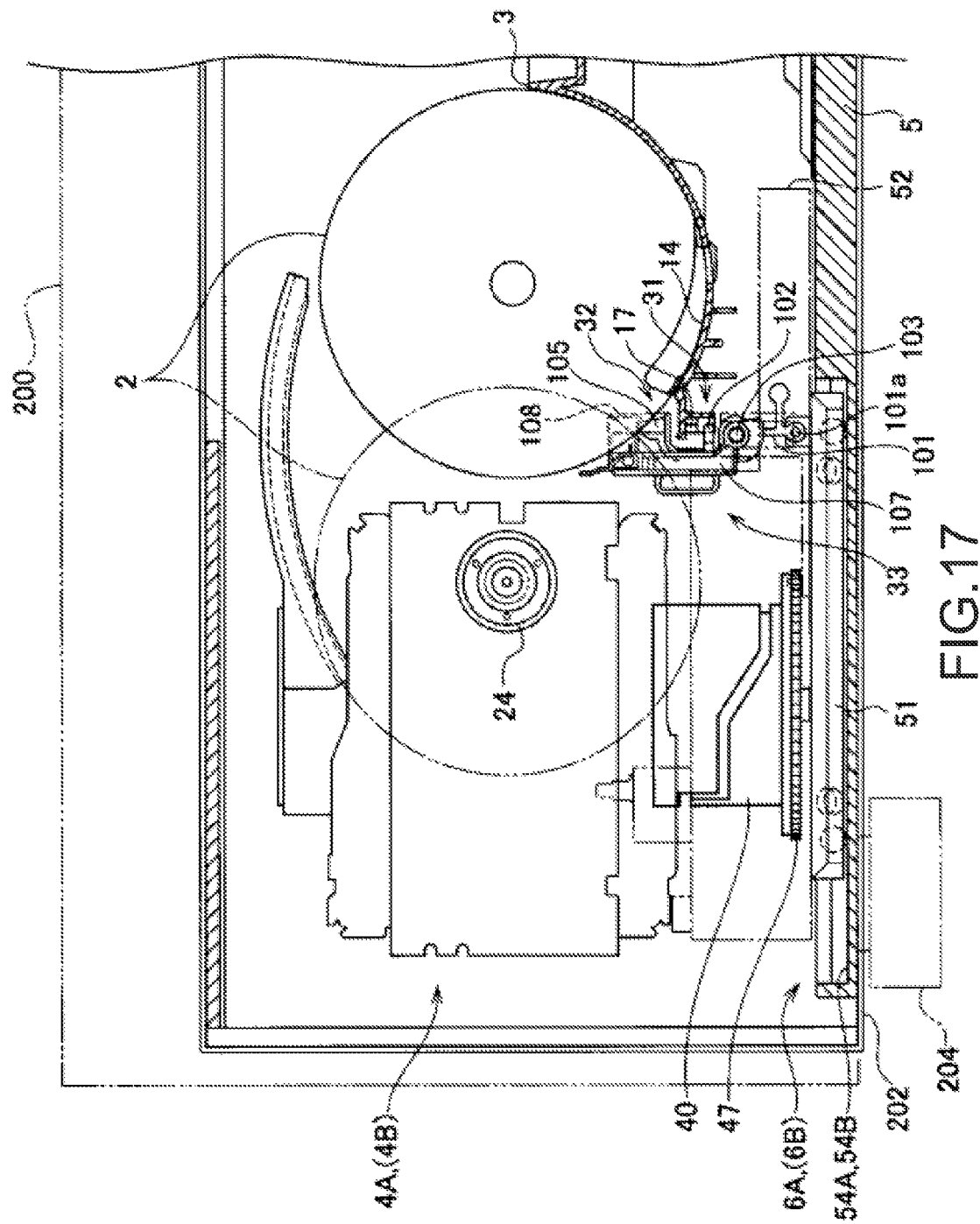
FIG. 17 is an explanation view showing, in a cross-section and an enlarged manner, the main parts of the disk recording and reproducing apparatus in a state in which from the state shown in FIG. 16, the disk drive unit is moved further closer to the disk accommodation table and the disk is held by the disk transport unit with the disk accommodation table being locked.

FIG. 17 shows the state in which the disk drive unit 4A is moved to the front end. By the operation shaft 103 moving to the front end, the rotating lever 101 is caused to stand substantially in a vertical direction. In this manner, the locking portion 102 fits in the gear teeth 17 and the disk accommodation table 3 is locked. At this point of time, the pressing and opening part 105 of the disk space pressing and widening portion 32 enters between the disk accommodation portions 14 adjacent to each other and pushes and opens the disks 2 accommodated in the disk accommodation portions 14, 14 located on both sides of the selected disk accommodation portion 14, to an outside in the circumferential direction.

Figure 18:
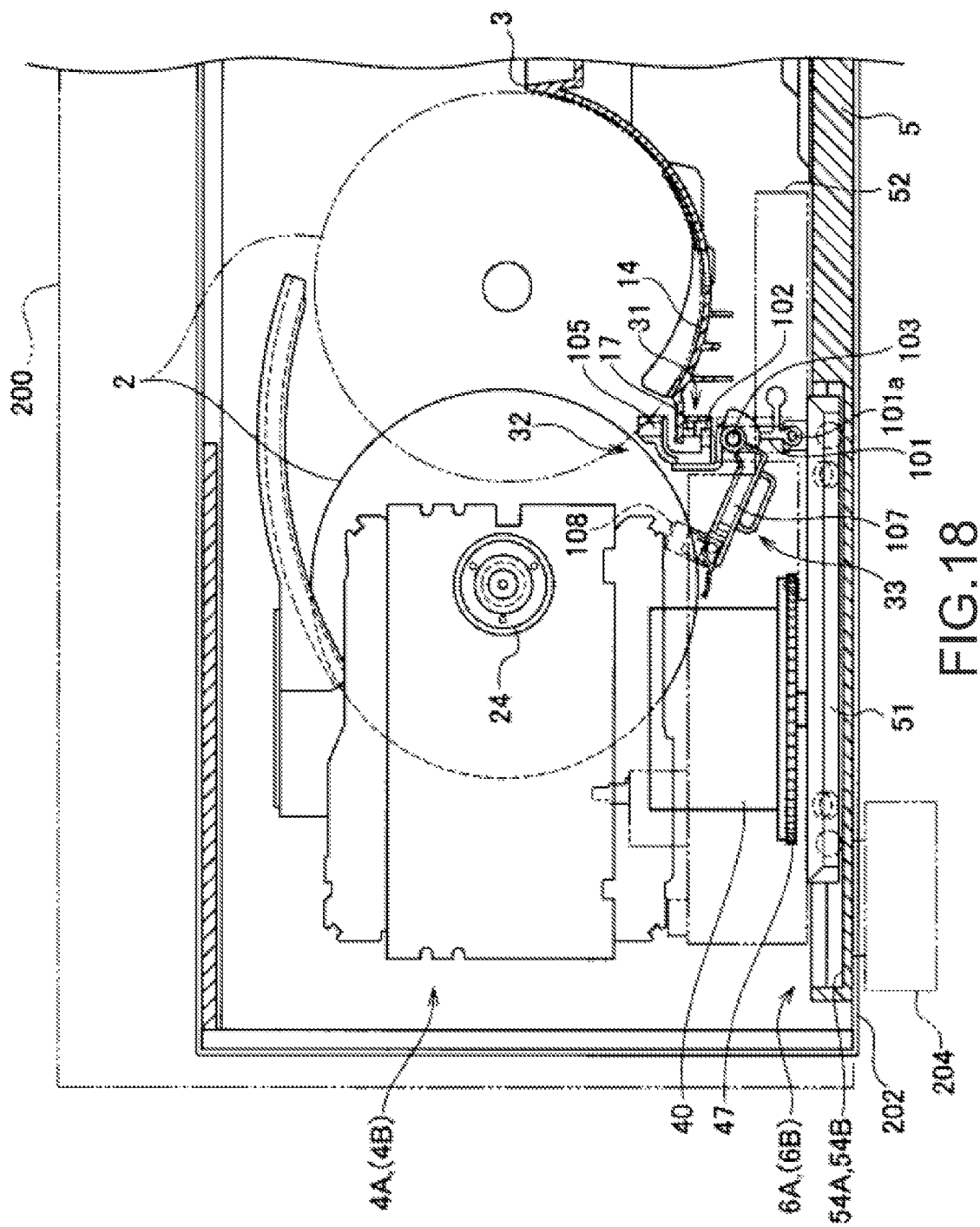
FIG. 18 is an explanation view showing, in a cross-section and an enlarged manner, the main parts of the disk recording and reproducing apparatus in a state in which from the state shown in FIG. 17, the disk transport unit is operated and the disk is transported from a disk accommodation position to a disk mounting and removing position.

At this point of time, due to an action of the cam portion, the clamp lever 107 is caused to stand substantially in the vertical direction and the grasping portion 108 grasps part of the outer rim of the desired disk 2. From this state, the clamp lever 107 is rotated to an outside (in the counterclockwise direction in FIG. 17) with the operation shaft 103 being a center of rotation. In this manner, as shown in FIG. 18, the disk 2 accommodated in the disk accommodation portion 14 can be transported to the disk mounting and removing position being the disk-mounting portion of the disk drive unit 4A.

When from this state, the rotating cam 40 rotates, the first frame member 35 and the second frame member 36 are rotated and the turntable 37a and the clamper 36a hold the disk 2 from the both sides. In this manner, the desired disk 2 is chucked in the disk-mounting portion and thus, a reproduction operation or a recording operation of an information signal from or onto the disk 2 becomes possible.

Then, by operating the disk drive unit 4A, the reproduction or the recording of the information signal from or onto the disk 2 can be performed.

It should be noted that a rotating-cam driving portion 110 that operates the rotating cam 40 to rotate has a configuration as shown in FIG. 14. Specifically, the rotating-cam driving portion 110 includes an electric motor 111 and a gear array 113 including four gears. The electric motor 111 is fixed to a rear portion of the base member 52 with a screw in a state in which a rotational shaft thereof is oriented in the vertical direction. For the electric motor 111, a motor capable of performing a positive rotation and a negative rotation is used so that the rotating cam 40 can be rotated in both of the clockwise direction and the counterclockwise direction. To the rotational shaft of the electric motor 111, an output gear 112 is fixed.

The gear array 113 includes four gears 114 to 117. The first gear 114 is meshed with the output gear 112 and the second gear 115. The second gear 115 includes a smaller-diameter gear 115a and the smaller-diameter gear 115a is meshed with the third gear 116. The third gear 116 includes a smaller-diameter gear 116a and the smaller-diameter gear 116a is meshed with the fourth gear 117. The fourth gear 117 includes a smaller-diameter gear 117a and the smaller-diameter gear 117a is meshed with the cam gear 47 of the rotating cam 40. The rotational force of the electric motor 111 is transmitted to the rotating cam 40 via the gear array 113. Due to a rotation operation of the rotating cam 40, the first frame member 35, the second frame member 36, and the like are operated and loading, unloading, and the like of the disk are performed.

The recording/reproduction of an information signal by the disk drive units 4A and 4B can be also performed at any position irrespective of the operations of the drive-moving units 6A and 6B. In other words, as a matter of course, such recording/reproduction can be performed in the case where the disk drive units 4A and 4B are located at the retreat ends, and such recording/reproduction can be also performed at the advance ends with the disk drive units 4A and 4B being placed closest to the disk accommodation table 3 as shown in FIG. 18.

In the case where the disk drive units 4A and 4B are located at the advance ends, a transport distance of the disk 2 is only a distance when the clamp lever 107 is rotated by about 70°. Therefore, an access time to the disk 2 can be extremely reduced and thus it is possible to achieve an improvement in the access time. It should be noted that in the state shown in FIG. 18, it may be impossible to operate the disk accommodation table 3 to rotate. That is because part of the disk 2 mounted on the disk drive unit 4A overlaps with part of the disks 2 accommodated in the disk accommodation table 3. If in this state, the disk accommodation table 3 is rotated, the disk 2 mounted on the disk-mounting portion 24 and the disks 2 accommodated in the disk accommodation portions 14 collide with each other.

Figure 19:
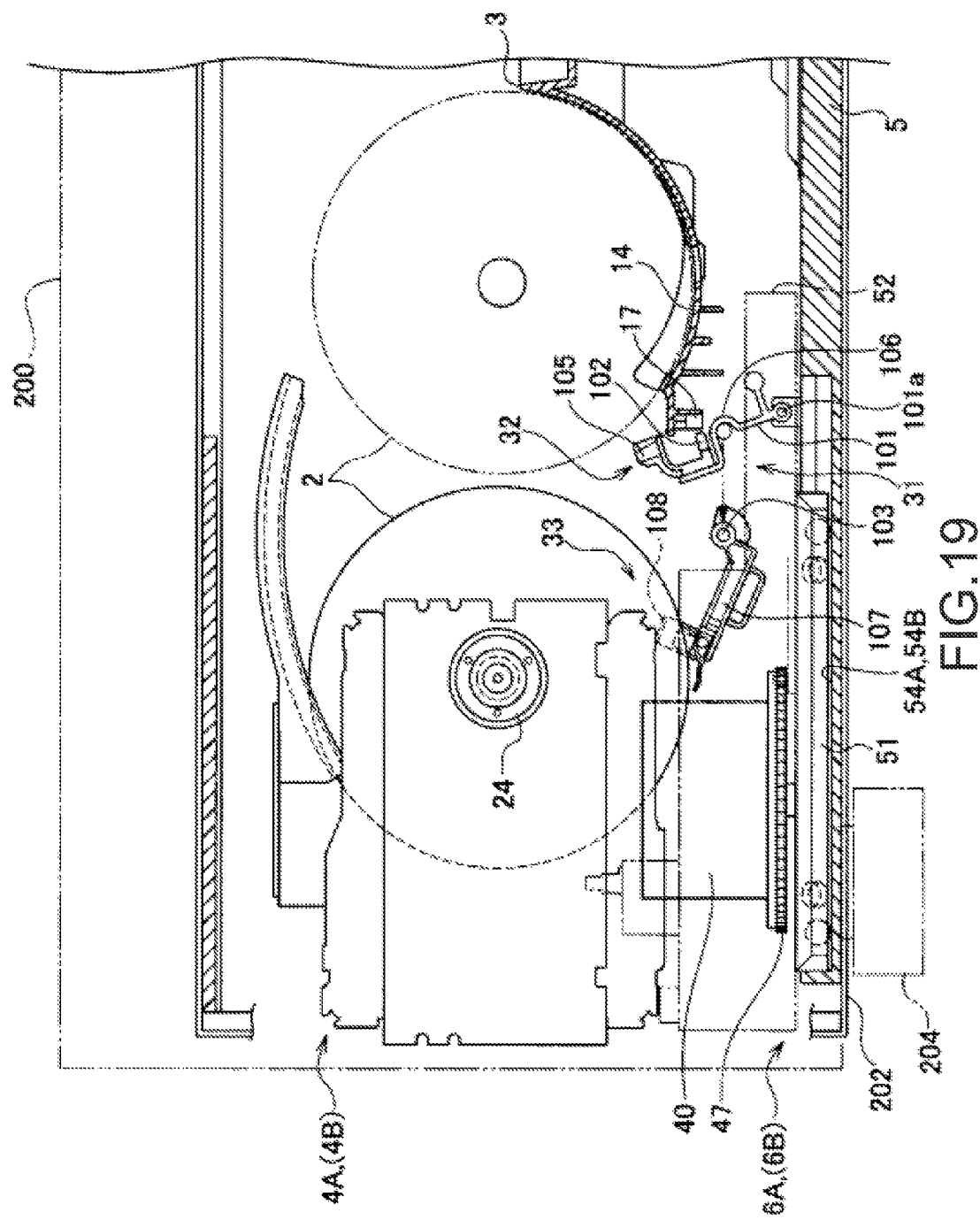
FIG. 19 is an explanation view showing, in a cross-section and an enlarged manner, the main parts of the disk recording and reproducing apparatus in a state in which from the state shown in FIG. 18, the drive-moving unit is operated and the disk drive unit is placed away from the disk accommodation table so as to be retreated to the initial position.

In order to set, when one disk drive unit (e.g., 4A) is recording or reproducing an information signal onto or from the disk 2, the desired disk 2 in the disk accommodation table 3 into the other disk drive unit (e.g., 4B), the disk drive unit 4A is moved to the retreat end. FIG. 19 shows a state in which, with the disk 2 being set in the disk drive unit 4A (or 4B), the disk drive unit 4A is moved to the retreat end.

When the disk drive unit 4A is moved to the retreat end, the overlapping of the disk 2 mounted on the disk-mounting portion 24 and the disks 2 accommodated in the disk accommodation portions 14 is completely released. Correspondingly, the operation shaft 103 is detached from the bearing portion 106 of the rotating lever 101 due to the retreating operation of the base member 52, so that the support by the rotating lever 101 is released. Then, due to spring force of a return spring, the rotating lever 101 is rotated to a direction away from the disk accommodation table 3 with the shaft portion 101a being a center of rotation. In this manner, the force pushing and opening, to the outside in the circumferential direction, the disks 2 accommodated in the disk accommodation portions 14, 14 adjacent to the pressing and opening part 105 of the disk space pressing and widening portion 32 is released and further, the locking portion 102 is detached from the gear teeth 17, so that the lock of the disk accommodation table 3 is released.

As a result, the disk accommodation table 3 is held in a free state in a rotation direction, and thus, even if the disk accommodation table 3 is rotated, there is no fear that the disks 2 accommodated in the disk accommodation portions 14 interfere with the disk 2 mounted on the disk-mounting portion 24. Then, the disk accommodation table 3 is rotated so that the desired disk accommodation portion 14 is opposed to the disk-mounting portion 24 of the disk drive unit 4B. In this manner, it becomes possible to mount on the disk-mounting portion 24 of the disk drive unit 4B the desired disk 2 accommodated in the disk accommodation portion 14. The work of mounting the disk 2 on this disk drive unit 4B can be performed during recording or reproduction of an information signal by the disk drive unit 4A. In addition, recording and reproduction of an information signal by the disk drive unit 4B can be performed at the position when the disk 2 is mounted thereon. Further, by moving the disk drive unit 4B to the retreat end, the work of changing the disk 2 on the disk drive unit 4B can be performed.

Thus, according to this example, it is possible to extremely reduce the access time to the first disk 2 and to make the access time to the second disk 2 unnecessary, so that a recording operation and a reproduction operation onto and from two or more disks can be continuously performed without interruption. As mentioned above, in this example, the configuration in which two disk drive units 4A and 4B or N disk drive units 4A and 4B, 4C . . . 4N (N is a number equal to or larger than three) are provided with the slide mechanisms allowing them to take the positions close to and spaced away from the disk accommodation table 3 is adopted. With this configuration, it is possible to make a control so that the disk transport distance in the disk changing operation becomes the minimum, and to rotate the disk-mounting portion and control the rotation even during slide operation. Thus, in the recording and/or reproducing apparatus provided with the plurality of disk drive units, it is possible to extremely reduce the access time and to continuously perform the recording operation and the reproduction operation onto and from two or more disks without interruption.

Next, three typical operation patterns of the disk recording and reproducing apparatus 1 provided with the two disk drive units 4A and 4B according to this example will be described.

The first operation pattern is that in a state in which the disk drive units 4A and 4B are placed closer to the disk accommodation table 3, recording and reproduction functions being the original functions are enabled, and the disks 2 are rotated at positions close to the table, to thereby perform recording and reproduction.

The second operation pattern is that in a state in which the disk drive units 4A and 4B are placed away from the disk accommodation table 3, the recording and reproduction functions being the original functions are enabled, and the disks 2 are rotated at positions spaced away from the table, to thereby perform recording and reproduction.

The third operation pattern is one derived from the first and second operation patterns. In the third operation pattern, in a state in which the disk drive units 4A and 4B are placed closer to the disk accommodation table 3, the recording and reproduction functions are enabled, and the disks 2 are rotated at the positions close to the table. It should be noted that, in the third operation pattern, the disks 2 are initially rotated at low speed and then allowed to rotate at high speed after the disk drive units 4A and 4B are moved at a predetermined distance from the table.

Figure 22:
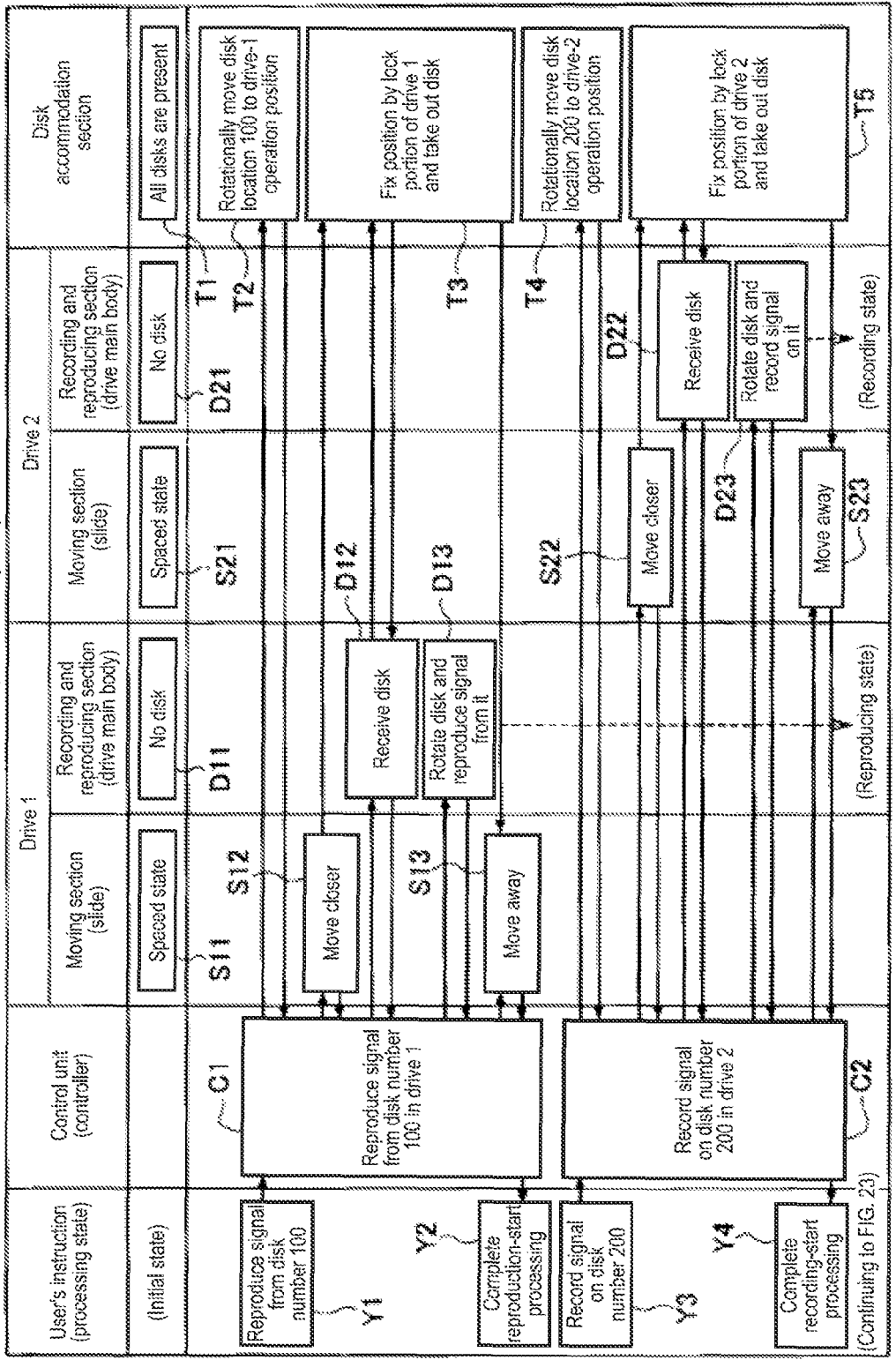
FIG. 22 is a flow chart showing a first stage of a first example of an embodiment of operation of the disk recording and reproducing apparatus shown in FIG. 2.
Figure 23:
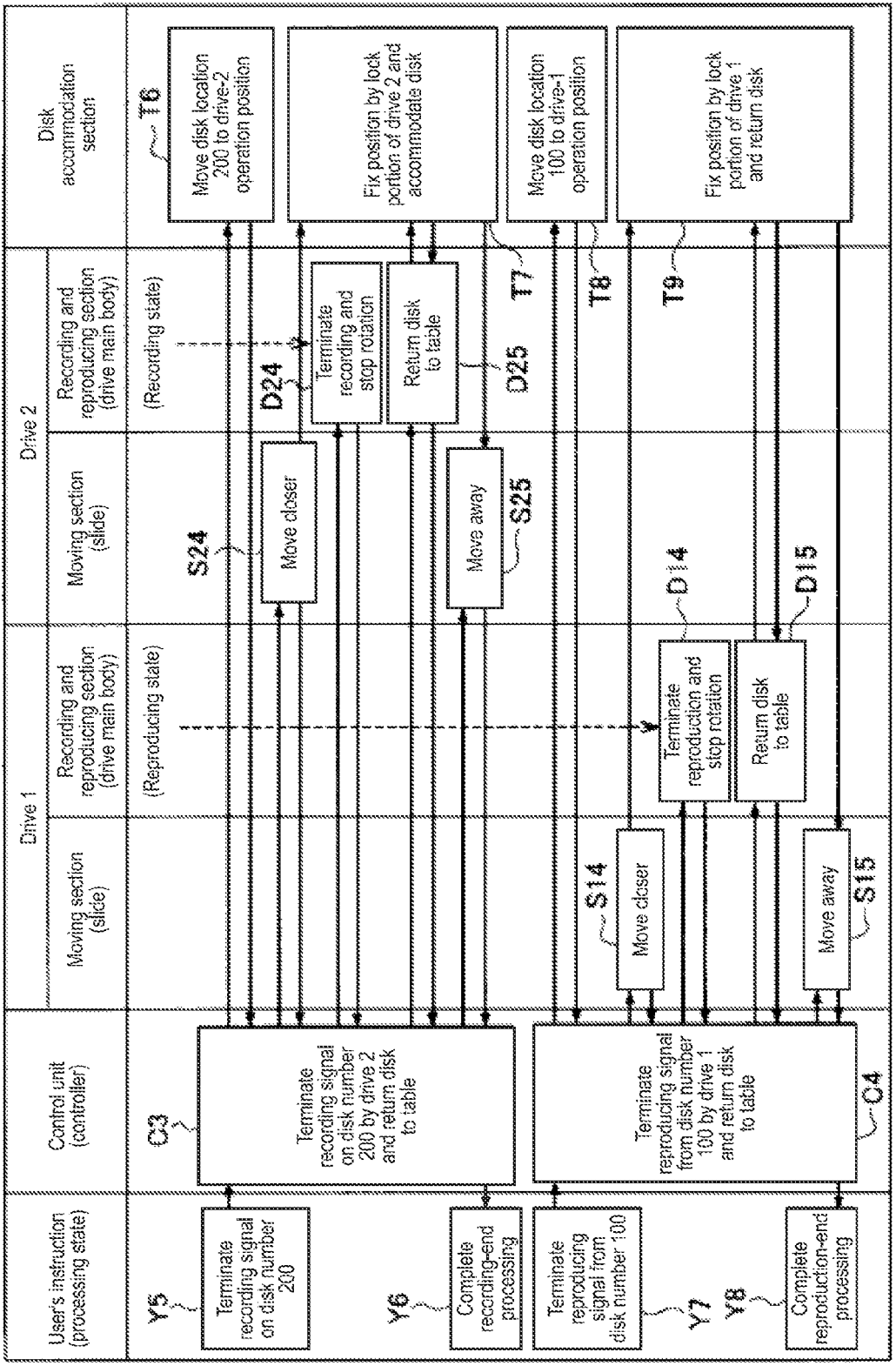
FIG. 23 is a flow chart showing a second stage of the first example of the embodiment of operation of the disk recording and reproducing apparatus shown in FIG. 2.
Figure 24:
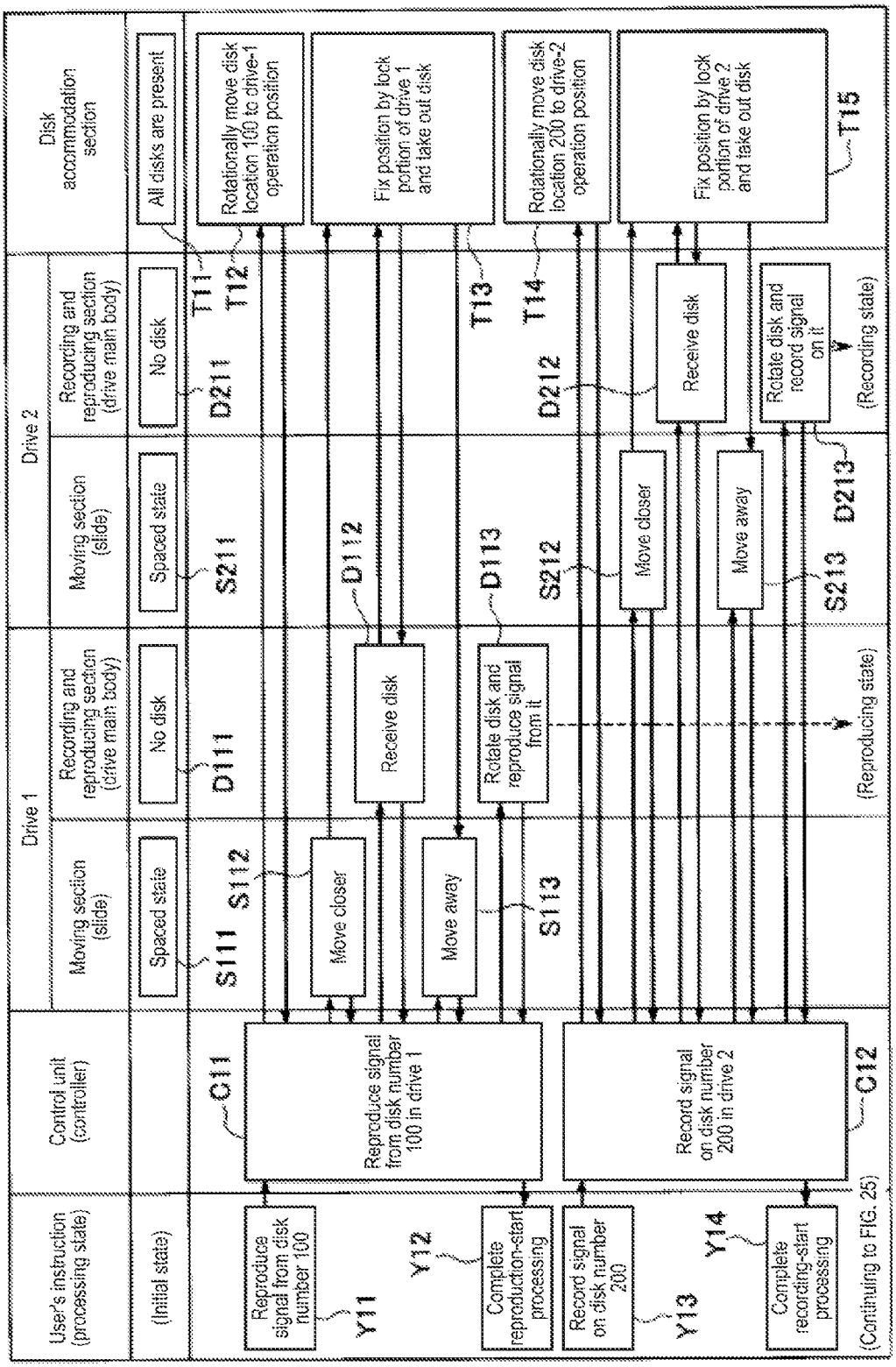
FIG. 24 is a flow chart showing a first stage of a second example of the embodiment of operation of the disk recording and reproducing apparatus shown in FIG. 2.
Figure 25:
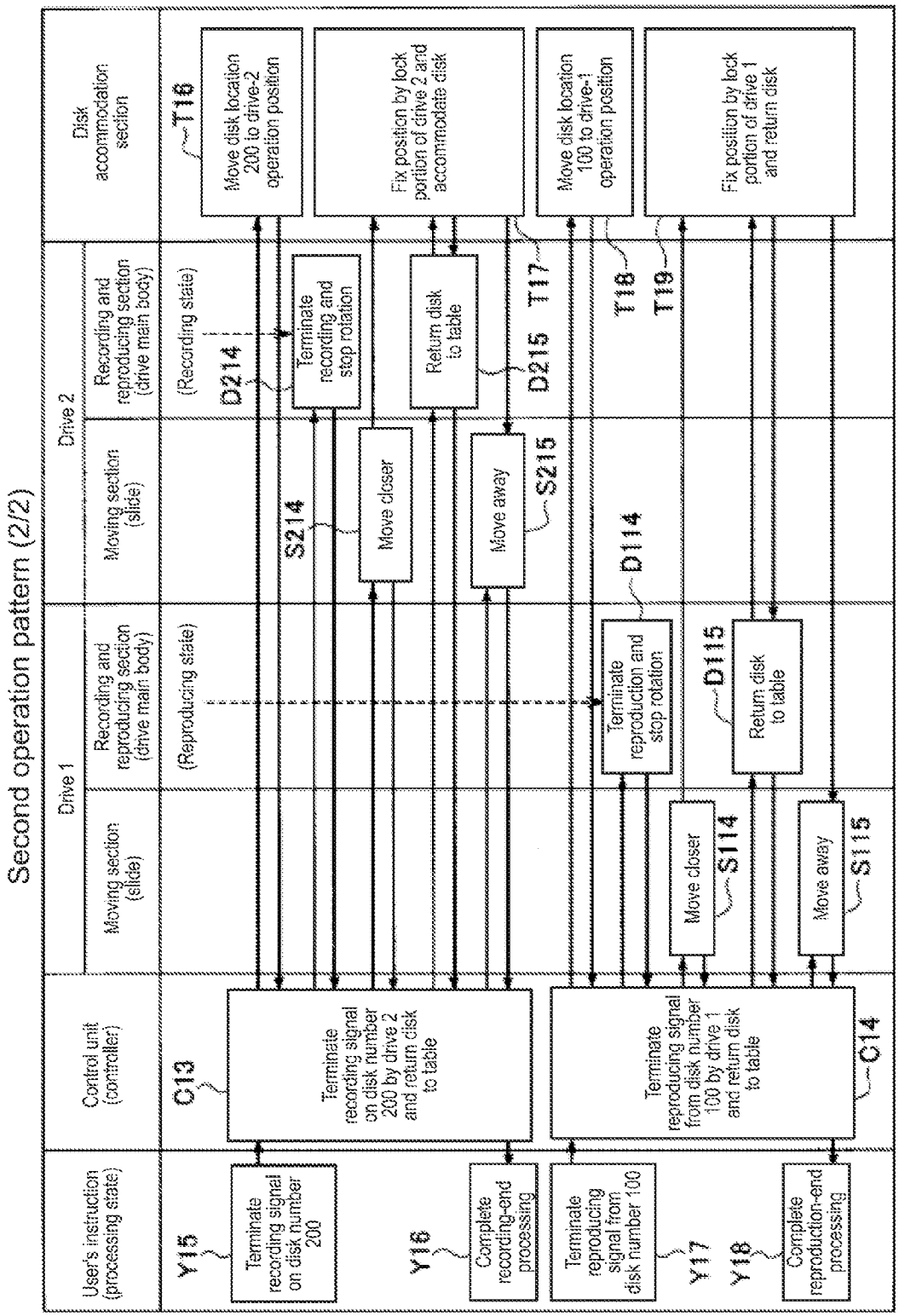
FIG. 25 is a flow chart showing a second stage of the second example of the embodiment of operation of the disk recording and reproducing apparatus shown in FIG. 2.

FIGS. 22 and 23 are views for illustrating the first operation pattern. FIGS. 24 and 25 are views for illustrating the second operation pattern. Further, FIGS. 26 to 29 are views for illustrating the third operation pattern. In FIGS. 22 to 29, user's instructions mean instructions (processing states) by a person who operates the disk recording and reproducing apparatus 1, the user's instructions being input generally by a mode selection dial, an operation button, or a command, signal, or the like from an externally connected computer PC (not shown). A control unit (controller) controls operations of the disk recording and reproducing apparatus 1 according to the user's instructions, and includes a micro computer, storages such as a ROM and a RAM, an input/output apparatus, and the like, which are not shown.

A recording and reproducing section of a drive 1 corresponds to the disk drive unit 4A and a moving section of the drive 1 corresponds to the drive-moving unit 6A. Similarly, a recording and reproducing section of a drive 2 corresponds to the disk drive unit 4B and a moving section of the drive 2 corresponds to the drive-moving unit 6B. Further, a disk accommodation section corresponds to the disk accommodation table 3.

In FIG. 22 showing the first operation pattern, in an initial state of the disk recording and reproducing apparatus 1, the first disk drive unit 4A is placed away from the disk accommodation table 3 due to the operation of the first drive-moving unit 6A (e.g., located at a rear end portion) (S11). At this point of time, on the disk-mounting portion 24 of the disk drive unit 4A, the disk 2 is not mounted (D11). Similarly, the second disk drive unit 4B is placed away from the disk accommodation table 3 due to the operation of the second drive-moving unit 6B (e.g., located at a rear end portion) (S21). At this point of time, also on the disk-mounting portion 24 of the disk drive unit 4B, the disk 2 is not mounted (D21). On the other hand, in each of all of the disk accommodation portions 14 . . . 14 of the disk accommodation table 3, a single disk 2 is accommodated (T1).

From this state, the user selects, for example, a disk 2 accommodated in a disk accommodation portion 14 having an address 100 and operates the operation button, the command from the external device, or the like to input an instruction for reproducing a disk having a disk number 100 (Y1). With this operation, the control unit outputs a control signal for reproducing an information signal from the disk having the disk number 100 in the drive 1 (C1). As a result, so that the address 100 of the disk accommodation table 3 corresponds to the disk mounting and removing position of the drive 1, the disk accommodation table 3 is driven to rotate (T2). After that operation, in conjunction with this, the control unit outputs a control signal to the first drive-moving unit 6A, to thereby move the first disk drive unit 4A closer to the disk accommodation table 3 (S12). When the first disk drive unit 4A moves to the advance end, the table-locking portion 31 is actuated to lock the disk accommodation table 3 and fix the disk accommodation portion 14 having the address 100 with the disk accommodation portion 14 having the address 100 being opposed to the disk mounting and removing position of the drive 1 (T3).

Next, due to the actuation of the control unit, the disk transport unit 33 grasps the disk 2 accommodated in the disk accommodation portion 14 and transports it from its disk accommodation position to the disk mounting and removing position of the disk-mounting portion 24. Then, due to the rotation of the rotating cam 40, the disk 2 is chucked in the disk-mounting portion 24 (between the turntable 37a and the clamper 36a) by the operations of the first frame member 35 and the second frame member 36 (D12).

Subsequently, according to a control signal output from the control unit, the first disk drive unit 4A is driven and the disk 2 is rotated, to thereby perform reading (reproduction) of an information signal (D13).

In this case, the disk 2 is driven to rotate in a state in which the disk 2 is placed closest to the disk accommodation table 3, and thus it is possible to start a reproduction operation of an information signal at an extremely early time. On the other hand, near the rotating disk 2, there are other disks 2 accommodated in the neighbor disk accommodation portions 14, and thus the rotating disk 2 partially overlaps with these disks 2 in a close state. Therefore, for example, if the disk 2 mounted on the disk-mounting portion 24 has a large warpage or strain, the disk 2 of the disk-mounting portion 24 can be brought into contact with the other disks 2 when it is rotated at high speed. As a countermeasure for preventing those disks from being brought into contact with each other, it is effective to space the first disk drive unit 4A away from the disk accommodation table 3.

Thus, after the reproduction operation from the disk 2 by the first disk drive unit 4A is started, control to move the first disk drive unit 4A away from the disk accommodation table 3 is desirably performed. Specifically, by outputting a control signal from the control unit to the moving section of the drive 1 to operate the drive-moving unit 6A to retreat, the disk drive unit 4A is moved to the retreat end (S13). Due to this retreating operation, it is possible to eliminate the possibility of the disk 2 of the disk-mounting portion 24 being brought into contact with the other disks 2. Further, when the first disk drive unit 4A moves from the advance end toward the retreat end, the table-locking portion 31 is actuated to release the lock of the disk accommodation table 3, so that the disk accommodation table 3 is allowed to be driven to rotate. In this manner, the processing of starting the reproduction from the disk having the disk number 100 is completed (Y2).

Next, in FIG. 22, the user selects, for example, a disk 2 accommodated in a disk accommodation portion 14 having an address 200 and operates the operation button, the command from the external device, or the like to input an instruction for recording an information signal onto a disk having a disk number 200 (Y3). With this operation, the control unit outputs a control signal for recording an information signal onto the disk 2 having the disk number 200 in the drive 2 (C2). As a result, so that the address 200 of the disk accommodation table 3 corresponds to the disk mounting and removing position of the drive 2, the disk accommodation table 3 is driven to rotate (T4). After that operation, in conjunction with this, the control unit outputs a control signal to the second drive-moving unit 6B, to thereby move the second disk drive unit 4B closer to the disk accommodation table 3 (S22). When the second disk drive unit 4B moves to the advance end, the table-locking portion 31 is actuated to lock the disk accommodation table 3 and fix the disk accommodation portion 14 having the address 200 with the disk accommodation portion 14 having the address 200 being opposed to the disk mounting and removing position of the drive 2 (T5).

Next, due to the actuation of the control unit, the disk transport unit 33 grasps the disk 2 accommodated in the disk accommodation portion 14 and transports it from its disk accommodation position to the disk mounting and removing position of the disk-mounting portion 24. Then, due to the rotation of the rotating cam 40, the disk 2 is chucked in the disk-mounting portion 24 by the operations of the first frame member 35 and the second frame member 36 (D22). Subsequently, according to a control signal output from the control unit, the second disk drive unit 4B is driven and the disk 2 is rotated, to thereby perform writing (recording) of an information signal (D23).

In this case, the disk 2 is driven to rotate in a state in which the disk 2 is placed closest to the disk accommodation table 3, and thus it is possible to start a recording operation of an information signal at an extremely early time. On the other hand, also near this rotating disk 2, there are other disks 2 accommodated in the neighbor disk accommodation portions 14, and thus the rotating disk 2 partially overlaps with these disks 2 in a close state. Therefore, for example, if the disk 2 mounted on the disk-mounting portion 24 has a large warpage or strain, the disk 2 of the disk-mounting portion 24 can be brought into contact with the other disks 2 when it is rotated at high speed. In view of this, as a countermeasure for preventing those disks from being brought into contact with each other, it is desirable to space the second disk drive unit 4B away from the disk accommodation table 3.

Thus, after the recording operation onto the disk 2 by the second disk drive unit 4B is started, control to move the second disk drive unit 4B away from the disk accommodation table 3 is desirably performed. Specifically, by outputting a control signal from the control unit to the moving section of the drive 2 to operate the drive-moving unit 6B to retreat, the disk drive unit 4B is moved to the retreat end (S23). Due to this retreating operation, by moving the disk drive unit 4B away from the disk accommodation table 3, it is possible to eliminate the possibility of the disk 2 of the disk-mounting portion 24 being brought into contact with the other disks 2. Further, when the second disk drive unit 4B moves from the advance end toward the retreat end, the table-locking portion 31 is actuated to release the lock of the disk accommodation table 3, so that the disk accommodation table 3 is allowed to be driven to rotate. In this manner, the processing of starting the recording onto the disk having the disk number 200 is completed (Y4).

Next, as shown in FIG. 23, for the purpose of terminating the recording of information on the disk 2 having the disk number 200, the user operates the operation button, the command from the external device, or the like to terminate the recording of an information signal on the disk 2 having the disk number 200 (Y5). In this manner, the control unit terminates recording of information on the disk 2 by the disk drive unit 4B and outputs a control signal for returning this disk 2 to the disk accommodation portion 14 having the disk address 200 of the disk accommodation table 3 (C3). As a result, so that the address 200 of the disk accommodation table 3 corresponds to the disk mounting and removing position of the drive 2, the disk accommodation table 3 is driven to rotate (T6). After that operation, in conjunction with this, the control unit outputs a control signal to the second drive-moving unit 6B, to thereby move the second disk drive unit 4B closer to the disk accommodation table 3 (S24). When the second disk drive unit 4B moves to the advance end, the table-locking portion 31 is actuated to lock the disk accommodation table 3 and fix the disk accommodation portion 14 having the address 200 with the disk accommodation portion 14 having the address 200 being opposed to the disk mounting and removing position of the drive 2 (T7).

In conjunction with this, the output of the control signal from the control unit is stopped, and thus the operation of the disk drive unit 4B of the drive 2 is stopped, so that the recording operation is terminated (D24). In addition, due to the actuation of the control unit, the rotating cam 40 is rotated, and thus the chucking of the disk 2 mounted on the disk-mounting portion 24 is released via the operations of the first frame member 35 and the second frame member 36. Then, due to the actuation of the control unit, the disk transport unit 33 grasps the disk 2 mounted on the disk-mounting portion 24 and transports this disk 2 from the disk mounting and removing position to the disk accommodation position of the disk accommodation portion 14, to thereby return it to the disk accommodation portion 14 (D25). Subsequently, the second drive-moving unit 6B is operated to retreat and the disk drive unit 4B is moved to the retreat end so as to be spaced away from the disk accommodation table 3 (S25). Further, when the second disk drive unit 4B moves toward the retreat end, the table-locking portion 31 is actuated to release the lock of the disk accommodation table 3, so that the disk accommodation table 3 is allowed to be driven to rotate again. Then, the processing of terminating the recording on the disk 2 having the disk number 200 is completed (Y6).

During a period of time from the start to the end of the recording on the disk 2 having the disk number 200 by the second disk drive unit 4B, the reproduction operation from the disk having the disk number 100 by the first disk drive unit 4A is maintained as it is. Thus, the recording of information on the disk 2 by the second disk drive unit 4B is performed also during a period of time when the reproduction of information from the disk 2 by the first disk drive unit 4A is being executed, and thus it is possible to perform recording and reproduction by the two disk drive units 4A and 4B at the same time.

Next, in FIG. 23, for purpose of terminating the reproduction of information from the disk having the disk number 100, the user operates the operation button, the command from the external device, or the like, to thereby terminate the reproduction of an information signal from the disk having the disk number 100 (Y7). In this manner, the control unit terminates the reproduction of information from the disk 2 by the disk drive unit 4A and outputs a control signal for returning this disk 2 to the disk accommodation portion 14 having the disk number 100 of the disk accommodation table 3 (C4). As a result, so that the address 100 of the disk accommodation table 3 corresponds to the disk mounting and removing position of the drive 1, the disk accommodation table 3 is driven to rotate (T8). After that operation, in conjunction with this, the control unit outputs a control signal to the first drive-moving unit 6A, to thereby move the first disk drive unit 4A closer to the disk accommodation table 3 (S14). When the first disk drive unit 4A moves to the advance end, the table-locking portion 31 is actuated to lock the disk accommodation table 3 and fix the disk accommodation portion 14 having the address 100 with the disk accommodation portion 14 having the address 100 being opposed to the disk mounting and removing position of the drive 1 (T9).

In conjunction with this, the output of the control signal from the control unit is stopped, and thus the operation of the disk drive unit 4A of the drive 1 is stopped, so that the reproduction operation is terminated (D14). In addition, due to the actuation of the control unit, the rotating cam 40 is rotated, and thus the chucking of the disk 2 mounted on the disk-mounting portion 24 is released via the operations of the first frame member 35 and the second frame member 36. Then, due to the actuation of the control unit, the disk transport unit 33 grasps the disk 2 mounted on the disk-mounting portion 24 and transports this disk 2 from the disk mounting and removing position to the disk accommodation position of the disk accommodation portion 14, to thereby return it to the disk accommodation portion 14 (D15). Subsequently, the first drive-moving unit 6A is operated to retreat and the disk drive unit 4A is moved to the retreat end so as to be spaced away from the disk accommodation table 3 (S15). Further, when the first disk drive unit 4A moves toward the retreat end, the table-locking portion 31 is actuated to release the lock of the disk accommodation table 3, so that the disk accommodation table 3 is allowed to be driven to rotate again. Then, the processing of terminating the reproduction from the disk having the disk number 100 is completed (Y8).

In FIG. 24 showing the second operation pattern, in an initial state of the disk recording and reproducing apparatus 1, the first disk drive unit 4A is placed away from the disk accommodation table 3 due to the operation of the first drive-moving unit 6A (e.g., located at a rear end portion) (S111). At this point of time, on the disk-mounting portion 24 of the disk drive unit 4A, the disk 2 is not mounted (D111). Similarly, the second disk drive unit 4B is placed away from the disk accommodation table 3 due to the operation of the second drive-moving unit 6B (e.g., located at a rear end portion) (S211). At this point of time, also on the disk-mounting portion 24 of the disk drive unit 4B, the disk 2 is not mounted (D211). On the other hand, in each of all of the disk accommodation portions 14 . . . 14 of the disk accommodation table 3, a single disk 2 is accommodated (T11).

From this state, the user selects, for example, a disk 2 accommodated in a disk accommodation portion 14 having an address 100 and operates the operation button, the command from the external device, or the like to input an instruction for reproducing a disk having a disk number 100 (Y11). With this operation, the control unit outputs a control signal for reproducing an information signal from the disk having the disk number 100 in the drive 1 (C11). As a result, so that the address 100 of the disk accommodation table 3 corresponds to the disk mounting and removing position of the drive 1, the disk accommodation table 3 is driven to rotate (T12). After that operation, in conjunction with this, the control unit outputs a control signal to the first drive-moving unit 6A, to thereby move the first disk drive unit 4A closer to the disk accommodation table 3 (S112). When the first disk drive unit 4A moves to the advance end, the table-locking portion 31 is actuated to lock the disk accommodation table 3 and fix the disk accommodation portion 14 having the address 100 with the disk accommodation portion 14 having the address 100 being opposed to the disk mounting and removing position of the drive 1 (T13).

Next, due to the actuation of the control unit, the disk transport unit 33 grasps the disk 2 accommodated in the disk accommodation portion 14 and transports it from its disk accommodation position to the disk mounting and removing position of the disk-mounting portion 24. Then, due to the rotation of the rotating cam 40, the disk 2 is chucked in the disk-mounting portion 24 (between the turntable 37a and the clamper 36a) by the operations of the first frame member 35 and the second frame member 36 (D112). Subsequently, by outputting a control signal from the control unit to the moving section of the drive 1 to operate the drive-moving unit 6A to retreat, the disk drive unit 4A is moved to the retreat end (S113). In this case, by operating the disk drive unit 4A to retreat, it is possible to eliminate the possibility of the disk 2 mounted on the disk-mounting portion 24 being brought into contact with the other disks 2 accommodated in the disk accommodation portions 14. Further, when the first disk drive unit 4A moves from the advance end toward the retreat end, the table-locking portion 31 is actuated to release the lock of the disk accommodation table 3, so that the disk accommodation table 3 is allowed to be driven to rotate.

Next, according to a control signal output from the control unit, the first disk drive unit 4A is driven and the disk 2 is rotated, to thereby perform reading (reproduction) of an information signal (D113). In this case, the disk 2 is driven to rotate in a state in which it is placed away from the disk accommodation table 3, and thus it is possible to eliminate the fear of the disk 2 being brought into contact with the other disks 2. Therefore, it is possible to safely perform the reproduction operation of information. In this manner, the processing of starting the reproduction from the disk having the disk number 100 is completed (Y12).

Next, in FIG. 24, the user selects, for example, a disk 2 accommodated in a disk accommodation portion 14 having an address 200 and operates the operation button, the command from the external device, or the like to input an instruction for recording an information signal onto a disk having a disk number 200 (Y13). With this operation, the control unit outputs a control signal for recording the disk 2 having the disk number 200 in the drive 2 (C12). As a result, so that the address 200 of the disk accommodation table 3 corresponds to the disk mounting and removing position of the drive 2, the disk accommodation table 3 is driven to rotate (T14). After that operation, in conjunction with this, the control unit outputs a control signal to the second drive-moving unit 6B, to thereby move the second disk drive unit 4B closer to the disk accommodation table 3 (S212). When the second disk drive unit 4B moves to the advance end, the table-locking portion 31 is actuated to lock the disk accommodation table 3 and fix the disk accommodation portion 14 having the address 200 with the disk accommodation portion 14 having the address 200 being opposed to the disk mounting and removing position of the drive 2 (T15).

Next, due to the actuation of the control unit, the disk transport unit 33 grasps the disk 2 accommodated in the disk accommodation portion 14 and transports it from its disk accommodation position to the disk mounting and removing position of the disk-mounting portion 24. Then, due to the rotation of the rotating cam 40, the disk 2 is chucked in the disk-mounting portion 24 by the operations of the first frame member 35 and the second frame member 36 (D212). Subsequently, by outputting a control signal from the control unit to the moving section of the drive 2 to operate the drive-moving unit 6B to retreat, the disk drive unit 4B is moved to the retreat end (S213). By this retreating operation, it is possible to move the disk drive unit 4B away from the disk accommodation table 3 and eliminate the fear of the disk 2 of the disk-mounting portion 24 being brought into contact with the other disks 2. Therefore, it is possible to safely perform the recording operation of information. Further, when the second disk drive unit 4B moves from the advance end toward the retreat end, the table-locking portion 31 is actuated to release the lock of the disk accommodation table 3, so that the disk accommodation table 3 is allowed to be driven to rotate.

Next, according to a control signal output from the control unit, the second disk drive unit 4B is driven and the disk 2 is rotated, to thereby perform writing (recording) of an information signal (D213). In this case, the disk 2 is driven to rotate in a state in which it is placed away from the disk accommodation table 3, and thus it is possible to eliminate the fear of the disk 2 being brought into contact with the other disks 2. Therefore, it is possible to safely perform the recording operation of information. In this manner, the processing of starting the recording onto the disk 2 having the disk number 200 is completed (Y14).

Next, as shown in FIG. 25, for the purpose of terminating the recording of information on the disk 2 having the disk number 200, the user operates the operation button, the command from the external device, or the like to terminate the recording of an information signal on the disk 2 having the disk number 200 (Y15). In this manner, the control unit terminates recording of information on the disk 2 by the disk drive unit 4B and outputs a control signal for returning this disk 2 to the disk accommodation portion 14 having the disk address 200 of the disk accommodation table 3 (C13). As a result, so that the address 200 of the disk accommodation table 3 corresponds to the disk mounting and removing position of the drive 2, the disk accommodation table 3 is driven to rotate (T16). Then, the output of the control signal from the control unit is stopped, and thus the operation of the disk drive unit 4B of the drive 2 is stopped, so that the recording operation is terminated (D214).

Next, the control unit outputs a control signal to the second drive-moving unit 6B, to thereby move the second disk drive unit 4B closer to the disk accommodation table 3 (S214). When the second disk drive unit 4B moves to the advance end, the table-locking portion 31 is actuated to lock the disk accommodation table 3 and fix the disk accommodation portion 14 having the address 200 with the disk accommodation portion 14 having the address 200 being opposed to the disk mounting and removing position of the drive 2 (T17). Subsequently, according to a control signal output from the control unit, the rotating cam 40 is rotated, and thus the chucking of the disk 2 mounted on the disk-mounting portion 24 is released via the operations of the first frame member 35 and the second frame member 36.

Next, according to an output from the control unit, the disk transport unit 33 grasps the disk 2 mounted on the disk-mounting portion 24 and transports this disk 2 from the disk mounting and removing position to the disk accommodation position of the disk accommodation portion 14, to thereby return it to the disk accommodation portion 14 (D215). Subsequently, the second drive-moving unit 6B is operated to retreat and the disk drive unit 4B is moved to the retreat end so as to be spaced away from the disk accommodation table 3 (S215). Further, when the second disk drive unit 4B moves toward the retreat end, the table-locking portion 31 is actuated to release the lock of the disk accommodation table 3, so that the disk accommodation table 3 is allowed to be driven to rotate. Then, the processing of terminating the recording onto the disk 2 having the disk number 200 is completed (Y16).

Next, in FIG. 25, for the purpose of terminating the reproduction of information from the disk having the disk number 100, the user operates the operation button, the command from the external device, or the like to terminate the reproduction of an information signal from the disk having the disk number 100 (Y17). In this manner, the control unit terminates the reproduction of information from the disk 2 by the disk drive unit 4A and outputs a control signal for returning this disk 2 to the disk accommodation portion 14 having the disk number 100 of the disk accommodation table 3 (C14).

As a result, according to an output from the control unit, so that the address 100 of the disk accommodation table 3 corresponds to the disk mounting and removing position of the drive 1, the disk accommodation table 3 is driven to rotate (T18). Next, the output of the control signal from the control unit is stopped, and thus the operation of the disk drive unit 4A of the drive 1 is stopped, so that the reproduction operation is terminated (D114). In this case, during a period of time from the start to the end of the recording on the disk 2 having the disk number 200 by the disk drive unit 4B, the reproduction operation from the disk having the disk number 100 by the disk drive unit 4A is maintained as it is. Thus, the reproduction operation from the disk 2 by the first disk drive unit 4A is performed in parallel with the recording operation onto the disk 2 by the second disk drive unit 4B. Therefore, it is possible to perform recording and reproduction by the two disk drive units 4A and 4B at the same time.

Next, the control unit outputs a control signal to the first drive-moving unit 6A, to thereby move the first disk drive unit 4A closer to the disk accommodation table 3 (S114). When the first disk drive unit 4A moves to the advance end, the table-locking portion 31 is actuated to lock the disk accommodation table 3 and fix the disk accommodation portion 14 having the address 100 with the disk accommodation portion 14 having the address 100 being opposed to the disk mounting and removing position of the drive 1 (T19).

Subsequently, according to a control signal output from the control unit, the rotating cam 40 is rotated, and thus the chucking of the disk 2 mounted on the disk-mounting portion 24 is released via the operations of the first frame member 35 and the second frame member 36. Then, according to an output from the control unit, the disk transport unit 33 grasps the disk 2 mounted on the disk-mounting portion 24 and transports this disk 2 from the disk mounting and removing position to the disk accommodation position of the disk accommodation portion 14, to thereby return it to the disk accommodation portion 14 (D115). Next, the first drive-moving unit 6A is operated to retreat and the disk drive unit 4A is moved to the retreat end so as to be spaced away from the disk accommodation table 3 (S115). Further, when the first disk drive unit 4A moves toward the retreat end, the table-locking portion 31 is actuated to release the lock of the disk accommodation table 3, so that the disk accommodation table 3 is allowed to be driven to rotate. Then, the processing of terminating the reproduction from the disk having the disk number 100 is completed (Y18).

Figure 26:
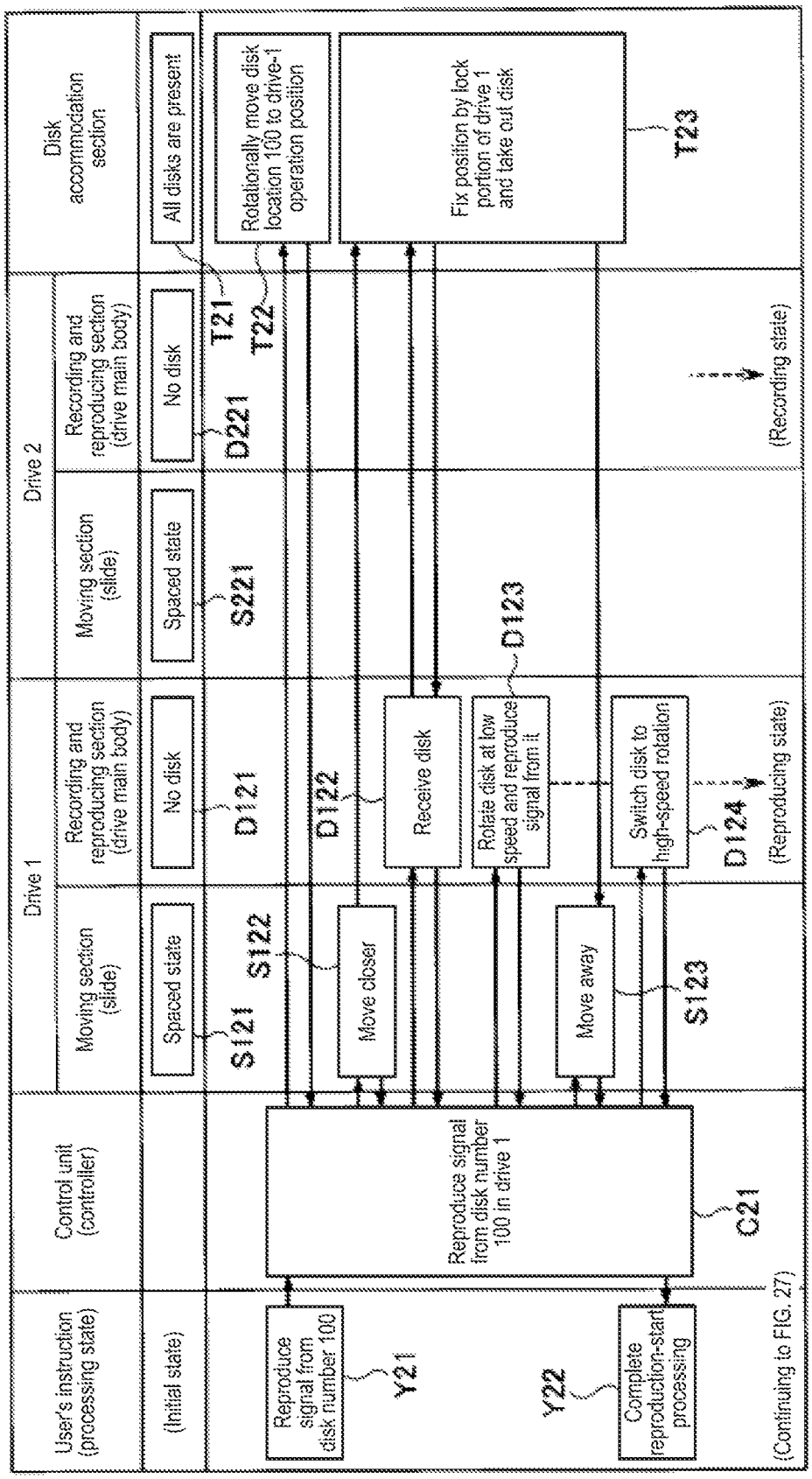
FIG. 26 is a flow chart showing a first stage of a third example of the embodiment of operation of the disk recording and reproducing apparatus shown in FIG. 2.

In FIG. 26 showing the third operation pattern, in an initial state of the disk recording and reproducing apparatus 1, the first disk drive unit 4A is placed away from the disk accommodation table 3 due to the operation of the first drive-moving unit 6A (e.g., located at a rear end portion) (S121). At this point of time, on the disk-mounting portion 24 of the disk drive unit 4A, the disk 2 is not mounted (D121). Similarly, the second disk drive unit 4B is placed away from the disk accommodation table 3 due to the operation of the second drive-moving unit 6B (e.g., located at a rear end portion) (S221). At this point of time, also on the disk-mounting portion 24 of the disk drive unit 4B, the disk 2 is not mounted (D221). On the other hand, in each of all of the disk accommodation portions 14 . . . 14 of the disk accommodation table 3, a single disk 2 is accommodated (T21).

From this state, the user selects, for example, a disk 2 accommodated in a disk accommodation portion 14 having an address 100 and operates the operation button, the command from the external device, or the like to input an instruction for reproducing a disk having a disk number 100 (Y21). With this operation, the control unit outputs a control signal for reproducing an information signal from the disk having the disk number 100 in the drive 1 (C21). As a result, so that the address 100 of the disk accommodation table 3 corresponds to the disk mounting and removing position of the drive 1, the disk accommodation table 3 is driven to rotate (T22). After that operation, in conjunction with this, the control unit outputs a control signal to the first drive-moving unit 6A, to thereby move the first disk drive unit 4A closer to the disk accommodation table 3 (S122). When the first disk drive unit 4A moves to the advance end, the table-locking portion 31 is actuated to lock the disk accommodation table 3 and fix the disk accommodation portion 14 having the address 100 with the disk accommodation portion 14 having the address 100 being opposed to the disk mounting and removing position of the drive 1 (T23).

Next, due to the actuation of the control unit, the disk transport unit 33 grasps the disk 2 accommodated in the disk accommodation portion 14 and transports it from its disk accommodation position to the disk mounting and removing position of the disk-mounting portion 24. Then, due to the rotation of the rotating cam 40, the disk 2 is chucked in the disk-mounting portion 24 (between the turntable 37a and the clamper 36a) by the operations of the first frame member 35 and the second frame member 36 (D122).

Subsequently, according to a control signal output from the control unit, the first disk drive unit 4A is driven and the disk 2 is rotated at low speed, to thereby perform reading (reproduction) of an information signal (D123). In this case, although the disk 2 is driven to rotate in a state in which the disk 2 is placed closer to the disk accommodation table 3, rotation of the disk 2 is rotated at low speed, and thus it is possible to reduce the fear of the disk 2 being brought into contact with the other disks 2.

Next, by outputting a control signal from the control unit to the moving section of the drive 1 to operate the drive-moving unit 6A to retreat, the disk drive unit 4A is moved to the retreat end (S123).

Further, when the first disk drive unit 4A moves from the advance end toward the retreat end, the table-locking portion 31 is actuated to release the lock of the disk accommodation table 3, so that the disk accommodation table 3 is allowed to be driven to rotate. By operating the disk drive unit 4A to retreat in this manner, it is possible to it is possible to eliminate the possibility of the disk 2 mounted on the disk-mounting portion 24 being brought into contact with the other disks 2 accommodated in the disk accommodation portions 14. When the disk drive unit 4A moves to the retreat end, the rotation of the disk 2 by the disk drive unit 4A is switched to high speed rotation (D124). In this case, the disk 2 mounted on the disk-mounting portion 24 is sufficiently spaced away from the other disks 2, and thus there is no fear that the disks 2 are brought into contact with each other. Therefore, it is possible to safely perform the reproduction of information.

In this manner, the processing of starting the reproduction from the disk having the disk number 100 is completed (Y22).

Figure 27:
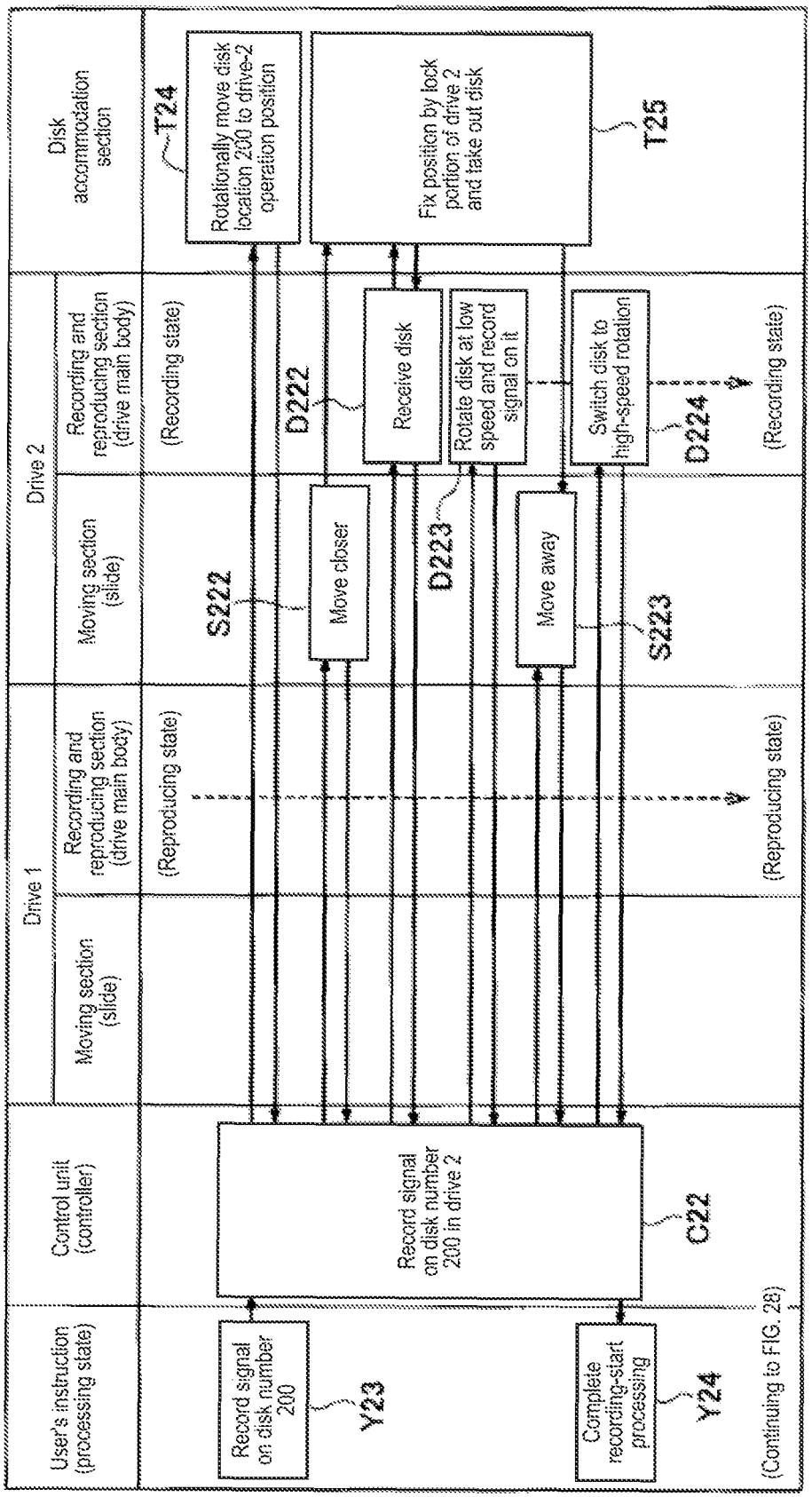
FIG. 27 is a flow chart showing a second stage of the third example of the embodiment of operation of the disk recording and reproducing apparatus shown in FIG. 2.

Next, as shown in FIG. 27, the user selects, for example, a disk 2 accommodated in a disk accommodation portion 14 having an address 200 and operates the operation button, the command from the external device, or the like to input an instruction for recording an information signal onto a disk having a disk number 200 (Y23). With this operation, the control unit outputs a control signal for recording the disk 2 having the disk number 200 in the drive 2 (C22). As a result, so that the address 200 of the disk accommodation table 3 corresponds to the disk mounting and removing position of the drive 2, the disk accommodation table 3 is driven to rotate (T24). After that operation, in conjunction with this, the control unit outputs a control signal to the second drive-moving unit 6B, to thereby move the second disk drive unit 4B closer to the disk accommodation table 3 (S222). When the second disk drive unit 4B moves to the advance end, the table-locking portion 31 is actuated to lock the disk accommodation table 3 and fix the disk accommodation portion 14 having the address 200 with the disk accommodation portion 14 having the address 200 being opposed to the disk mounting and removing position of the drive 2 (T25).

Next, due to the actuation of the control unit, the disk transport unit 33 grasps the disk 2 accommodated in the disk accommodation portion 14 and transports it from its disk accommodation position to the disk mounting and removing position of the disk-mounting portion 24. Then, due to the rotation of the rotating cam 40, the disk 2 is chucked in the disk-mounting portion 24 by the operations of the first frame member 35 and the second frame member 36 (D222). Subsequently, according to a control signal output from the control unit, the second disk drive unit 4B is driven and the disk 2 is rotated at low speed, to thereby perform writing (recording) of an information signal (D223). In this case, near the rotating disk 2, there are other disks 2, but it is possible to reduce the fear of the rotating disk 2 being brought into contact with the other disks 2 because the disk 2 is rotated at low speed.

Subsequently, by outputting a control signal from the control unit to the moving section of the drive 2 to operate the drive-moving unit 6B to retreat, the disk drive unit 4B is moved to the retreat end (S223). Further, when the second disk drive unit 4B moves from the advance end toward the retreat end, the table-locking portion 31 is actuated to release the lock of the disk accommodation table 3, so that the disk accommodation table 3 is allowed to be driven to rotate. Due to this retreating operation, it is possible to move the disk drive unit 4B away from the disk accommodation table 3 and eliminate the fear of the disk 2 of the disk-mounting portion 24 being brought into contact with the other disks 2. When the disk drive unit 4B moves to the retreat end, the rotation of the disk 2 by the disk drive unit 4B is switched to high speed rotation (D224). In this case, the disk 2 mounted on the disk-mounting portion 24 is sufficiently spaced away from the other disks 2, and thus there is no fear that the disks 2 are brought into contact with each other. Therefore, it is possible to safely perform the recording of information.

In this manner, the processing of starting the recording onto the disk having the disk number 200 is completed (Y24). In this case, in the disk drive unit 4A of the drive 1, the reproduction operation of an information signal from the disk having the disk number 100 is maintained, and in the disk drive unit 4B of the drive 2, the recording operation of an information signal onto the disk 2 having the disk number 200 is maintained.

Figure 28:
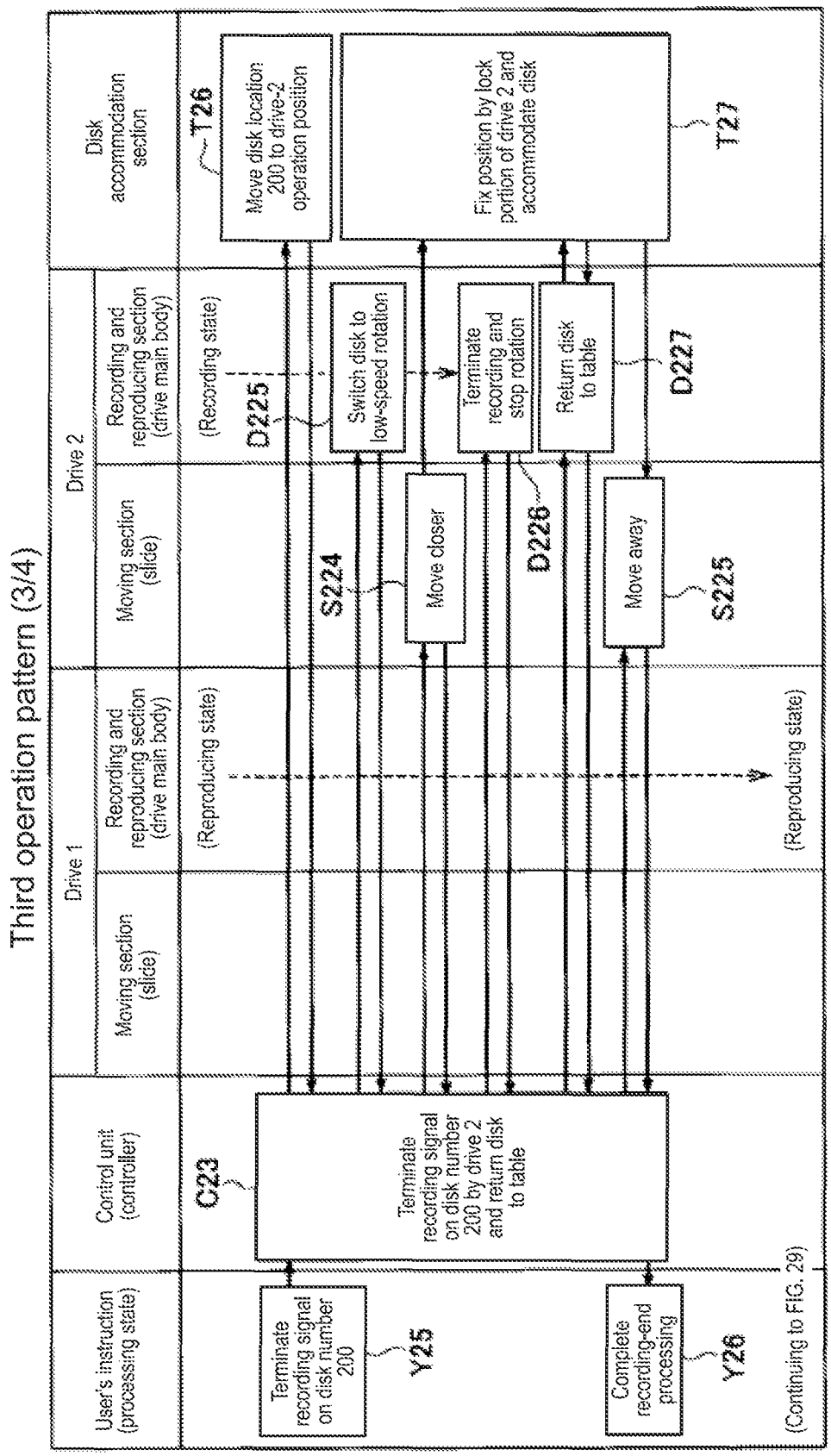
FIG. 28 is a flow chart showing a third stage of the third example of the embodiment of operation of the disk recording and reproducing apparatus shown in FIG. 2.

Next, as shown in FIG. 28, for the purpose of terminating the recording of information on the disk 2 having the disk number 200, the user operates the operation button, the command from the external device, or the like to terminate the recording of an information signal on the disk 2 having the disk number 200 (Y25). In this manner, the control unit terminates recording of information on the disk 2 by the disk drive unit 4B and outputs a control signal for returning this disk 2 to the disk accommodation portion 14 having the disk address 200 of the disk accommodation table 3 (C23). As a result, so that the address 200 of the disk accommodation table 3 corresponds to the disk mounting and removing position of the drive 2, the disk accommodation table 3 is driven to rotate (T26). Then, the output of the control signal from the control unit is lowered, and thus the rotation speed of the disk drive unit 4B of the drive 2 is switched to low speed (D225).

Next, the control unit outputs a control signal to the second drive-moving unit 6B, to thereby move the second disk drive unit 4B closer to the disk accommodation table 3 (S224). When the second disk drive unit 4B moves to the advance end, the table-locking portion 31 is actuated to lock the disk accommodation table 3 and fix the disk accommodation portion 14 having the address 200 with the disk accommodation portion 14 having the address 200 being opposed to the disk mounting and removing position of the drive 2 (T27). Then, the output of the control signal from the control unit is stopped, and thus the operation of the disk drive unit 4B of the drive 2 is stopped, so that the recording operation is terminated (D226). Subsequently, according to a control signal output from the control unit, the rotating cam 40 is rotated, and thus the chucking of the disk 2 mounted on the disk-mounting portion 24 is released via the operations of the first frame member 35 and the second frame member 36.

Next, according to an output of the control unit, the disk transport unit 33 grasps the disk 2 mounted on the disk-mounting portion 24 and transports this disk 2 from the disk mounting and removing position to the disk accommodation position of the disk accommodation portion 14, to thereby return it to the disk accommodation portion 14 (D227). Subsequently, the second drive-moving unit 6B is operated to retreat and the disk drive unit 4B is moved to the retreat end so as to be spaced away from the disk accommodation table 3 (S225). Further, when the second disk drive unit 4B moves toward the retreat end, the table-locking portion 31 is actuated to release the lock of the disk accommodation table 3, so that the disk accommodation table 3 is allowed to be driven to rotate again. Then, the processing of terminating the recording onto the disk 2 having the disk number 200 is completed (Y26).

Figure 29:
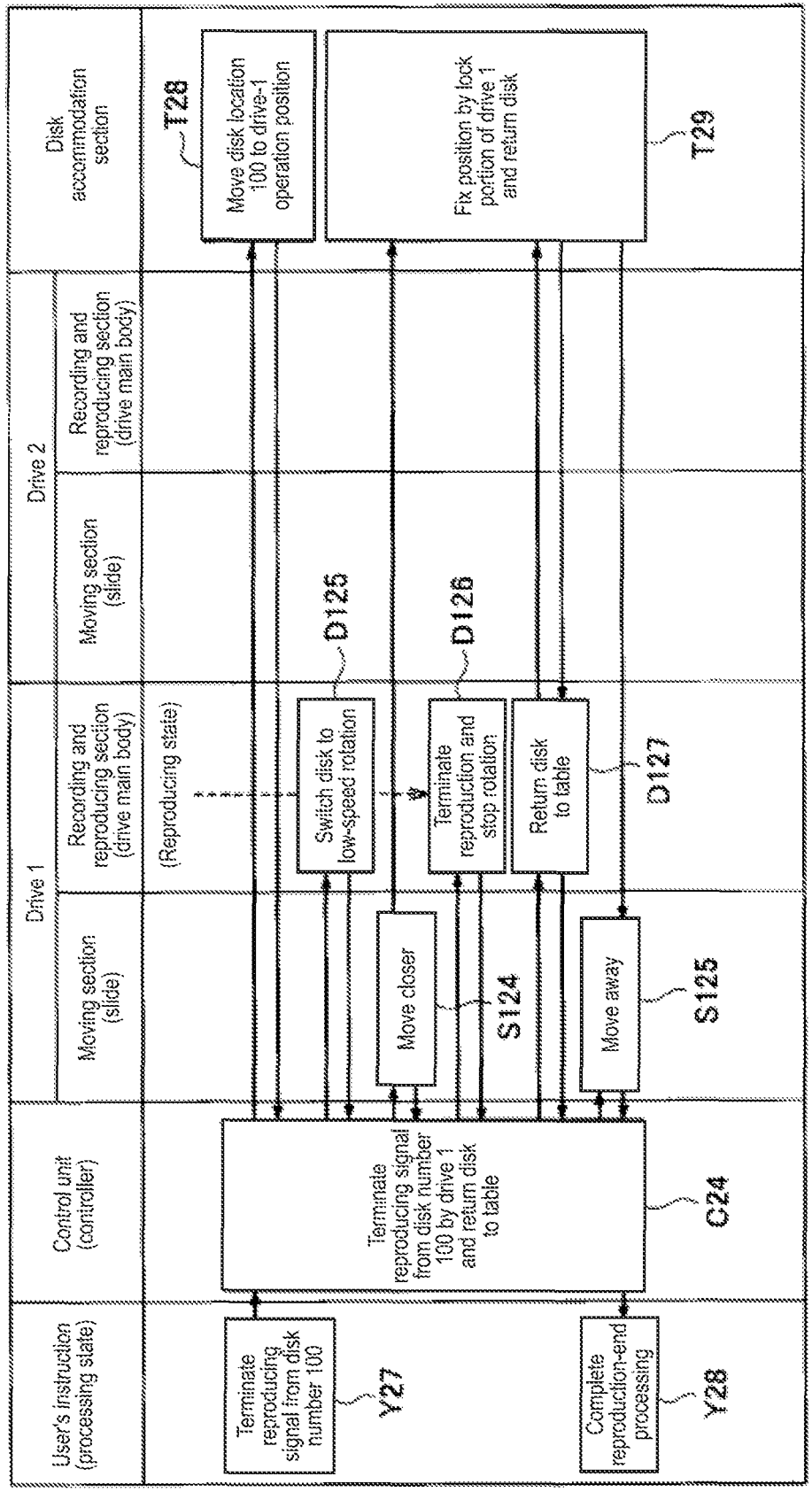
FIG. 29 is a flow chart showing a fourth stage of the third example of the embodiment of operation of the disk recording and reproducing apparatus shown in FIG. 2.

Next, in FIG. 29, for the purpose of terminating the reproduction of information from the disk having the disk number 100, the user operates the operation button, the command from the external device, or the like to terminate the reproduction of an information signal from the disk having the disk number 100 (Y27). In this manner, the control unit terminates the reproduction of information from the disk 2 by the disk drive unit 4A and outputs a control signal for returning this disk 2 to the disk accommodation portion 14 having the disk number 100 of the disk accommodation table 3 (C24).

As a result, according to an output from the control unit, so that the address 100 of the disk accommodation table 3 corresponds to the disk mounting and removing position of the drive 1, the disk accommodation table 3 is driven to rotate (T28). Next, by lowering the output of the control signal from the control unit, the rotation speed of the disk drive unit 4A of the drive 1 is switched to low speed (D125). Subsequently, the control unit outputs a control signal to the first drive-moving unit 6A, to thereby move the first disk drive unit 4A closer to the disk accommodation table 3 (S124). When the first disk drive unit 4A moves to the advance end, the table-locking portion 31 is actuated to lock the disk accommodation table 3 and fix the disk accommodation portion 14 having the address 100 with the disk accommodation portion 14 having the address 100 being opposed to the disk mounting and removing position of the drive 1 (T29).

Next, the output of the control signal from the control unit is stopped, and thus the operation of the disk drive unit 4A of the drive 1 is stopped, so that the reproduction operation is terminated (D126). Subsequently, according to a control signal output from the control unit, the rotating cam 40 is rotated, and thus the chucking of the disk 2 mounted on the disk-mounting portion 24 is released via the operations of the first frame member 35 and the second frame member 36. Then, the output from the control unit, the disk transport unit 33 grasps the disk 2 mounted on the disk-mounting portion 24 and transports this disk 2 from the disk mounting and removing position to the disk accommodation position of the disk accommodation portion 14, to thereby return it to the disk accommodation portion 14 (D127). Next, the first drive-moving unit 6A is operated to retreat and the disk drive unit 4A is moved to the retreat end so as to be spaced away from the disk accommodation table 3 (S125). Further, when the first disk drive unit 4A moves toward the retreat end, the table-locking portion 31 is actuated to release the lock of the disk accommodation table 3, so that the disk accommodation table 3 is allowed to be driven to rotate. Then, the processing of terminating the reproduction from the disk having the disk number 100 is completed (Y28).

Figure 30:
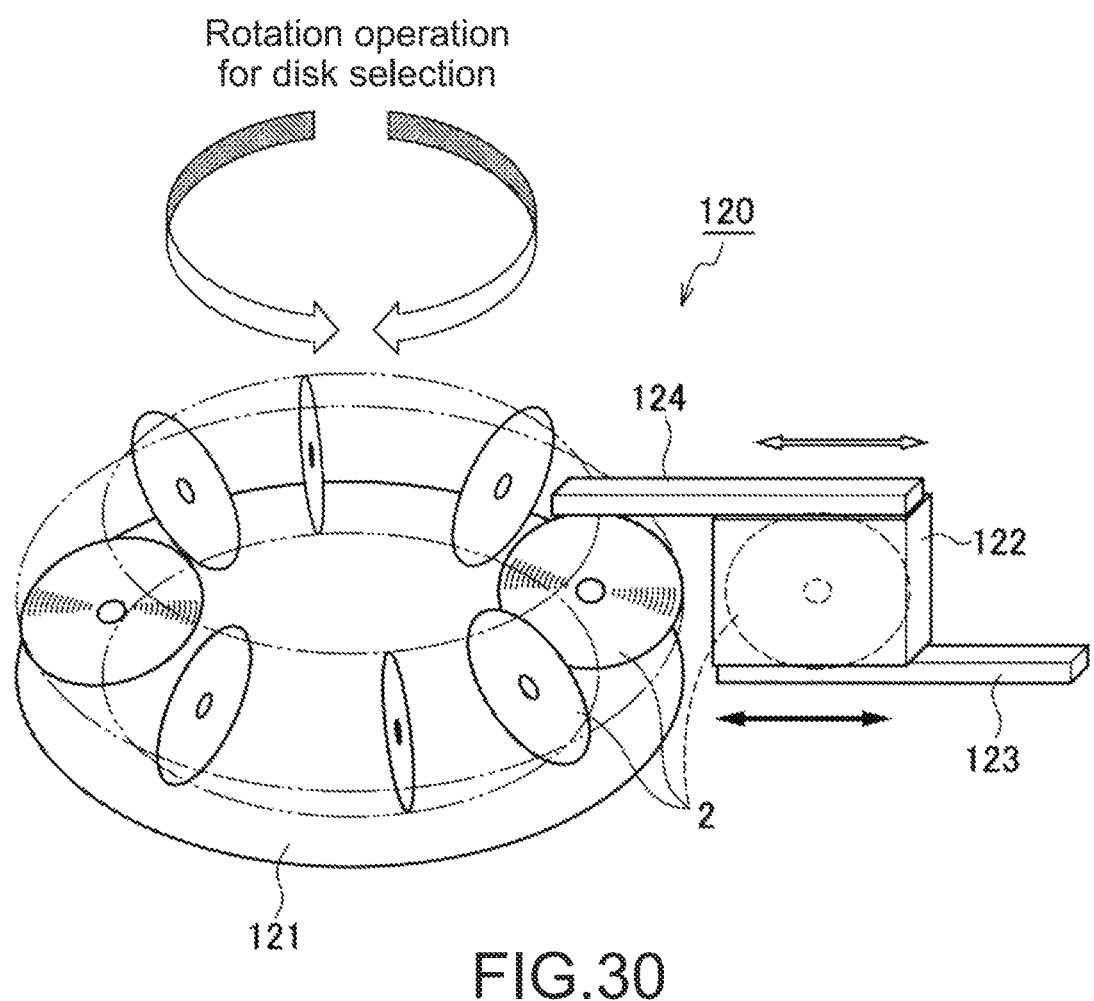
FIG. 30 is an explanation view showing a schematic configuration of a disk recording and reproducing apparatus with a recording medium drive unit being provided upright, which shows a second example of the embodiment of the recording and/or reproducing apparatus of the present disclosure.
Figure 31:
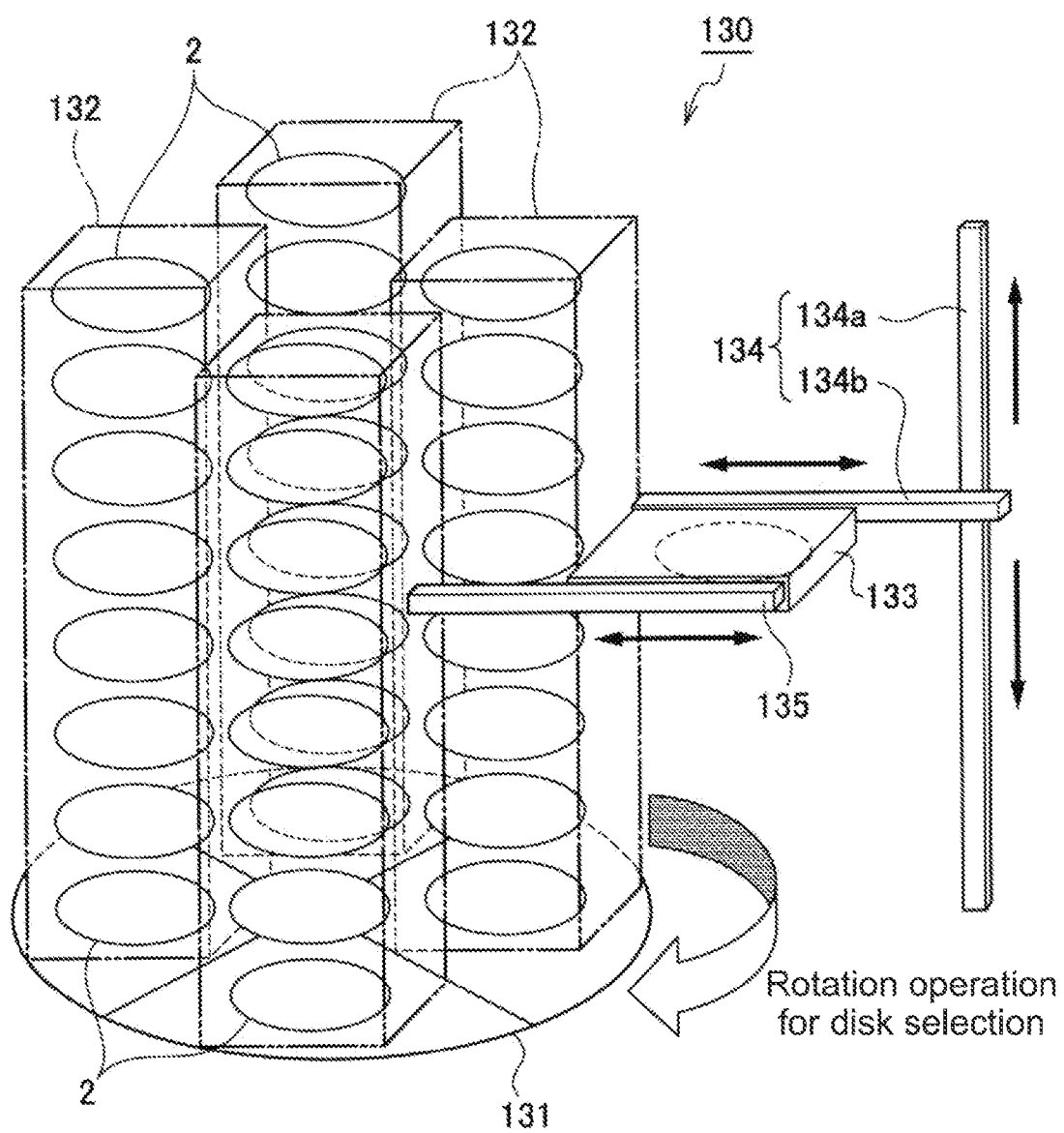
FIG. 31 is an explanation view showing a schematic configuration of a disk recording and reproducing apparatus with a plurality of cartridges in which a plurality of disk-like recording media are stacked are disposed on a recording medium accommodation table, which shows a third example of the embodiment of the recording and/or reproducing apparatus of the present disclosure.

FIGS. 30 and 31 show schematic configurations of modified examples of the recording and/or reproducing apparatus according to this example. A second example of the recording and/or reproducing apparatus shown in FIG. 30 is one obtained by integrally configuring the disk transport unit with the disk drive unit. A recording and/or reproducing apparatus 120 includes a disk accommodation table 121 in which a number of disks 2 are accommodated in an upright position, a disk drive unit 122, a drive-moving unit 123, and a disk transport unit 124. The disk accommodation table 121 has substantially the same shape and configuration as the disk accommodation table of the above-mentioned example, and is supported on an upper surface of a mechanical chassis so as to freely rotate. On an outside in a radial direction of the disk accommodation table 121, the drive-moving unit 123 fixed on the upper surface of the mechanical chassis is provided. On the drive-moving unit 123, the disk drive unit 122 is supported so as be movable. By the operation of the drive-moving unit 123, the disk drive unit 122 is configured to move closer to or away from the disk accommodation table 121.

The disk drive unit 122 is provided upright like the disks 2. On an upper surface of the disk drive unit 122 on an opposite side to the drive-moving unit 123, the disk transport unit 124 is provided. A front end of the disk transport unit 124 is set to be capable of projecting above the disk accommodation portion provided on an upper surface of the disk accommodation table 121. Further, the disk transport unit 124 is configured to be capable of transporting, in a state in which the disk drive unit 122 is placed closer to the disk accommodation table 121, a selected disk 2 from a disk accommodation portion to a disk-mounting portion or from the disk-mounting portion to the disk accommodation portion.

As mentioned above, in this example, by performing a selection operation of the disk by a rotation operation of the disk accommodation table 121, an improvement can be achieved so that the access time to the disk that includes taking-in/out operations (loading operations) is reduced. Further, by the disk transport unit 124 that performs the loading operation of the disk 2 and the drive-moving unit 123 on which the disk drive unit 122 operates to move closer to and away from the disk accommodation table 121, conjunction operations are performed as in the above-mentioned example. In this manner, an improvement can be achieved so that the access time to the disk that includes taking-in/out operations (loading operations) is reduced.

A third example of the recording and/or reproducing apparatus shown in FIG. 31 is one configured by accommodating in each of cartridges a plurality of disks and arranging a plurality of cartridges on a table. A recording and/or reproducing apparatus 130 includes a cartridge accommodation table 131, a plurality of disk cartridges 132, a disk drive unit 133, a drive-moving unit 134, and a disk transport unit 135. The cartridge accommodation table 131 is formed of a disk-like member having such a size that the disk cartridges 132 to be used can be arranged in a circumferential direction thereof. The disk cartridge 132 is formed of a tubular member capable of accommodating the plurality of disks 2 superposed in layered form, and configured so that each disk 2 can be taken out from the side thereof at an arbitrary height. The plurality of disk cartridges 132 having such a configuration are arranged, on the cartridge accommodation table 131, at predetermined intervals in the circumferential direction.

The drive-moving unit 134 includes an up and down moving portion 134a uprightly provided on the mechanical chassis and a back and forth moving portion 134b provided to the up and down moving portion 134a so as to be movable up and down in upper and lower directions. On the back and forth moving portion 134b of the drive-moving unit 134, the disk drive unit 133 is supported so as to be capable of advancing and retreating. Further, on a side of the disk drive unit 133 which is opposite to the back and forth moving portion 134b, the disk transport unit 135 is provided. A front end of the disk transport unit 135 is set to be capable of projecting toward the disk cartridge 132 disposed on an upper surface of the cartridge accommodation table 131. Further, the disk transport unit 135 is configured to be capable of transporting, in a state in which the disk drive unit 133 is placed closer to the disk cartridge 132, a selected disk 2 by the disk transport unit 135 from a disk accommodation portion to a disk-mounting portion or from the disk-mounting portion to the disk accommodation portion.

As mentioned above, in this example, by performing a selection operation of the disk by a rotation operation of the disk accommodation table 131 and the up and down moving portion 134a, an improvement can be achieved so that the access time to the disk that includes taking-in/out operations (loading operations) is reduced. Further, the disk transport unit 135 that performs the loading operation of the disk 2 and the back and forth moving portion 134b that moves the disk drive unit 133 closer to and away from the disk cartridge 132 disposed on the cartridge accommodation table 131 perform operations in conjunction with each other. In this manner, as in the above-mentioned example, an improvement can be achieved so that the access time to the disk that includes taking-in/out operations (loading operations) is reduced.

According to this example, such a configuration that a plurality of drive-moving units 6A and 6B that individually move a plurality of disk drive units 4A and 4B are provided is adopted. Therefore, even in a state in which the disk 2 is chucked by one disk drive unit 4A, it is possible to space the disk drive unit 4A away from the disk accommodation table 3 to such a position that this disk 2 does not interfere with the other disks 2. Thus, it becomes possible to allow the other disk drive unit 4B to chuck the disk 2, and accesses to all of the disks accommodated in the disk accommodation table 3 can be allowed.

In addition, according to this example, a position to be taken by the disk drive unit 4 during disk selection is a position closest to the disk accommodation portions 14. On the other hand, a position to be taken by the disk drive unit 4 when reading or writing from or onto the disk is being performed is a position furthest from the disk accommodation portions 14. In other words, the disk drive units 4A and 4B wait near the disk accommodation portion when those do not include the disks, and retreat to a position spaced away from the disk accommodation portion when those include the disks. Therefore, it is possible to chuck the disks 2 at positions closest to the disk accommodation portion and to start rotations of the disk drive units 4A and 4B immediately after the chucking.

In this manner, by rotating spindle motors of the disk-mounting portions at a point of time when designated disks 2 are chucked by the disk drive units 4A and 4B, it is possible to extremely reduce the access time to the disks. Further, also in the process of returning the disks 2 chucked by the disk drive units 4A and 4B to the disk accommodation portions 14, during operations of the drive-moving units 6A and 6B, control of rotations of the spindle motors is set to be performed depending on situation. In general, in the process during disk returning in a disk changer, rotations of the disk drive units 4A and 4B are stopped before returning operations are started. That is for the purpose of preventing damages on the disks and protecting the disk changer itself.

However, in the case of this example, in the process of sliding operations of the disk drive units 4A and 4B, even if the disks 2 mounted on the disk-mounting portions are rotating, no problem is caused. Therefore, even in a state in which braking of the spindle motors is not completely terminated, the sliding operations of the disk drive units 4A and 4B in the disk returning operations can be started. After the rotations of the spindle motors are completely stopped, the disks 2 within the disk drive units 4A and 4B can be returned to the disk accommodation portions 14.

As mentioned above, according to this example, such a configuration that the plurality of disk drive units are provided with the drive-moving units so that each disk drive unit can take positions close to and away from the disk accommodation portions of the disk accommodation table is adopted. Therefore, it is possible to set the disk transport distance in the disk change operation to be minimum, and thus it is possible to achieve an improvement in the access time.

Although the present disclosure is described above, the present disclosure is not limited to the above-mentioned examples and various modified examples can be made without departing the gist of the present disclosure. Although in each of the above-mentioned examples, the example in which the present disclosure is applied to the reproducing/reproducing apparatus that performs recording/reproduction of information onto/from the disk is described, the present disclosure may be applied to a disk reproducing apparatus that performs only reproduction or a disk recording apparatus that performs only recording. Further, as a matter of course, three disk drive units may be provided.

The present disclosure contains subject matter related to that disclosed in Japanese Priority Patent Application JP 2011-073320 filed in the Japan Patent Office on Mar. 29, 2011, the entire content of which is hereby incorporated by reference.

What is claimed is:

1. A recording and/or reproducing apparatus, comprising:
a recording medium accommodation table including a plurality of recording medium accommodation portions each capable of accommodating a disk-like recording medium;
a recording medium drive unit on which the disk-like recording medium is removably mounted and which is capable of performing recording and/or reproduction of an information signal onto and/or from the mounted disk-like recording medium;
a mechanical chassis configured to support the recording medium accommodation table to freely rotate and also support the recording medium drive unit to be movable;
a drive-moving unit configured to move the recording medium drive unit closer to and away from the recording medium accommodation table; and
a recording medium transport unit configured to transport the disk-like recording medium between a recording medium mounting and removing position of a recording medium-mounting portion, at which the disk-like recording medium is mounted and removed on and from the recording medium drive unit, and a recording medium accommodation position of the recording medium accommodation portions, at which the disk-like recording medium is accommodated.

2. A recording and/or reproducing apparatus, comprising:
a recording medium accommodation table including a plurality of recording medium accommodation portions each capable of accommodating a disk-like recording medium;
a plurality of recording medium drive units on each of which the disk-like recording medium is removably mounted and each of which is capable of performing recording and/or reproduction of an information signal onto and/or from the mounted disk-like recording medium;
a mechanical chassis configured to support the recording medium accommodation table to freely rotate and also support the plurality of recording medium drive units to be movable;
drive-moving units configured to individually move the plurality of recording medium drive units closer to and away from the recording medium accommodation table, the drive-moving units being as many as the plurality of recording medium drive units; and
recording medium transport units each configured to transport the disk-like recording medium between a recording medium mounting and removing position of a recording medium-mounting portion, at which the disk-like recording medium of each of the plurality of recording medium drive units is mounted and removed, and a recording medium accommodation position of each of the recording medium accommodation portions, at which the disk-like recording medium is accommodated, the recording medium transport units being as many as the plurality of recording medium drive units.

3. The recording and/or reproducing apparatus according to claim 1, wherein
the drive-moving unit includes
a slide member supported by the mechanical chassis to be linearly movable, a base member which is fixed to the slide member and to which the recording medium drive unit is installed, and a driving control unit configured to move the recording medium drive unit closer to and away from the recording medium accommodation table by moving the slide member.

4. The recording and/or reproducing apparatus according to claim 3, wherein the driving control unit includes, an electric motor, a gear array including a plurality of gears configured to transmit a rotational force of the electric motor, and a motion converter configured to convert a rotary motion of the gear array into a linear motion of the slide member.

5. The recording and/or reproducing apparatus according to claim 3, wherein the mechanical chassis is provided with one or two or more guide grooves extending toward the recording medium accommodation table, and the base member is slidably engaged to the one or two or more guide grooves.

6. The recording and/or reproducing apparatus according to claim 5, wherein the base member is provided with a running roller configured to be brought into contact with a bottom surface of the one or two or more guide grooves to be rotatable.

7. The recording and/or reproducing apparatus according to claim 5, wherein the mechanical chassis is, at a side edge of the one or two or more guide grooves, provided with a slide-holding member configured to prevent detachment of the base member, and the base member is provided with a rotating roller configured to be brought into contact with the slide-holding member to be rotatable.

* * * * *